US012749496B2

(12) United States Patent
Wei et al.

(10) Patent No.: US 12,749,496 B2
(45) Date of Patent: Sep. 29, 2026

(54) VOICE QUALITY ENHANCEMENT METHOD AND RELATED DEVICE

(71) Applicant: HUAWEI TECHNOLOGIES CO., LTD., Shenzhen (CN)

(72) Inventors: Shanyi Wei, Shenzhen (CN); Chao Wu, Hangzhou (CN); Yan Qiu, Hangzhou (CN); Meng Liao, Hangzhou (CN); Fan Fan, Shenzhen (CN); Shiqiang Peng, Shenzhen (CN); Bin Li, Shenzhen (CN); Wenbin Zhao, Moscow (RU); Jiang Li, Shenzhen (CN); Haiting Li, Beijing (CN); Xueyan Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 282 days.

(21) Appl. No.: 18/522,743

(22) Filed: Nov. 29, 2023

(65) Prior Publication Data

US 2024/0096343 A1 Mar. 21, 2024

Related U.S. Application Data

(63) Continuation of application No. PCT/CN2022/093969, filed on May 19, 2022.

(30) Foreign Application Priority Data

May 31, 2021 (CN) ......................... 202110611024.0
Jun. 22, 2021 (CN) ......................... 202110694849.3
Nov. 9, 2021 (CN) ......................... 202111323211.5

(51) Int. Cl.
*G10L 21/0232* (2013.01)
*G10L 21/0308* (2013.01)

(52) U.S. Cl.
CPC ...... *G10L 21/0232* (2013.01); *G10L 21/0308* (2013.01)

(58) Field of Classification Search
CPC ............. G10L 21/0232; G10L 21/0308; G10L 21/0264; G10L 15/1822; G10L 15/22;
(Continued)

(56) References Cited

U.S. PATENT DOCUMENTS 8,355,914 B2 * 1/2013 Joh ....................... G06F 40/232 400/489
9,412,356 B1 * 8/2016 Baker .............. G10K 11/17855
(Continued)

FOREIGN PATENT DOCUMENTS

AU 2011258531 A1 * 10/2012 ............. G10L 15/30
AU 2021340886 A1 * 3/2023 ............. G16B 20/20
(Continued)

OTHER PUBLICATIONS

Interactive Speech and Noise Modeling for Speech Enhancement (Year: 2021).*
(Continued)

*Primary Examiner* — Mohammad K Islam
(74) *Attorney, Agent, or Firm* — WOMBLE BOND DICKINSON (US) LLP

(57) ABSTRACT

This application relates to the artificial intelligence (AI) field, and specifically, to a voice quality enhancement method and a related device. The method includes: after a PNR mode is enabled, obtaining a noisy voice signal and target voice-related data, where the noisy-carrying voice signal includes a voice signal of a target user and an interfering noise signal, and the target voice-related data indicates a voice feature of the target user; and performing noise reduction on the noisy voice signal based on the target voice-related data by using a trained voice noise reduction
(Continued)

model to obtain a noise-reduced voice signal of the target user, where the voice noise reduction model is implemented based on a neural network. In embodiments of this application, voice of a target person can be enhanced, and interference can be suppressed.

19 Claims, 26 Drawing Sheets

(58) Field of Classification Search
CPC ... G10L 25/06; G10L 25/60; G10L 2015/088; G10L 2021/02082
See application file for complete search history.

(56) References Cited

U.S. PATENT DOCUMENTS

| | | | | |
|---|---|---|---|---|
| 10,147,442 | B1 * | 12/2018 | Panchapagesan | G10L 15/20 |
| 10,529,358 | B2 * | 1/2020 | Jackson | G10K 11/17821 |
| 10,573,296 | B1 * | 2/2020 | Arel | G10L 15/063 |
| 10,602,268 | B1 * | 3/2020 | Soto | H04R 3/005 |
| 10,614,827 | B1 * | 4/2020 | Korjani | G10L 21/0364 |
| 11,210,461 | B2 * | 12/2021 | Thomson | G10L 15/22 |
| 11,218,796 | B2 * | 1/2022 | Klimanis | G10L 25/84 |
| 11,741,934 | B1 * | 8/2023 | Zhang | G10L 21/0208 381/71.11 |
| 2014/0079261 | A1 * | 3/2014 | Short | H04R 25/50 381/317 |
| 2014/0301569 | A1 * | 10/2014 | Every | H04R 3/04 381/103 |
| 2014/0341388 | A1 * | 11/2014 | Goldstein | G10K 11/17827 381/71.11 |
| 2015/0179184 | A1 * | 6/2015 | Cudak | G10L 21/0208 704/233 |
| 2015/0264499 | A1 * | 9/2015 | Valeri | H04S 7/302 381/58 |
| 2016/0125892 | A1 * | 5/2016 | Bowen | G10L 15/20 704/226 |
| 2016/0196108 | A1 * | 7/2016 | Selig | H03G 5/165 700/94 |
| 2016/0275936 | A1 * | 9/2016 | Thorn | G10L 15/063 |
| 2016/0360327 | A1 * | 12/2016 | Ungstrup | H04R 25/554 |
| 2017/0148466 | A1 * | 5/2017 | Jackson | G10L 15/20 |
| 2017/0213550 | A1 * | 7/2017 | Ali | G10L 15/20 |
| 2017/0374478 | A1 * | 12/2017 | Jones | G10L 21/0364 |
| 2018/0233165 | A1 * | 8/2018 | Atkinson | G06F 3/165 |
| 2018/0315413 | A1 * | 11/2018 | Lee | B60L 1/00 |
| 2018/0350383 | A1 * | 12/2018 | Moghimi | G10L 21/0364 |
| 2019/0147853 | A1 * | 5/2019 | Gunasekara | G06N 3/08 704/243 |
| 2019/0206417 | A1 * | 7/2019 | Woodruff | G10L 21/028 |
| 2019/0208317 | A1 * | 7/2019 | Woodruff | G10L 21/0272 |
| 2019/0259381 | A1 * | 8/2019 | Ebenezer | H04R 3/005 |
| 2019/0318755 | A1 * | 10/2019 | Tashev | G10L 21/0232 |
| 2019/0339926 | A1 * | 11/2019 | Wahlberg | G10L 25/51 |
| 2020/0022007 | A1 * | 1/2020 | Ouyang | G10L 15/26 |
| 2020/0296510 | A1 * | 9/2020 | Li | H04R 1/1083 |
| 2020/0335084 | A1 * | 10/2020 | Wang | G10L 21/0364 |
| 2021/0035561 | A1 * | 2/2021 | D'Amato | A61N 1/3756 |
| 2021/0360349 | A1 * | 11/2021 | Nyayate | G06N 3/044 |
| 2022/0084539 | A1 * | 3/2022 | Kagoshima | G10L 25/03 |
| 2022/0246161 | A1 * | 8/2022 | Verbeke | G10L 21/00 |
| 2022/0343080 | A1 * | 10/2022 | Cohen | G06F 40/30 |
| 2022/0392435 | A1 * | 12/2022 | Saadatpanah | G06F 16/686 |
| 2024/0196145 | A1 * | 6/2024 | Faubel | H04R 1/08 |
| 2024/0242705 | A1 * | 7/2024 | Wang | G10L 13/047 |
| 2024/0296859 | A1 * | 9/2024 | Mohammadi | G10L 15/063 |
| 2025/0182739 | A1 * | 6/2025 | Nguyen Cong | G10L 13/08 |

FOREIGN PATENT DOCUMENTS

| | | | | | |
|---|---|---|---|---|---|
| CN | 103971696 | A | | 8/2014 | |
| CN | 104427068 | A | | 3/2015 | |
| CN | 105516846 | A | | 4/2016 | |
| CN | 106782504 | A | * | 5/2017 | G10L 21/0208 |
| CN | 107886967 | A | | 4/2018 | |
| CN | 108346433 | A | | 7/2018 | |
| CN | 109326302 | A | | 2/2019 | |
| CN | 110087162 | A | | 8/2019 | |
| CN | 110136731 | A | | 8/2019 | |
| CN | 110491407 | A | | 11/2019 | |
| CN | 110648684 | A | | 1/2020 | |
| CN | 110741654 | A | | 1/2020 | |
| CN | 111223493 | A | | 6/2020 | |
| CN | 111683319 | A | | 9/2020 | |
| CN | 111833897 | A | * | 10/2020 | G10L 21/0232 |
| CN | 111968627 | A | | 11/2020 | |
| CN | 112786006 | A | * | 5/2021 | G10L 13/04 |
| CN | 110491407 | B | * | 9/2021 | G10L 21/0232 |
| CN | 113593594 | A | * | 11/2021 | G10L 25/30 |
| CN | 113990343 | A | * | 1/2022 | H04N 7/15 |
| CN | 110808061 | B | * | 3/2022 | G10L 21/0224 |
| CN | 112786006 | B | * | 5/2024 | G10L 13/04 |
| CN | 121815507 | A | * | 4/2026 | G10L 21/0232 |
| DE | 102013216427 | A1 | * | 3/2015 | G10L 15/30 |
| JP | H0827638 | B2 | * | 3/1996 | |
| KR | 20170106312 | A | * | 9/2017 | G10L 21/0364 |
| WO | WO-2016117793 | A1 | * | 7/2016 | G10L 21/0364 |
| WO | WO-2020068056 | A1 | * | 4/2020 | G10L 15/16 |
| WO | WO-2022040011 | A1 | * | 2/2022 | H04R 1/1083 |
| WO | WO-2022151930 | A1 | * | 7/2022 | G10L 13/10 |
| WO | WO-2022151931 | A1 | * | 7/2022 | G10L 13/04 |

OTHER PUBLICATIONS

Target Speech Signal Enhancement Based on Deep Neural Networks (Year: 2019).*

A Regression Approach to Speech Enhancement Based on Deep Neural Networks (Year: 2015).*

A Unified Speaker-Dependent Speech Separation and Enhancement System Based on Deep Neural Networks (Year: 2015).*

Quan Wang et al:"VoiceFilter: Targeted Voice Separation by Speaker-Conditioned Spectrogram Masking." arXiv:1810.04826v6 [eess.AS] Jun. 19, 2019. total 5 pages.

Marc Delcroix et al:Improving speaker discrimination of target speech extraction with time-domain SpeakerBeam. arXiv:2001.08378v1 [eess.AS] Jan. 23, 2020. total 5 pages.

Marco Tagliasacchi et al:"SEANet: A Multi-modal Speech Enhancement Network." arXiv:2009.02095v1 [eess.AS] Sep. 4, 2020. total 5 pages.

Sonion Voice Pick Up (VPU) Sensor. TDK Developers Conference Sep. 17-18, 2018. Santa Clara Marriott. total 37 pages.

* cited by examiner a
b
c

VOICE QUALITY ENHANCEMENT METHOD AND RELATED DEVICE

CROSS-REFERENCE TO RELATED APPLICATIONS

This application is a continuation of International Application No. PCT/CN2022/093969, filed on May 19, 2022, which claims priority to Chinese Patent Application No. 202110611024.0, filed on May 31, 2021, Chinese Patent Application No. 202110694849.3, filed on Jun. 22, 2021, and Chinese Patent Application No. 202111323211.5, filed on Nov. 9, 2021. All of the afore-mentioned patent applications are hereby incorporated by reference in their entireties.

TECHNICAL FIELD

This application relates to the voice processing field, and in particular, to a voice quality enhancement method and a related device.

BACKGROUND

In recent years, intelligent devices greatly enrich people's life. When a device operates in a quiet scenario, voice call quality and a voice interaction (a wake-up rate and a recognition rate) function can well meet requirements. However, when the device operates in a scenario with ambient noise and voice interference, experience with voice call quality, a wake-up rate, and a recognition rate is degraded, and a voice quality enhancement algorithm needs to be used to enhance target voice and filter out interference.

Ambient noise suppression and voice interference suppression are always hot issues. In a general noise reduction method, in a manner, background noise is estimated by using a signal captured within a period of time and based on a difference between spectrum features of a background noise signal and a voice/music signal, and then ambient noise is suppressed based on an estimated background noise feature. This method achieves good effect for stable noise, but is completely ineffective for voice interference. In another manner, in addition to a difference between spectrum features of a background noise signal and a voice/music signal, a difference between correlations of different sound channels is further used. For example, a multi-channel noise suppression or microphone array beamforming technology is used. In this method, voice interference in a direction can be suppressed to some extent. However, effect of tracking a direction change of an interference source usually cannot meet a requirement, and voice quality enhancement cannot be performed for a target person.

Currently, a voice quality enhancement function and an interference suppression function are mainly implemented by using a conventional or artificial intelligence (AI) based general noise reduction or separation algorithm or the like. In this method, voice call and interaction experience usually can be improved. However, in a voice interference scenario, it is difficult to highlight target voice and suppress interfering voice, and experience is poor.

SUMMARY

Embodiments of this application provide a voice quality enhancement method and a related device. In embodiments of this application, in various scenarios with ambient noise and voice interference, all interfering noise other than voice of a target user can be suppressed, and the voice of the target user is highlighted. This improves user experience during a voice call, voice interaction, and the like.

According to a first aspect, an embodiment of this application provides a voice quality enhancement method, including: after a terminal device enters a personalized noise reduction (PNR) mode, obtaining a noisy voice signal and target voice-related data, where the noisy voice signal includes an interfering noise signal and a voice signal of a target user, and the target voice-related data indicates a voice feature of the target user; and performing noise reduction on a first noisy voice signal based on the target voice-related data by using a trained voice noise reduction model to obtain a noise-reduced voice signal of the target user, where the voice noise reduction model is implemented based on a neural network.

The interfering noise signal includes a voice signal of a non-target user, an ambient noise signal (for example, a car horn or sound made by a machine during operation), and the like.

In an embodiment, the target voice-related data may be a registered voice signal of the target user, a voice pickup (VPU) signal of the target user, a voiceprint feature of the target user, video lip movement information of the target user, or the like.

The voice noise reduction model is instructed, based on the target voice-related data, to extract the voice signal of the target user from the noisy voice signal, suppress all interfering noise other than voice of the target user, and highlight the voice of the target user. This improves user experience during a voice call, voice interaction, and the like.

In an embodiment, the method in this application further includes: obtaining a voice quality enhancement coefficient for the target user; and performing enhancement on the noise-reduced voice signal of the target user based on the voice quality enhancement coefficient for the target user to obtain an enhanced voice signal of the target user, where a ratio of an amplitude of the enhanced voice signal of the target user to an amplitude of the noise-reduced voice signal of the target user is the voice quality enhancement coefficient for the target user.

The voice quality enhancement coefficient for the target user is introduced, so that the voice signal of the target user can be further enhanced, to further highlight the voice of the target user and suppress voice of a non-target user. This improves user experience during a voice call, voice interaction, and the like.

Further, the interfering noise signal is further obtained through the noise reduction, and the method in this application further includes:

obtaining an interfering noise suppression coefficient; performing suppression on the interfering noise signal based on the interfering noise suppression coefficient to obtain an interfering noise—suppressed signal, where a ratio of an amplitude of the interfering noise—suppressed signal to an amplitude of the interfering noise signal is the interfering noise suppression coefficient; and performing fusion on the interfering noise—suppressed signal and the enhanced voice signal of the target user to obtain an output signal.

In an embodiment, a value range of the interfering noise suppression coefficient is (0, 1).

The interfering noise suppression coefficient is introduced to further suppress voice of a non-target user, so that the voice of the target user is indirectly highlighted.

In an embodiment, the interfering noise signal is further obtained through the noise reduction, and the method in this application further includes:

obtaining an interfering noise suppression coefficient; performing suppression on the interfering noise signal based on the interfering noise suppression coefficient to obtain an interfering noise-suppressed signal, where a ratio of an amplitude of the interfering noise-suppressed signal to an amplitude of the interfering noise signal is the interfering noise suppression coefficient; and performing fusion on the interfering noise-suppressed signal and the noise-reduced voice signal of the target user to obtain an output signal.

In an embodiment, a user is quite unaccustomed to a case in which only the voice of the target user appears in ears, without noise. Therefore, the interfering noise suppression coefficient and the interfering noise signal are introduced, so that a noise signal can be heard during a call when the interfering noise suppression coefficient is introduced to suppress the interfering noise signal. This improves user experience.

In an embodiment, there are M target users, the target voice-related data includes voice-related data of the M target users, the noise-reduced voice signal of the target user includes noise-reduced voice signals of the M target users, the voice quality enhancement coefficient for the target user includes voice quality enhancement coefficients for the M target users, and M is an integer greater than 1.

The performing noise reduction on the first noisy voice signal based on the target voice-related data by using a voice noise reduction model to obtain a noise-reduced voice signal of the target user includes:

for any target user A of the M target users, performing noise reduction on the first noisy voice signal based on voice-related data of the target user A by using the voice noise reduction model to obtain a noise-reduced voice signal of the target user A, where the noise-reduced voice signals of the M target users may be obtained by performing processing for each of the M target users in this manner.

The performing enhancement on the noise-reduced voice signal of the target user based on the voice quality enhancement coefficient for the target user to obtain an enhanced voice signal of the target user includes:

processing the noise-reduced voice signal of the target user A based on a voice quality enhancement coefficient for the target user A to obtain an enhanced voice signal of the target user A, where a ratio of an amplitude of the enhanced voice signal of the target user A to an amplitude of the noise-reduced voice signal of the target user A is the voice quality enhancement coefficient for the target user A, and enhanced voice signals of the M target users may be obtained by processing a noise-reduced voice signal of each of the M target users in this manner.

The method in this application further includes: obtaining an output signal based on the enhanced voice signals of the M target users.

In the foregoing parallel manner, voice signals of a plurality of target users may be enhanced, and for the plurality of target users, a voice quality enhancement coefficient may be set to further adjust enhanced voice signals of the target users, to cope with voice noise reduction in a multi-user scenario.

In an embodiment, there are M target users, the target voice-related data includes voice-related data of the M target users, the noise-reduced voice signal of the target user includes noise-reduced voice signals of the M target users, and M is an integer greater than 1.

The performing noise reduction on the first noisy voice signal based on the target voice-related data by using a voice noise reduction model to obtain a noise-reduced voice signal of the target user and the interfering noise signal includes:

performing noise reduction on the first noisy voice signal based on voice-related data of a $1^{st}$ target user of the M target users by using the voice noise reduction model to obtain a noise-reduced voice signal of the $1^{st}$ target user and a first noisy voice signal that does not include a voice signal of the $1^{st}$ target user; performing, based on voice-related data of a $2^{nd}$ target user of the M target users by using the voice noise reduction model, noise reduction on the first noisy voice signal that does not include the voice signal of the $1^{st}$ target user to obtain a noise-reduced voice signal of the $2^{nd}$ target user and a first noisy voice signal that does not include the voice signal of the $1^{st}$ target user or a voice signal of the $2^{nd}$ target user; and repeating the foregoing process until noise reduction is performed, based on voice-related data of an $M^{th}$ target user by using the voice noise reduction model, on a first noisy voice signal that does not include voice signals of the $1^{st}$ to an $(M-1)^{th}$ target users to obtain a noise-reduced voice signal of the $M^{th}$ target user and the interfering noise signal. In this way, the noise-reduced voice signals of the M target users and the interfering noise signal are obtained.

In the foregoing serial manner, voice signals of a plurality of target users may be enhanced, to cope with voice noise reduction in a multi-user scenario.

In a feasible embodiment, there are M target users, the target voice-related data includes voice-related data of the M target users, the noise-reduced voice signal of the target user includes noise-reduced voice signals of the M target users, M is an integer greater than 1, and the performing noise reduction on the first noisy voice signal based on the target voice-related data by using a voice noise reduction model to obtain a noise-reduced voice signal of the target user and the interfering noise signal includes:

performing noise reduction on the first noisy voice signal based on the voice-related data of the M target users by using the voice noise reduction model to obtain the noise-reduced voice signals of the M target users and the interfering noise signal.

In an embodiment, for the voice-related data of the M target users, related data of each target user includes a registered voice signal of the target user, the registered voice signal of the target user A is a voice signal of the target user A that is captured in an environment in which a noise decibel value is less than a preset value, the voice noise reduction model includes M first encoding networks, a second encoding network, a temporal convolutional network (TCN), a first decoding network, and M third decoding networks, and the performing noise reduction on the first noisy voice signal based on the target voice-related data by using a voice noise reduction model to obtain a noise-reduced voice signal of the target user and the interfering noise signal includes:

extracting features of registered voice signals of the M target users by using the M first encoding networks respectively to obtain feature vectors of the registered voice signals of the M target users; extracting a feature of the noisy voice signal by using the second encoding network to obtain a feature vector of the noisy voice signal; obtaining a first feature vector based on the feature vectors of the registered voice signals of the M target users and the feature vector of the first noisy voice signal; obtaining a second feature vector based on the TCN and the first feature vector; obtaining the noise-reduced voice signals of the M target users based on each of the M third decoding networks, the second feature vector, and a feature vector output by a first encoding network corresponding to the third decoding network; and obtaining the interfering noise signal based on the first decoding network, the second feature vector, and the feature vector of the first noisy voice signal.

In the foregoing manner, noise reduction may be performed on voice signals of a plurality of target users, to cope with voice noise reduction in a multi-user scenario.

In an embodiment, there are M target users, related data of the target user includes a registered voice signal of the target user, the registered voice signal of the target user is a voice signal of the target user that is captured in an environment in which a noise decibel value is less than a preset value, and the voice noise reduction model includes a first encoding network, a second encoding network, a TCN, and a first decoding network.

The performing noise reduction on the first noisy voice signal based on the target voice-related data by using a voice noise reduction model to obtain a noise-reduced voice signal of the target user includes:

extracting features of the registered voice signal of the target user and the first noisy voice signal by using the first encoding network and the second encoding network respectively to obtain a feature vector of the registered voice signal of the target user and a feature vector of the first noisy voice signal; obtaining a first feature vector based on the feature vector of the registered voice signal of the target user and the feature vector of the first noisy voice signal; obtaining a second feature vector based on the TCN and the first feature vector; and obtaining the noise-reduced voice signal of the target user based on the first decoding network and the second feature vector.

Further, the method in this application further includes:

further obtaining the interfering noise signal based on the first decoding network and the second feature vector.

In an embodiment, related data of the target user A includes a registered voice signal of the target user A, the registered voice signal of the target user A is a voice signal of the target user A that is captured in an environment in which a noise decibel value is less than a preset value, the voice noise reduction model includes a first encoding network, a second encoding network, a TCN, and a first decoding network, and the performing noise reduction on the first noisy voice signal based on voice-related data of the target user A by using the voice noise reduction model to obtain a noise-reduced voice signal of the target user A includes:

extracting features of the registered voice signal of the target user A and the first noisy voice signal by using the first encoding network and the second encoding network respectively to obtain a feature vector of the registered voice signal of the target user A and a feature vector of the first noisy voice signal; obtaining a first feature vector based on the feature vector of the registered voice signal of the target user A and the feature vector of the first noisy voice signal; obtaining a second feature vector based on the TCN and the first feature vector; and obtaining the noise-reduced voice signal of the target user A based on the first decoding network and the second feature vector.

In an embodiment, related data of an $i^{th}$ target user of the M target users includes a registered voice signal of the $i^{th}$ target user, i is an integer greater than 0 and less than or equal to M, and the voice noise reduction model includes a first encoding network, a second encoding network, a TCN, and a first decoding network.

Features of the registered voice signal of the target user and a first noise signal are extracted by using the first encoding network and the second encoding network respectively to obtain a feature vector of the registered voice signal of the $i^{th}$ target user and a feature vector of the first noise signal, where the first noise signal is a first noisy voice signal that does not include voice signals of the $1^{st}$ to an $(i-1)^{th}$ target users. A first feature vector is obtained based on the feature vector of the registered voice signal of the $i^{th}$ target user and the feature vector of the first noise signal. A second feature vector is obtained based on the TCN and the first feature vector. A noise-reduced voice signal of the $i^{th}$ target user and a second noise signal are obtained based on the first decoding network and the second feature vector, where the second noise signal is a first noisy voice signal that does not include voice signals of the $1^{st}$ to the $i^{th}$ target users.

The voice signal of the target user is registered in advance. Therefore, during subsequent voice interaction, the voice signal of the target user can be enhanced, and interfering voice and noise can be suppressed, to ensure that only the voice signal of the target user is input during voice wake-up and voice interaction. This improves effect and accuracy of voice wake-up and voice recognition. In addition, the voice noise reduction model is constructed based on the TCN such as a causal and dilated convolutional network, so that the voice noise reduction model can output a voice signal with a low latency.

In an embodiment, related data of the target user includes a VPU signal of the target user, the voice noise reduction model includes a preprocessing module, a third encoding network, a gated recurrent unit (GRU), a second decoding network, and a post-processing module, and the performing noise reduction on the first noisy voice signal based on the target voice-related data by using a voice noise reduction model to obtain a noise-reduced voice signal of the target user includes:

separately performing, by using the preprocessing module, time-to-frequency conversion on the first noisy voice signal and the VPU signal of the target user to obtain a first frequency domain signal of the first noisy voice signal and a second frequency domain signal of the VPU signal; performing fusion on the first frequency domain signal and the second frequency domain signal to obtain a first fusion frequency domain signal; sequentially processing the first fusion frequency domain signal by using the third encoding network, the GRU, and the second decoding network to obtain a mask of a third frequency domain signal of the voice signal of the target user; performing, by using the post-processing module, post-processing on the first frequency domain signal based on the mask of the third frequency domain signal to obtain the third frequency domain signal; and performing frequency-to-time conversion on the third frequency domain signal to obtain the noise-reduced voice signal of the target user, where both the third encoding module and the second decoding module are implemented based on a convolutional layer and a frequency transformation block (FTB).

The post-processing includes a mathematical operation such as dot multiplication.

Further, a mask of the first frequency domain signal is further obtained by sequentially processing the first fusion frequency domain signal by using the third encoding network, the GRU, and the second decoding network; post-processing is performed on the first frequency domain signal by using the post-processing module based on the mask of the first frequency domain signal to obtain a fourth frequency domain signal of the interfering noise signal; and frequency-to-time conversion is performed on the fourth frequency domain signal to obtain the interfering noise signal.

In an embodiment, because the first noisy voice signal includes the voice signal of the target user and the interfering noise signal, after the noise-reduced voice signal of the target user is obtained, the first noisy voice signal is processed based on the noise-reduced voice signal of the target user to obtain the interfering noise signal. In an embodiment, the noise-reduced voice signal of the target user is subtracted from the first noisy voice signal to obtain the interfering noise signal.

In an embodiment, related data of the target user A includes a VPU signal of the target user A, the voice noise reduction model includes a preprocessing module, a third encoding network, a GRU, a second decoding network, and a post-processing module, and the performing noise reduction on the first noisy voice signal based on voice-related data of the target user A by using the voice noise reduction model to obtain a noise-reduced voice signal of the target user A includes:

separately performing, by using the preprocessing module, time-to-frequency conversion on the first noisy voice signal and the VPU signal of the target user A to obtain a first frequency domain signal of the first noisy voice signal and a ninth frequency domain signal of the VPU signal of the target user A; performing fusion on the first frequency domain signal and the ninth frequency domain signal to obtain a second fusion frequency domain signal; sequentially processing the second fusion frequency domain signal by using the third encoding network, the GRU, and the second decoding network to obtain a mask of a tenth frequency domain signal of a voice signal of the target user A; performing, by using the post-processing module, post-processing on the first frequency domain signal based on the mask of the tenth frequency domain signal to obtain the tenth frequency domain signal; and performing frequency-to-time conversion on the tenth frequency domain signal to obtain the noise-reduced voice signal of the target user A, where both the third encoding module and the second decoding module are implemented based on a convolutional layer and an FTB.

In an embodiment, related data of an $i^{th}$ target user of the M target users includes a VPU signal of the $i^{th}$ target user, and i is an integer greater than 0 and less than or equal to M.

Time-to-frequency conversion is performed on both a first noise signal and the VPU signal of the $i^{th}$ target user by using the preprocessing module to obtain an eleventh frequency domain signal of the first noise signal and a twelfth frequency domain signal of the VPU signal of the $i^{th}$ target user. Fusion is performed on the eleventh frequency domain signal and the twelfth frequency domain signal to obtain a third fusion frequency domain signal, where the first noise signal is a first noisy voice signal that does not include voice signals of the $1^{st}$ to an $(i-1)^{th}$ target users. The third fusion frequency domain signal is sequentially processed by using the third encoding network, the GRU, and the second decoding network to obtain a mask of a thirteenth frequency domain signal of a voice signal of the $i^{th}$ target user and a mask of the eleventh frequency domain signal. Post-processing is performed on the eleventh frequency domain signal by using the post-processing module based on the mask of the thirteenth frequency domain signal and the mask of the eleventh frequency domain signal to obtain the thirteenth frequency domain signal and a fourteenth frequency domain signal of a second noise signal. Frequency-to-time conversion is performed on the thirteenth frequency domain signal and the fourteenth frequency domain signal to obtain a noise-reduced voice signal of the $i^{th}$ target user and the second noise signal, where the second noise signal is a first noisy voice signal that does not include voice signals of the $1^{st}$ to the $i^{th}$ target users. Both the third encoding module and the second decoding module are implemented based on a convolutional layer and an FTB.

The VPU signal of the target user is used as auxiliary information for extracting a voice feature of the target user in real time. The feature is combined with a noisy voice signal captured by a microphone to provide guidance for voice quality enhancement for the target user and suppression of interference such as voice of a non-target user. In addition, an embodiment further provides a new voice noise reduction model based on the FTB and the GRU for voice quality enhancement for the target user and suppression of interference such as voice of a non-target user. It can be learned that, in the solution of an embodiment, a user does not need to register voice feature information in advance, and a real-time VPU signal may be used as auxiliary information for obtaining enhanced target user voice and suppressing interference from non-target voice.

In an embodiment, the performing enhancement on the noise-reduced voice signal of the target user based on the voice quality enhancement coefficient for the target user to obtain an enhanced voice signal of the target user includes:

for any target user A of the M target users, performing enhancement on a noise-reduced voice signal of the target user A based on a voice quality enhancement coefficient for the target user A to obtain an enhanced voice signal of the target user A, where a ratio of an amplitude of the enhanced voice signal of the target user A to an amplitude of the noise-reduced voice signal of the target user A is the voice quality enhancement coefficient for the target user A; and the performing fusion on the interfering noise-suppressed signal and the enhanced voice signal of the target user to obtain an output signal includes:

performing fusion on enhanced voice signals of the M target users and the interfering noise-suppressed signal to obtain the output signal.

For noise-reduced voice signals of a plurality of target users, voice quality enhancement coefficients for the plurality of target users are introduced, so that strength of enhanced voice signals of the plurality of target users can be adjusted as required.

In an embodiment, related data of the target user includes a VPU signal of the target user, and the method in this application further includes: obtaining an in-ear sound signal of the target user; and the performing noise reduction on the first noisy voice signal based on the target voice-related data by using a voice noise reduction model to obtain a noise-reduced voice signal of the target user includes:

separately performing time-to-frequency conversion on the first noisy voice signal and the in-ear sound signal to obtain a first frequency domain signal of the first noisy voice signal and a fifth frequency domain signal of the in-ear sound signal; obtaining a covariance matrix of the first noisy voice signal and the in-ear sound signal based on the VPU signal of the target user, the first frequency domain signal, and the fifth frequency domain signal; obtaining a first minimum variance distortionless response (MVDR) weight based on the covariance matrix; obtaining a sixth frequency domain signal of the first noisy voice signal and a seventh frequency domain signal of the in-ear sound signal of the target user based on the first MVDR weight, the first frequency domain signal, and the fifth frequency domain signal; obtaining an eighth frequency domain signal of the noise-reduced voice signal of the target user based on the sixth frequency domain signal and the seventh frequency domain signal; and performing frequency-to-time conversion on the eighth frequency domain signal to obtain the noise-reduced voice signal of the target user.

Further, the interfering noise signal is obtained based on the noise-reduced voice signal of the target user and the first noisy voice signal.

In an embodiment, related data of the target user A includes a VPU signal of the target user A, and the method in this application further includes: obtaining an in-ear sound signal of the target user A; and the performing noise reduction on the first noisy voice signal based on voice-related data of the target user A by using the voice noise reduction model to obtain a noise-reduced voice signal of the target user A includes:

separately performing time-to-frequency conversion on the first noisy voice signal and the in-ear sound signal of the target user A to obtain a first frequency domain signal of the first noisy voice signal and a fifteenth frequency domain signal of the in-ear sound signal of the target user A; obtaining a covariance matrix of the first noisy voice signal and the in-ear sound signal of the target user A based on the VPU signal of the target user A, the first frequency domain signal, and the fifteenth frequency domain signal; obtaining a second MVDR weight based on the covariance matrix; obtaining a sixteenth frequency domain signal of the first noisy voice signal and a seventeenth frequency domain signal of the in-ear sound signal of the target user A based on the second MVDR weight, the first frequency domain signal, and the fifteenth frequency domain signal; obtaining an eighteenth frequency domain signal of the noise-reduced voice signal of the target user A based on the sixteenth frequency domain signal and the seventeenth frequency domain signal; and performing frequency-to-time conversion on the eighteenth frequency domain signal to obtain the noise-reduced voice signal of the target user A.

In this method, the target user does not need to register voice feature information of the target user in advance, and a real-time VPU signal may be used as auxiliary information for obtaining the enhanced voice signal of the target user or the target user A and suppressing interference such as voice of a non-target user.

In an embodiment, the method in this application further includes:

obtaining a first noise segment and a second noise segment of an environment in which the terminal device is located, where the first noise segment and the second noise segment are continuous noise segments in time; obtaining a signal-to-noise ratio (SNR) and a sound pressure level (SPL) of the first noise segment; if the SNR of the first noise segment is greater than a first threshold and the SPL of the first noise segment is greater than a second threshold, extracting a first temporary feature vector of the first noise segment; performing noise reduction on the second noise segment based on the first temporary voice feature vector to obtain a second noise-reduced noise segment; performing distortion evaluation based on the second noise-reduced noise segment and the second noise segment to obtain a first distortion score; and entering the PNR mode if the first distortion score is not greater than a third threshold; and the obtaining a first noisy voice signal includes:

determining the first noisy voice signal from a noise signal generated after the first noise segment, where the feature vector of the registered voice signal includes the first temporary feature vector.

Further, if the first distortion score is not greater than the third threshold, the method in this application further includes:

sending first prompt information by using the terminal device, where the first prompt information indicates whether to enable the terminal device to enter the PNR mode; and entering the PNR mode only after an operation instruction indicating that the target user agrees to enter the PNR mode is detected.

In this method, whether voice noise reduction needs to be performed by using the solution in this application may be determined. This avoids a case that noise reduction needs to be performed but is not performed, implements flexible and automatic noise reduction, and improves user experience.

In an embodiment, related data of the target user includes a signal of a microphone array of an auxiliary device, and the method in this application further includes:

obtaining a first noise segment and a second noise segment of an environment in which the terminal device is located, where the first noise segment and the second noise segment are continuous noise segments in time; obtaining a signal captured by the microphone array of the auxiliary device of the terminal device in the environment in which the terminal device is located; calculating a direction of arrival (DOA) and a sound pressure level (SPL) of the first noise segment by using the captured signal; if the DOA of the first noise segment is greater than a ninth threshold and less than a tenth threshold and the SPL of the first noise segment is greater than an eleventh threshold, extracting a second temporary feature vector of the first noise segment; performing noise reduction on the second noise segment based on the second temporary feature vector to obtain a fourth noise-reduced noise segment; performing distortion evaluation based on the fourth noise-reduced noise segment and the second noise segment to obtain a fourth distortion score; and entering the PNR mode if the fourth distortion score is not greater than a twelfth threshold; and the obtaining a first noisy voice signal includes:

determining the first noisy voice signal from a noise signal generated after the first noise segment, where the feature vector of the registered voice signal includes the second temporary feature vector.

The calculating a DOA and an SPL of the first noise segment by using the captured signal may include:

performing time-to-frequency conversion on the signal captured by the microphone array to obtain a nineteenth frequency domain signal, and calculating the DOA and the SPL of the first noise segment based on the nineteenth frequency domain signal.

Further, if the fourth distortion score is not greater than the twelfth threshold, the method in this application further includes:

sending fourth prompt information by using the terminal device, where the fourth prompt information indicates whether to enable the terminal device to enter the PNR mode; and entering the PNR mode only after an operation instruction indicating that the target user agrees to enter the PNR mode is detected.

In an embodiment, the auxiliary device may be a device with a microphone array, for example, a computer or a tablet computer.

In an embodiment, the method in this application further includes:

when it is detected that the terminal device is used again, obtaining a second noisy voice signal, and performing noise reduction on the second noisy voice signal by using a conventional noise reduction algorithm, that is, in a non-PNR mode, to obtain a noise-reduced voice signal of a current call participant; and when an SNR of the second noisy voice signal is less than a fourth threshold, performing noise reduction on the second noisy voice signal based on the first temporary feature vector to obtain a noise-reduced voice signal of a current user; performing distortion evaluation based on the noise-reduced voice signal of the current user and the second noisy voice signal to obtain a second distortion score; when the second distortion score is not greater than a fifth threshold, sending second prompt information by using the terminal device, where the second prompt information is used to notify the current user that the terminal device is able to enter the PNR mode; and after an operation instruction indicating that the current user agrees to enter the PNR mode is detected, enabling the terminal device to enter the PNR mode to perform noise reduction on a third noisy voice signal, where the third noisy voice signal is obtained after the second noisy voice signal; or after an operation instruction indicating that the current user does not agree to enter the PNR mode is detected, performing noise reduction on the third noisy voice signal in a non-PNR mode.

Herein, it should be noted that, after extracting a temporary voice feature of the first noise segment to obtain a temporary feature vector of the first noise segment, the terminal device stores the temporary feature vector, and directly obtains the temporary feature vector subsequently when the temporary feature vector needs to be used. This avoids a case that a voice feature of a current user cannot be obtained subsequently in a scenario with large noise, and consequently, distortion evaluation cannot be performed. The temporary feature vector of the first noise segment herein may be the first temporary feature vector or the second temporary feature vector.

In an embodiment, the fourth threshold may be the same as or different from the first threshold, and the fifth threshold may be the same as or different from the third threshold.

In an embodiment, the method in this application further includes:

obtaining a third noise segment if the SNR of the first noise segment is not greater than the first threshold or the SPL of the first noise segment is not greater than the second threshold and a reference temporary voiceprint feature vector is stored on the terminal device; performing noise reduction on the third noise segment based on the reference temporary voiceprint feature vector to obtain a third noise-reduced noise segment; performing distortion evaluation based on the third noise segment and the third noise-reduced noise segment to obtain a third distortion score; if the third distortion score is greater than a sixth threshold and an SNR of the third noise segment is less than a seventh threshold, or the third distortion score is greater than an eighth threshold and the SNR of the third noise segment is not less than the seventh threshold, sending third prompt information by using the terminal device, where the third prompt information is used to notify a current user that the terminal device is able to enter the PNR mode; and after an operation instruction indicating that the current user agrees to enter the PNR mode is detected, enabling the terminal device to enter the PNR mode to perform noise reduction on a fourth noisy voice signal; or after an operation instruction indicating that the current user does not agree to enter the PNR mode is detected, performing noise reduction on the fourth noisy voice signal in a non-PNR mode, where the fourth noisy voice signal is determined from a noise signal generated after the third noise segment.

The reference temporary voiceprint feature vector is a voiceprint feature vector of a historical user.

In an embodiment, the seventh threshold may be 10 dB or another value, the sixth threshold may be 8 dB or another value, and the eighth threshold may be 12 dB or another value.

In this method, whether voice noise reduction needs to be performed by using the solution in this application may be determined. This avoids a case that noise reduction needs to be performed but is not performed, implements flexible and automatic noise reduction, and improves user experience.

In an embodiment, the method in this application further includes:

skipping entering the PNR mode when it is detected that the terminal device is in a handheld call state;

entering the PNR mode when it is detected that the terminal device is in a hands-free call state, where the target user is an owner of the terminal device or a user who is using the terminal device;

entering the PNR mode when it is detected that the terminal device is in a video call state, where the target user is an owner of the terminal device or a user closest to the terminal device;

entering the PNR mode when it is detected that the terminal device is connected to a headset for a call, where the target user is a user wearing the headset, and the first noisy voice signal and the target voice-related data are captured by the headset; or entering the PNR mode when it is detected that the terminal device is connected to a smart large-screen device, a smartwatch, or a vehicle-mounted device, where the target user is an owner of the terminal device or a user who is using the terminal device, and the first noisy voice signal and the target voice-related data are captured by the smart large-screen device, the smartwatch, or audio capture hardware of the vehicle-mounted device.

Whether to enable the PNR noise reduction function is determined based on different application scenarios. This implements flexible and automatic noise reduction, and improves user experience.

In an embodiment, the method in this application further includes:

obtaining a decibel value of an audio signal in a current environment; if the decibel value of the audio signal in the current environment exceeds a preset decibel value, determining whether a PNR function corresponding to an application started by the terminal device is enabled; and if the PNR function is not enabled, enabling the PNR function corresponding to the application started by the terminal device, and entering the PNR mode.

The application is an application installed on the terminal device, for example, Call, Video call, a video recording application, WeChat, or QQ.

Whether to enable the PNR function is determined based on strength of the audio signal in the current environment. This implements flexible and automatic noise reduction, and improves user experience.

In an embodiment, the terminal device includes a display, and the display includes a plurality of display regions. Each of the plurality of display regions displays a label and a corresponding function button. The function button is configured to control enabling and disabling of a PNR function of a function or an application indicated by a label corresponding to the function button.

Enabling and disabling of a PNR function of an application (for example, Call or Video recording) on the terminal device are controlled on an interface displayed on the display of the terminal device, so that a user can enable and disable the PNR function as required.

In an embodiment, when voice data is transmitted between the terminal device and another terminal device, the method in this application further includes:

receiving a voice quality enhancement request sent by the another terminal device, where the voice quality enhancement request indicates the terminal device to enable a PNR function of a call function; sending, by using the terminal device, third prompt information in response to the voice quality enhancement request, where the third prompt information indicates whether to enable the terminal device to enable the PNR function of the call function; after an operation instruction for confirming that the PNR function of the call function is to be enabled is detected, enabling the PNR function of the call function, and entering the PNR mode; and sending a voice quality enhancement response message to the another terminal device, where the voice quality enhancement response message indicates that the terminal device has enabled the PNR function of the call function.

During a call, when it is found that a peer party is in a noisy environment, a request for enabling a PNR function of a call function of a terminal device of the peer party is sent to the peer party, to improve quality of the call between two parties. Certainly, an embodiment may alternatively be applied to a video call or the like.

In an embodiment, when the terminal device enables a video call or video recording function, a display interface of the terminal device includes a first region and a second region. The first region is used to display video call content or video recording content. The second region is used to display M controls and corresponding M labels. The M controls are in a one-to-one correspondence with the M target users. Each of the M controls includes a sliding button and a sliding bar. The sliding button is controlled to slide on the sliding bar to adjust a voice quality enhancement coefficient for a target user indicated by a label corresponding to the control.

A user adjusts a value of the voice quality enhancement coefficient as required, so that the user can adjust a degree of noise reduction as required. Certainly, the interfering noise suppression coefficient may also be adjusted in this manner.

In an embodiment, when the terminal device enables a video call or video recording function, a display interface of the terminal device includes a first region, and the first region is used to display video call content or video recording content.

When an operation performed on any object in the video call content or the video recording content is detected, a control corresponding to the object is displayed in the first region, where the control includes a sliding button and a sliding bar, and the sliding button is controlled to slide on the sliding bar to adjust a voice quality enhancement coefficient for the object.

A user adjusts a value of the voice quality enhancement coefficient as required, so that the user can adjust a degree of noise reduction as required. Certainly, the interfering noise suppression coefficient may also be adjusted in this manner.

In an embodiment, when the terminal device is an intelligent interaction device, the target voice-related data includes a voice signal including a wake-up word, and the first noisy voice signal includes an audio signal including a command word.

In an embodiment, the intelligent interaction device includes a smart speaker, a robot vacuum cleaner, a smart refrigerator, a smart air conditioner, and other devices.

In this manner, noise reduction is performed on instruction voice for controlling the intelligent interaction device, so that the intelligent interaction device can quickly obtain an accurate instruction, and then perform an action corresponding to the instruction.

According to a second aspect, an embodiment of this application provides a terminal device. The terminal device includes units or modules for performing the method in the first aspect.

According to a third aspect, an embodiment of this application provides a terminal device, including a processor and a memory. The processor is connected to the memory. The memory is configured to store program code. The processor is configured to invoke the program code to perform a part or all of the method in the first aspect.

According to a fourth aspect, an embodiment of this application provides a chip system. The chip system is applied to an electronic device. The chip system includes one or more interface circuits and one or more processors. The interface circuit and the processor are interconnected through a line. The interface circuit is configured to receive a signal from a memory of the electronic device, and send the signal to the processor. The signal includes computer instructions stored in the memory. When the processor executes the computer instructions, the electronic device performs the method in the first aspect.

According to a fifth aspect, an embodiment of this application provides a computer-readable storage medium. The computer-readable storage medium stores a computer program. The computer program is executed by a processor to implement the method in the first aspect.

According to a sixth aspect, an embodiment of this application further provides a computer program product including computer instructions. When the computer instructions run on a terminal device, the terminal device is enabled to implement a part or all of the method in the first aspect.

These aspects or other aspects of this application are clearer and easier to understand in descriptions of the following embodiments.

BRIEF DESCRIPTION OF DRAWINGS

To describe technical solutions in embodiments of this application more clearly, the following briefly describes accompanying drawings for describing embodiments Clearly, the accompanying drawings in the following descriptions show merely some embodiments of this application, and one of ordinary skilled in the art may still derive other drawings from these accompanying drawings without creative efforts.

DESCRIPTION OF EMBODIMENTS

The following separately provides detailed descriptions.

In the specification, claims, and accompanying drawings of this application, the terms "first", "second", "third", "fourth", and the like are intended to distinguish between different target users, but not to indicate an order. In addition, the terms "comprise", "include", and any variants thereof are intended to cover a non-exclusive inclusion. For example, a process, a method, a system, a product, or a device that includes a series of operations or units is not limited to the listed operations or units, but optionally further includes an unlisted operation or unit, or optionally further includes another inherent operation or unit of the process, the method, the product, or the device.

An "embodiment" mentioned in this specification means that a feature, structure, or characteristic described with reference to the embodiment may be included in at least one embodiment of this application. The phrase appearing in various locations in this specification does not necessarily mean a same embodiment, and neither means an independent or alternative embodiment mutually exclusive with another embodiment. It is explicitly and implicitly understood by one of ordinary skilled in the art that embodiments described in this specification may be combined with another embodiment.

"A plurality of" means two or more. "And/or" describes an association relationship for describing associated objects and indicates that three relationships may exist. For example, A and/or B may indicate the following three cases: Only A exists, both A and B exist, and only B exists. The character "/" usually indicates an "or" relationship between the associated objects.

The following describes embodiments of this application with reference to accompanying drawings.

Figure 1:
FIG. 1 is a schematic diagram of an application scenario according to an embodiment of this application.

FIG. 1 is a schematic diagram of an application scenario according to an embodiment of this application. The application scenario includes an audio capture device 102 and a terminal device 101. The terminal device may be a terminal device that needs to capture a sound signal, for example, a smartphone, a smartwatch, a television, an intelligent vehicle/vehicle-mounted terminal, a headset, a PC, a tablet computer, a notebook computer, a smart speaker, a robot, or a recording capture device. For example, the terminal device is configured to perform voice quality enhancement on a mobile phone, process a noisy voice signal captured by a microphone, and output a noise-reduced voice signal of a target user as an uplink signal for a voice call or an input signal for a voice wake-up or voice recognition engine.

Certainly, a sound signal may alternatively be captured by the audio capture device 102 connected to the terminal device in a wired or wireless manner. The audio capture device may be a smartwatch, a television, an intelligent vehicle/vehicle-mounted terminal, a headset, a PC, a tablet computer, a notebook computer, a recording capture device, or the like.

In an embodiment, the audio capture device 102 and the terminal device 101 are integrated.

Figure 2A:
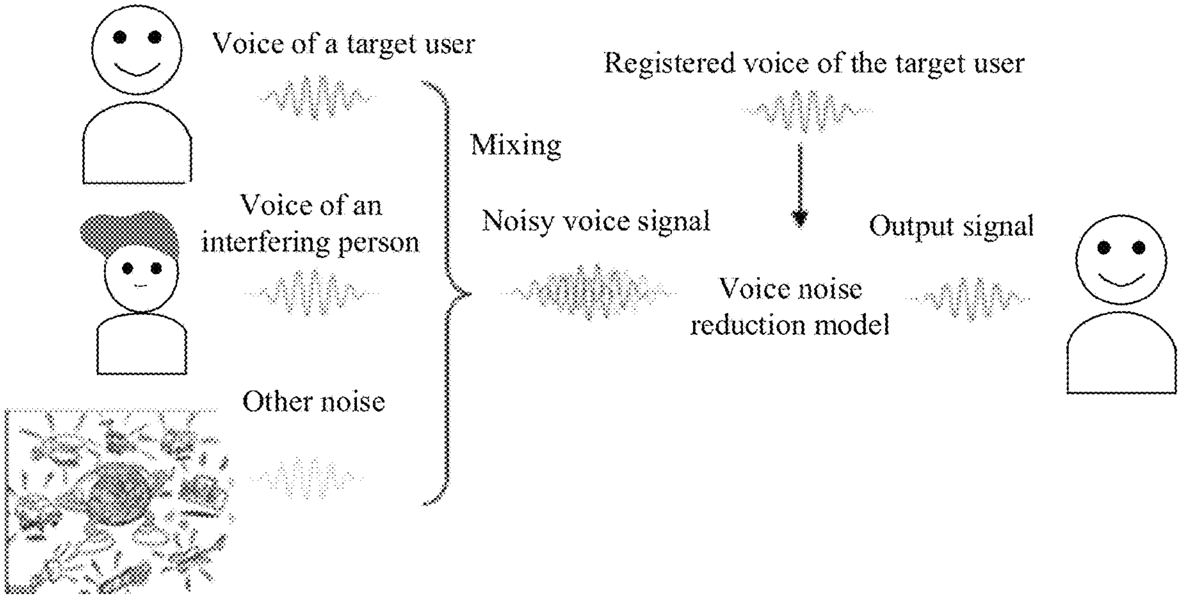
FIG. 2*a* is a schematic diagram of a voice noise reduction principle according to an embodiment of this application.
Figure 2B:
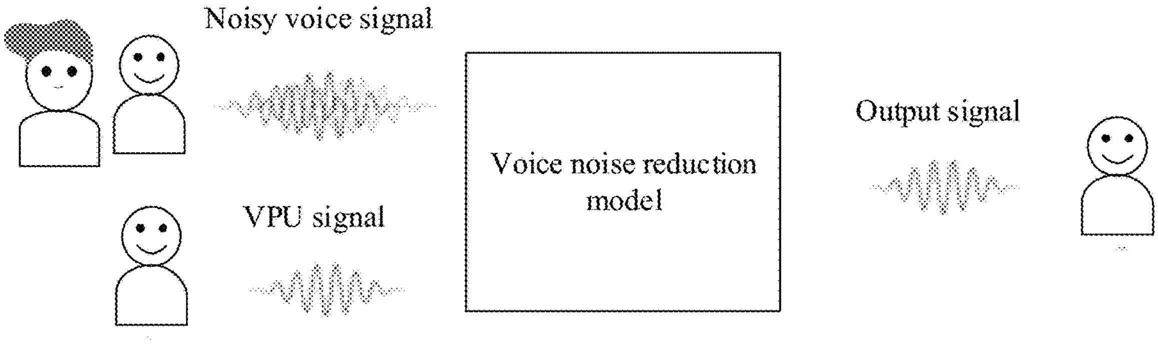
FIG. 2*b* is a schematic diagram of another voice noise reduction principle according to an embodiment of this application.

FIG. 2a and FIG. 2b show a voice noise reduction principle. As shown in FIG. 2a, after a noisy voice signal obtained by mixing voice of a target user, voice of an interfering person, and other noise is captured, the noisy voice signal and registered voice of the target user are input to a voice noise reduction model for processing, to obtain a noise-reduced voice signal of the target user. Alternatively, as shown in FIG. 2b, the noisy voice signal and a VPU signal of the target user are input to the voice noise reduction model for processing, to obtain a noise-reduced voice signal of the An enhanced voice signal may be used for a voice call or a voice wake-up or voice recognition function. For a private device (for example, a mobile phone, a PC, and various private wearable products), a target user is fixed. During a call or voice interaction, only voice information of the target user is retained as registered voice or a registered VPU signal, and then voice quality enhancement is performed in the foregoing manner. This can greatly improve user experience. For a limited public device (for example, in a smart home, in-vehicle, or conference room scenario), a user is also fixed, and voice quality enhancement may be performed through multi-user voice registration (the manner shown in FIG. 2a). This can improve experience in a multi-user scenario.

Figure 3:
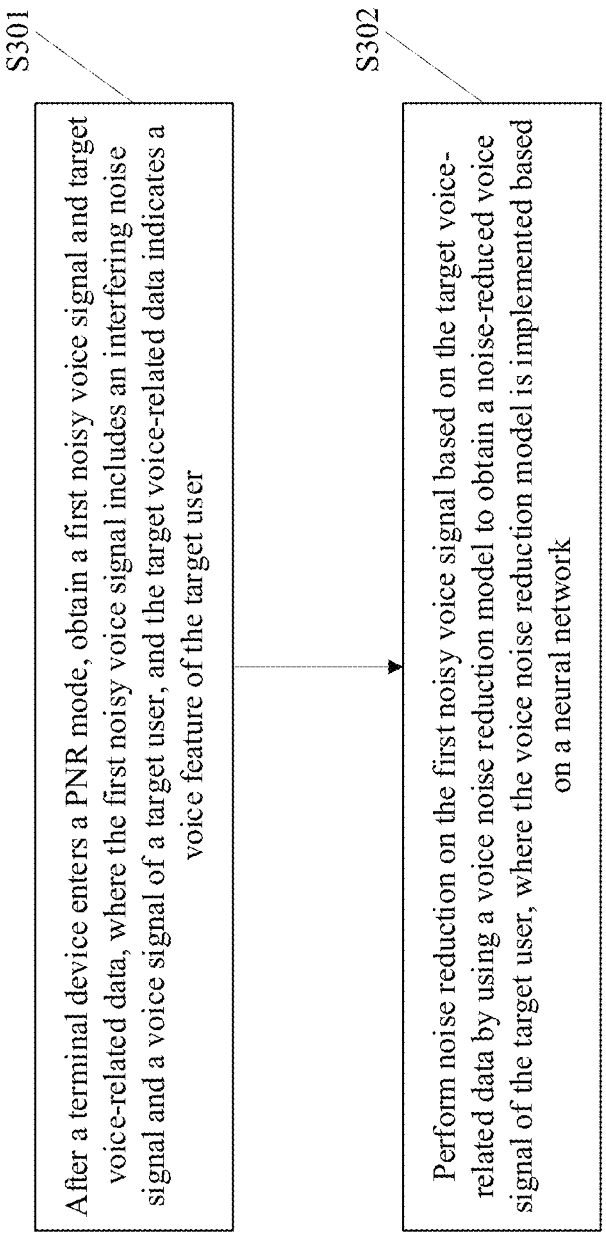
FIG. 3 is a schematic flowchart of a voice quality enhancement method according to an embodiment of this application.

FIG. 3 is a schematic flowchart of a voice quality enhancement method according to an embodiment of this application. As shown in FIG. 3, the method includes the following operations.

S301: After a terminal device enters a PNR mode, obtain a first noisy voice signal and target voice-related data, where the first noisy voice signal includes an interfering noise signal and a voice signal of a target user, and the target voice-related data indicates a voice feature of the target user.

In an embodiment, the target voice-related data may be a registered voice signal of the target user, a VPU signal of the target user, a voiceprint feature of the target user, video lip movement information of the target user, or the like.

In an example, a voice signal of the target user within preset duration in a quiet scenario is captured by a microphone. The voice signal is the registered voice signal of the target user. A sampling frequency of the microphone may be 16000 Hz. Assuming that the preset duration is 6 s, the registered voice signal of the target user includes 96000 sampling points. The quiet scenario means that a sound volume in the scenario is not greater than a preset decibel value. In an embodiment, the preset decibel value may be 1 dB, 2 dB, 5 dB, 10 dB, or another value.

In another example, the VPU signal of the target user is obtained by a device with a bone voiceprint sensor. A VPU sensor in the bone voiceprint sensor may pick up a sound signal of the target user that is transmitted through a bone. A difference from the signal captured by the microphone lies in that, in the VPU signal, only voice of the target user is picked up, and only a low-frequency (usually below 4 kHz) signal can be picked up.

The first noisy voice signal includes the voice signal of the target user and another noise signal. The another noise signal includes a voice signal of another user and/or a noise signal produced by a non-human object, for example, a noise signal produced by a car or a machine at a construction site.

S302: Perform noise reduction on the first noisy voice signal based on the target voice-related data by using a voice noise reduction model to obtain a noise-reduced voice signal of the target user, where the voice noise reduction model is implemented based on a neural network.

The voice noise reduction model has different network structures for different target voice-related data. In other words, the voice noise reduction model processes different target voice-related data in different manners. When the target voice-related data is registered voice of the target user or the video lip movement information of the target user, noise reduction may be performed on the target voice-related data and the first noisy voice signal by using a voice noise reduction model corresponding to a manner 1. When the target voice-related data includes the VPU signal of the target user, noise reduction may be performed on the target voice-related data and the first noisy voice signal by using a voice noise reduction model corresponding to a manner 2 or a manner 3. The following describes processing processes in the manner 1, the manner 2, and the manner 3.

The manner 1 is described by using an example in which the target voice-related data is the registered voice signal of the target user.

Figure 4:
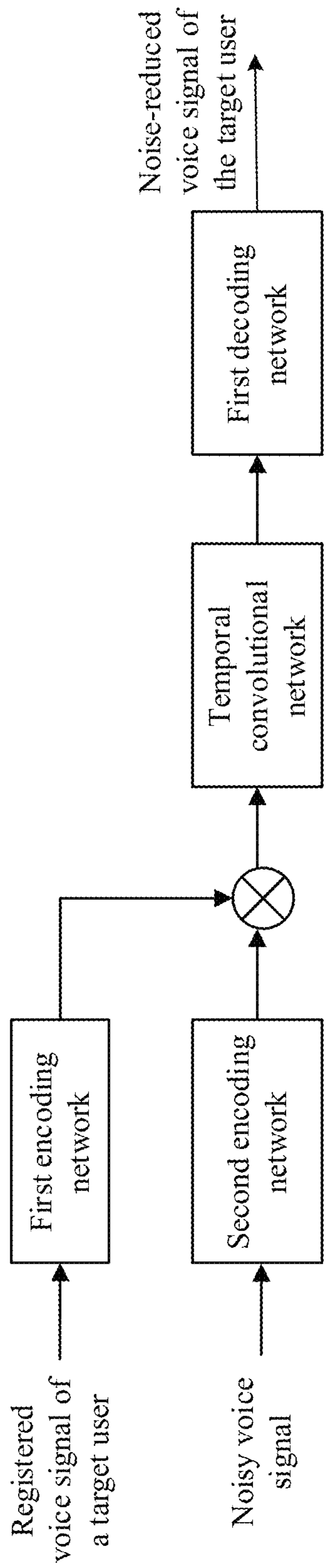
FIG. 4 is a schematic diagram of a structure of a voice noise reduction model according to an embodiment of this application.

Manner 1: As shown in FIG. 4, the performing noise reduction on the first noisy voice signal based on the target voice-related data by using a voice noise reduction model to obtain a noise-reduced voice signal of the target user includes the following operations:

extracting a feature vector of the registered voice signal of the target user from the registered voice signal by using a first encoding network; extracting a feature vector of the noisy voice signal from the noisy voice signal by using a second encoding network; obtaining a first feature vector based on the feature vector of the registered voice signal and the feature vector of the noisy voice signal, for example, a mathematical operation such as dot multiplication is performed on the feature vector of the registered voice signal and the feature vector of the noisy voice signal to obtain the first feature vector; processing the first feature vector by using a TCN to obtain a second feature vector; and then processing the second feature vector by using a first decoding network to obtain the noise-reduced voice signal of the target user. It can be learned from the foregoing descriptions that, in the manner 1, the voice noise reduction model includes the first encoding network, the second encoding network, the TCN, and the first decoding network.

Figure 5:
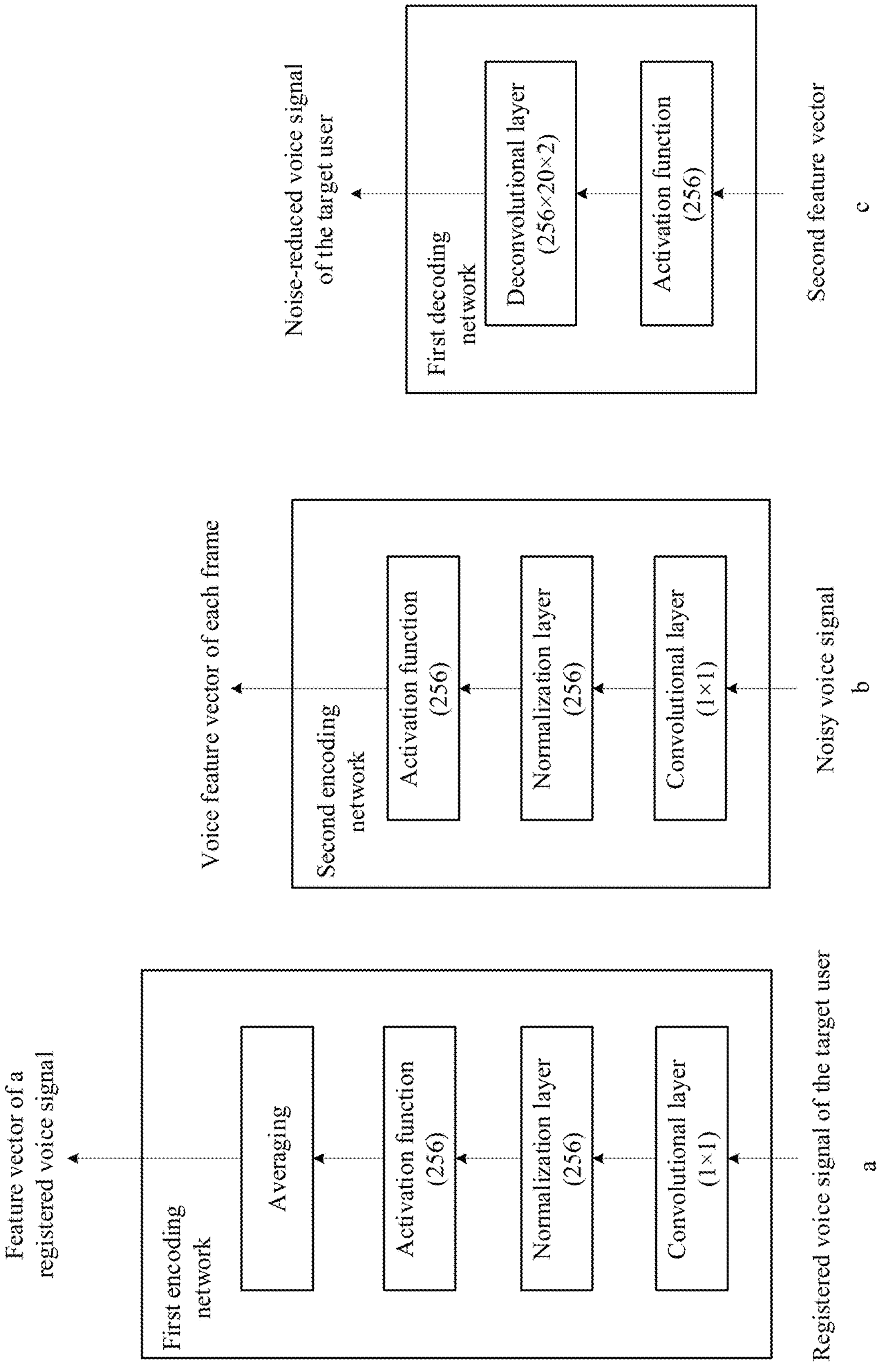
FIG. 5 is a schematic diagram of a structure of a voice noise reduction model according to an embodiment of this application.
Figure 6A:
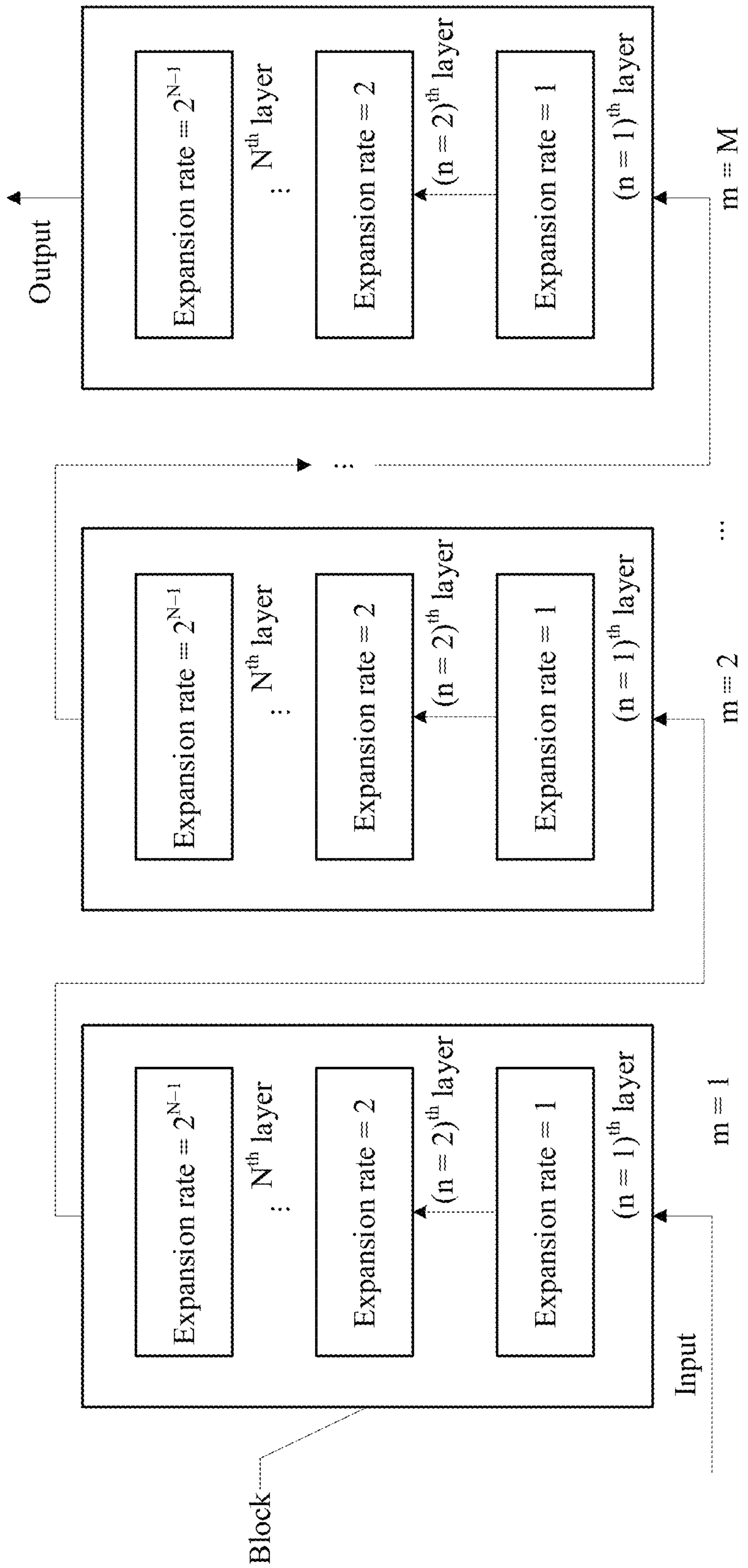
FIG. 6*a* shows a framework structure of a TCN model.
Figure 6B:
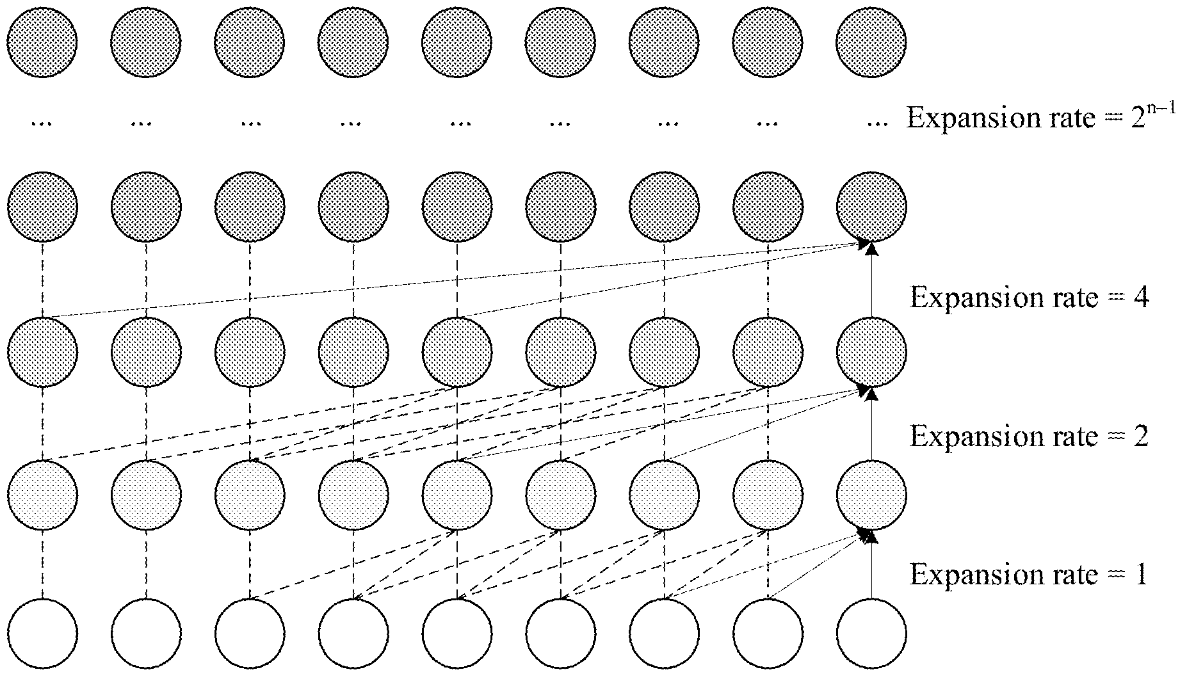
FIG. 6*b* shows a structure of a causal and dilated convolutional layer unit.

In an embodiment, as shown in a in FIG. 5, the first encoding network includes a convolutional layer, a normalization layer (256), an activation function PReLU (256), and an averaging layer. A size of a convolution kernel of the convolutional layer may be 1×1. With 40 sampling points as one frame, the registered voice with 96000 sampling points is input to the convolutional layer, the normalization layer, and the activation function PReLU to obtain a feature matrix with a size of 4800×256. An overlap rate of sampling points of two adjacent frames may be 50%, and certainly, the overlap rate may alternatively be another value. Then a mean of the feature matrix is calculated in a time dimension through the averaging layer, to obtain a feature vector, with a size of 1×256, of the registered voice signal. When the first noisy voice signal is captured by the microphone, with 20 sampling points as one frame, the first noisy voice signal is input to the second encoding network frame by frame for feature extraction, to obtain a voice feature vector of each frame. As shown in b in FIG. 5, the second encoding network includes a convolutional layer, a normalization layer, and an activation function. In an embodiment, with 20 sampling points as one frame, noisy voice is separately processed by the convolutional layer, the normalization layer, and the activation function to obtain a voice feature vector of each frame. A mathematical operation such as dot multiplication is performed on a target voice feature vector and the voice feature vector of each frame in the first noisy voice to obtain the first feature vector. In an embodiment, the mathematical operation may be the dot multiplication or another operation. A TCN model is a causal and dilated convolutional model. FIG. 6*a* shows a framework structure of the TCN model. As shown in FIG. 6*a*, the TCN model includes M blocks (block), and each block includes N causal and dilated convolutional layer units. FIG. 6*b* shows a structure of the causal and dilated convolutional layer unit, and a convolution expansion rate corresponding to an $n^{th}$ layer is $2^{n-1}$. In an embodiment, the TCN model includes five blocks, and each block includes four causal and dilated convolutional layer units. Therefore, in each block, expansion rates corresponding to layers 1, 2, 3, and 4 are 1, 2, 4, and 8 respectively, and a size of a convolution kernel is 3×1. The first feature vector is processed by the TCN model to obtain the second feature vector. Dimensions of the second feature vector are 1×. As shown in c in FIG. 5, the first decoding network includes an activation function PReLU (256) and a deconvolutional layer (256×20×2). The voice signal of the target user may be obtained by processing the second feature vector through the activation function and the deconvolutional layer. For a structure of the second encoding network, refer to the structure of the first encoding network. Compared with the first encoding network, the second encoding network does not have a function of averaging in a time dimension.

Herein, it should be noted herein that 256 in the normalization layer (256) and the activation function PReLU (256) indicates a quantity of dimensions of features output by the normalization layer and the activation function, and 256×20×2 in the deconvolutional layer (256×20×2) indicates a size of a convolution kernel used by the deconvolutional layer. The foregoing descriptions are merely an example, and are not intended to limit this application.

It should be noted that the video lip movement information of the target user includes a plurality of frames of images that include lip movement information of the target user. If the target voice-related data is the video lip movement information of the target user, the registered voice signal of the target user in the manner 1 is replaced with the video lip movement information of the target user, a feature vector of the video lip movement information of the target user is extracted by using the first encoding network, and then subsequent processing is performed according to the manner 1 described above.

The voice signal of the target user is registered in advance. Therefore, during subsequent voice interaction, the voice signal of the target user can be enhanced, and interfering voice and noise can be suppressed, to ensure that only the voice signal of the target user is input during voice wake-up and voice interaction. This improves effect and accuracy of voice wake-up and voice recognition. In addition, the voice noise reduction model is constructed by using the TCN causal and dilated convolutional network, so that the voice noise reduction model can output a voice signal with a low latency.

The manner 2 and the manner 3 are described by using an example in which the target voice-related data is the VPU signal of the target user.

Figure 7:
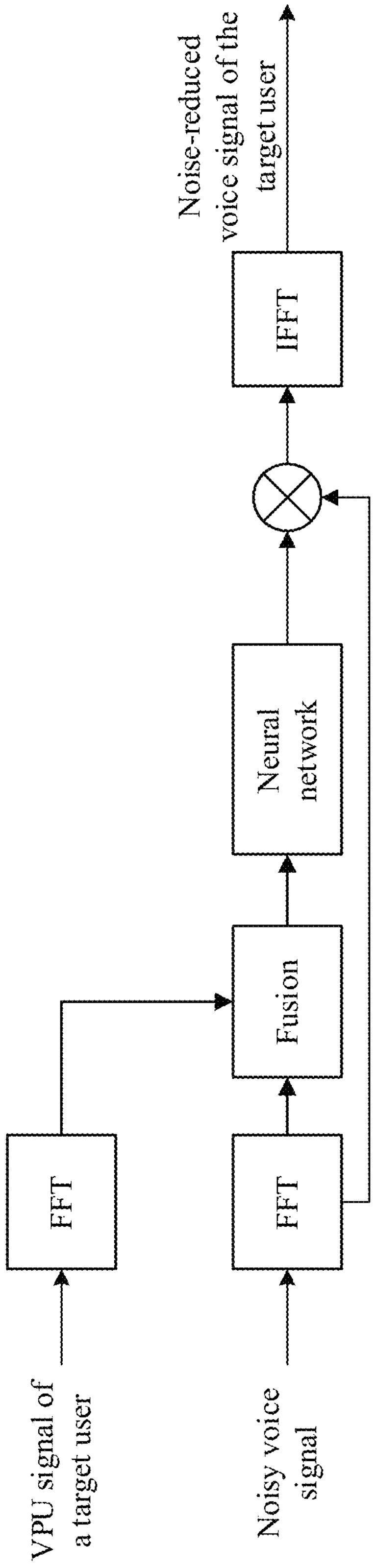
FIG. 7 is a schematic diagram of a structure of another voice noise reduction model according to an embodiment of this application.

Manner 2: As shown in FIG. 7, the performing noise reduction on the first noise-carrying voice signal based on the target voice-related data by using a voice noise reduction model to obtain a noise-reduced voice signal of the target user includes the following operations:

separately performing, by using a preprocessing module, time-to-frequency conversion on the VPU signal of the target user and the first noisy voice signal to obtain a frequency domain signal of the VPU signal of the target user and a frequency domain signal of the first noisy voice signal; performing fusion on the frequency domain signal of the VPU signal of the target user and the frequency domain signal of the first noisy voice signal to obtain a first fusion frequency domain signal; separately processing the first fusion frequency domain signal by using a third encoding network, a GRU, and a second decoding network to obtain a mask of a frequency domain signal of the voice signal of the target user; performing, by using a post-processing module, post-processing, such as dot multiplication in a mathematical operation, on the frequency domain signal of the first noisy voice signal based on the mask of the frequency domain signal of the voice signal of the target user to obtain the frequency domain signal of the voice signal of the target user; and performing frequency-to-time conversion on the frequency domain signal of the voice signal of the target user to obtain the noise-reduced voice signal of the target user. It can be learned from the foregoing descriptions that the voice noise reduction model in the manner 2 includes the preprocessing module, the third encoding network, the GRU, the second decoding network, and the post-processing module.

Figure 8:
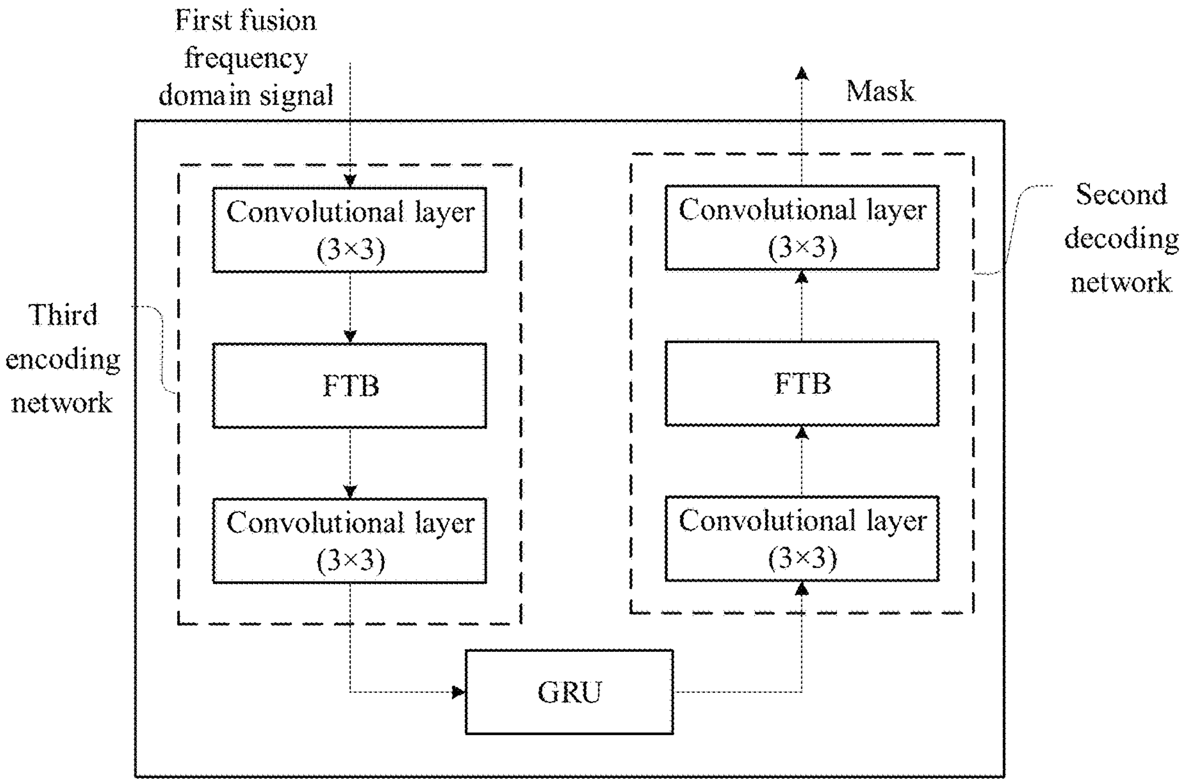
FIG. 8 is a schematic diagram of a structure of a neural network in FIG. 7.

In an embodiment, the preprocessing module separately performs fast Fourier transform (FFT) on the VPU signal of the target user and the first noisy voice signal to obtain the frequency domain signal of the VPU signal of the target user and the frequency domain signal of the first noisy voice signal; and the preprocessing module performs frequency-domain splicing and combination on the frequency domain signal of the VPU signal of the target user and the frequency domain signal of the first noise-carrying voice signal, or superposes a spectrum of the frequency domain signal of the VPU signal of the target user and a spectrum of the frequency domain signal of the first noisy voice signal, or performs a dot multiplication operation on the frequency domain signal of the VPU signal of the target user and the frequency domain signal of the first noisy voice signal, to obtain the first fusion frequency domain signal. For example, a frequency domain signal at 0 kHz to 1.5 kHz is extracted from the frequency domain signal of the VPU signal of the target user, a frequency domain signal at 1.5 kHz to 8 kHz is extracted from the frequency domain signal of the first noisy voice signal, and the extracted two frequency domain signals are directly spliced and combined in frequency domain to obtain the first fusion frequency domain signal. In this case, a frequency range of the first fusion frequency domain signal is 0 kHz to 8 kHz. As shown in FIG. 8, the first fusion frequency domain signal is input to the third encoding network for feature extraction to obtain a feature vector of the first fusion frequency domain signal; the feature vector of the first fusion frequency domain signal is input to the GRU for processing to obtain a third feature vector; and the third feature vector is input to the second decoding network for processing to obtain the mask (mask) of the frequency domain signal of the voice signal of the target user. As shown in FIG. 8, the third encoding network and the second decoding network each include two convolutional layers and one FTB. Sizes of convolution kernels of the convolutional layers are all 3×3. The post-processing module performs dot multiplication on the mask of the frequency domain signal of the voice signal of the target user and the frequency domain signal of the first noisy voice signal to obtain the frequency domain signal of the voice signal of the target user, and then performs inverse fast Fourier transform (IFFT) on the frequency domain signal of the voice signal of the target user to obtain the noise-reduced voice signal of the target user. The foregoing descriptions are merely an example, and are not intended to limit this application.

The VPU signal of the target user is used as auxiliary information for extracting a voice feature of the target user in real time. The feature is combined with the first noisy voice signal captured by the microphone to provide guidance for voice quality enhancement for the target user and suppression of interference such as voice of a non-target user. In addition, an embodiment further provides a new voice noise reduction model based on the FTB and the GRU for voice quality enhancement for the target user and suppression of interference such as voice of a non-target user. It can be learned that, in the solution of an embodiment, a user does not need to register voice feature information in advance, and a real-time VPU signal may be used as auxiliary information for obtaining enhanced target user voice and suppressing interference from non-target voice.

Manner 3: Time-to-frequency conversion is separately performed on the first noisy voice signal and an in-ear sound signal of the target user to obtain a frequency domain signal of the first noisy voice signal and a frequency domain signal of the sound signal of the target user. A covariance matrix of the first noisy voice signal and the in-ear sound signal of the target user is obtained based on the VPU signal of the target user and based on the frequency domain signal of the first noisy voice signal and the frequency domain signal of the in-ear sound signal of the target user respectively. A first MVDR weight is obtained based on the covariance matrix of the first noisy voice signal and the in-ear sound signal of the target user. A frequency domain signal of a first voice signal and a frequency domain signal of a second voice signal are obtained based on the first MVDR weight, the frequency domain signal of the first noisy voice signal, and the frequency domain signal of the in-ear sound signal of the target user, where the frequency domain signal of the first voice signal is correlated with the first noisy voice signal, and the frequency domain signal of the second voice signal is correlated with the in-ear sound signal of the target user. A frequency domain signal of the noise-reduced voice signal of the target user is obtained based on the frequency domain signal of the first voice signal and the frequency domain signal of the second voice signal. Frequency-to-time conversion is performed on the frequency domain signal of the noise-reduced voice signal of the target user to obtain the noise-reduced voice signal of the target user.

In an embodiment, a headset device with a bone voiceprint sensor is used. The device includes the bone voiceprint sensor, an in-ear microphone, and an out-of-ear microphone. A VPU sensor in the bone voiceprint sensor may pick up a sound signal of a speaker that is transmitted through a bone. The in-ear microphone is configured to pick up an in-ear sound signal. The out-of-ear microphone is configured to pick up an out-of-ear sound signal, namely, the first noisy voice signal in this application.

Figure 9:
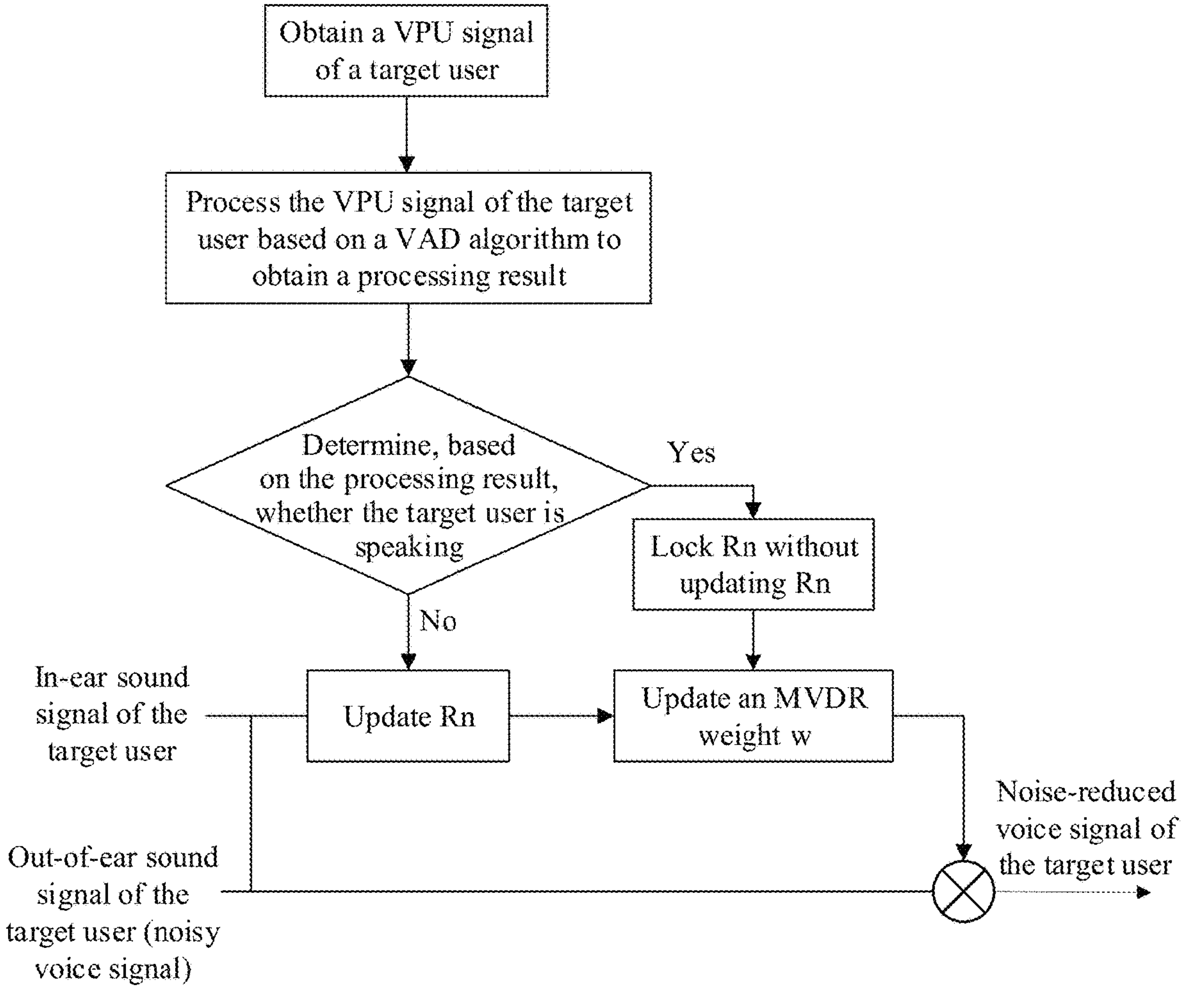
FIG. 9 is a schematic diagram of a voice noise reduction process according to an embodiment of this application.

As shown in FIG. 9, the VPU signal of the target user is processed by using a voice activity detection (VAD) algorithm to obtain a processing result. Whether the target user is speaking is determined based on the processing result. If it is determined that the target user is speaking, a first identifier is set to a first value (for example, 1 or true). If it is determined that the target user is not speaking, the first identifier is set to a second value (for example, 0 or false).

When a value of the first identifier is the second value, the covariance matrix is updated. This includes the following operations: Time-to-frequency conversion, for example, FFT, is separately performed on the first noisy voice signal and the in-ear sound signal of the target user to obtain the frequency domain signal of the first noisy voice signal and the frequency domain signal of the in-ear sound signal of the target user. Then the covariance matrix of the in-ear sound signal of the target user and the first noisy voice signal is calculated based on the frequency domain signal of the first noisy voice signal and the frequency domain signal of the in-ear sound signal of the target user, where the covariance matrix may be expressed as follows: $R_n(f)=X(f)X^H(f)$, where X(f) is a dual-channel channel frequency domain signal of the in-ear sound signal of the target user and the first noisy voice signal, $X^H(f)$ indicates Hermitian transformation of X(f) or conjugate transposition of X(f), and f is a frequency. Then an MVDR weight is obtained based on the covariance matrix, where the MVDR weight may be expressed as follows:

$$w_n(f,\theta_s)=\frac{R_n^{-1}(f)a(f,\theta_s)}{a^H(f,\theta_s)R_n^{-1}(f)a(f,\theta_s)},$$

where $a(f, \theta_s)=[a_1(f, \theta_s)a_2(f, \theta_s) \ldots a_M(f, \theta_s)]^T$ indicates a steering vector for a signal orientation $\theta_s$ corresponding to a frequency f, f is a frequency, $\theta_s$ is a target orientation, $\theta_s$ is a preset value, for example, 90 degrees in a vertical direction (a wearing posture of a headset and a mouth position are relatively fixed), M is a quantity of microphones, $a^H(f, \theta_s)$ indicates Hermitian transformation of $a(f, \theta_s)$, and $$R_n^{-1}(f)$$

is an inverse matrix of $R_n(f)$.

The frequency domain signal of the first voice signal and the frequency domain signal of the second voice signal are obtained based on the first MVDR weight, the frequency domain signal of the first noisy voice signal, and the frequency domain signal of the in-ear sound signal of the target user, where the frequency domain signal of the first voice signal is correlated with the first noisy voice signal, the frequency domain signal of the second voice signal is correlated with the in-ear sound signal of the target user, and the frequency domain signal of the first voice signal and the frequency domain signal of the second voice signal may be expressed as follows: $Y_n(f)=w_n(f, \theta_s)X_n(f)$. It should be noted that $w_n(f, \theta_s)$ includes two vectors that respectively correspond to the frequency domain signal of the first voice signal and the frequency domain signal of the second voice signal. Dot multiplication is performed on the frequency domain signal of the first noisy voice signal and the frequency domain signal of the in-ear sound signal of the target user with the two vectors respectively to obtain the frequency domain signal of the first voice signal and the frequency domain signal of the second voice signal. The frequency domain signal of the noise-reduced voice signal of the target user is obtained based on the frequency domain signal of the first voice signal and the frequency domain signal of the second voice signal. In an embodiment, the frequency domain signal of the first voice signal and the frequency domain signal of the second voice signal are added up frequency by frequency. In an embodiment, a $1^{st}$ frequency of the frequency domain signal of the first voice signal and a $1^{st}$ frequency of the frequency domain signal of the second voice signal are added up, and a $2^{nd}$ frequency of the frequency domain signal of the first voice signal and a $2^{nd}$ frequency of the frequency domain signal of the second voice signal are added up, until all corresponding frequencies of the frequency domain signal of the first voice signal and the frequency domain signal of the second voice signal are added up to obtain the frequency domain signal of the noise-reduced voice signal of the target user. IFFT is performed on the frequency domain signal of the noise-reduced voice signal of the target user to obtain the noise-reduced voice signal of the target user.

When a value of the first identifier is the first value, the covariance matrix is locked and not updated. In an embodiment, the first MVDR weight is calculated by using a historical covariance matrix.

In the manner 3, a user does not need to register voice feature information in advance, and a real-time VPU signal may be used as auxiliary information for obtaining an enhanced voice signal and suppressing interfering noise.

In an embodiment, to further enhance the noise-reduced voice signal of the target user, a voice quality enhancement coefficient for the target user is obtained, and enhancement is performed on the noise-reduced voice signal of the target user based on the voice quality enhancement coefficient for the target user to obtain an enhanced voice signal of the target user, where a ratio of an amplitude of the enhanced voice signal of the target user to an amplitude of the noise-reduced voice signal of the target user is the voice quality enhancement coefficient for the target user.

Because user experience is degraded if a voice signal of a user is output separately, the interfering noise signal is added to the voice signal of the target user to improve user experience. In an embodiment, for the voice noise reduction model in the manner 1 and the manner 2, during training, the decoding network (including the first decoding network and the second decoding network) in the voice noise reduction model may be enabled to not only transmit the enhanced voice signal of the target user, but also output the interfering noise signal. In the manner 3, after the noise-reduced voice signal of the target user is obtained, the interfering noise signal may be obtained by subtracting the noise-reduced voice signal of the target user from the first noisy voice signal.

In the manner 2, the second decoding network of the voice noise reduction model further outputs a mask of the frequency domain signal of the first noisy voice signal; and the post-processing module further performs post-processing, for example, dot multiplication, on the frequency domain signal of the first noisy voice signal based on the mask of the frequency domain signal of the first noisy voice signal to obtain a frequency domain signal of interfering noise, and then performs frequency-to-time conversion, for example, IFFT, on the frequency domain signal of the interfering noise to obtain the interfering noise signal.

In an embodiment, after the noise-reduced voice signal of the target user is obtained, the first noisy voice signal is processed based on the noise-reduced voice signal of the target user to obtain the interfering noise signal. In an embodiment, the interfering noise signal may be obtained by subtracting the noise-reduced voice signal of the target user from the first noisy voice signal.

In an embodiment, in the manner 1, the manner 2, or the manner 3, after the interfering noise signal is obtained, fusion is performed on the interfering noise signal and the enhanced voice signal of the target user to obtain an output signal, where the output signal is obtained by mixing the enhanced voice signal of the target user and the interfering noise signal.

Figure 10:
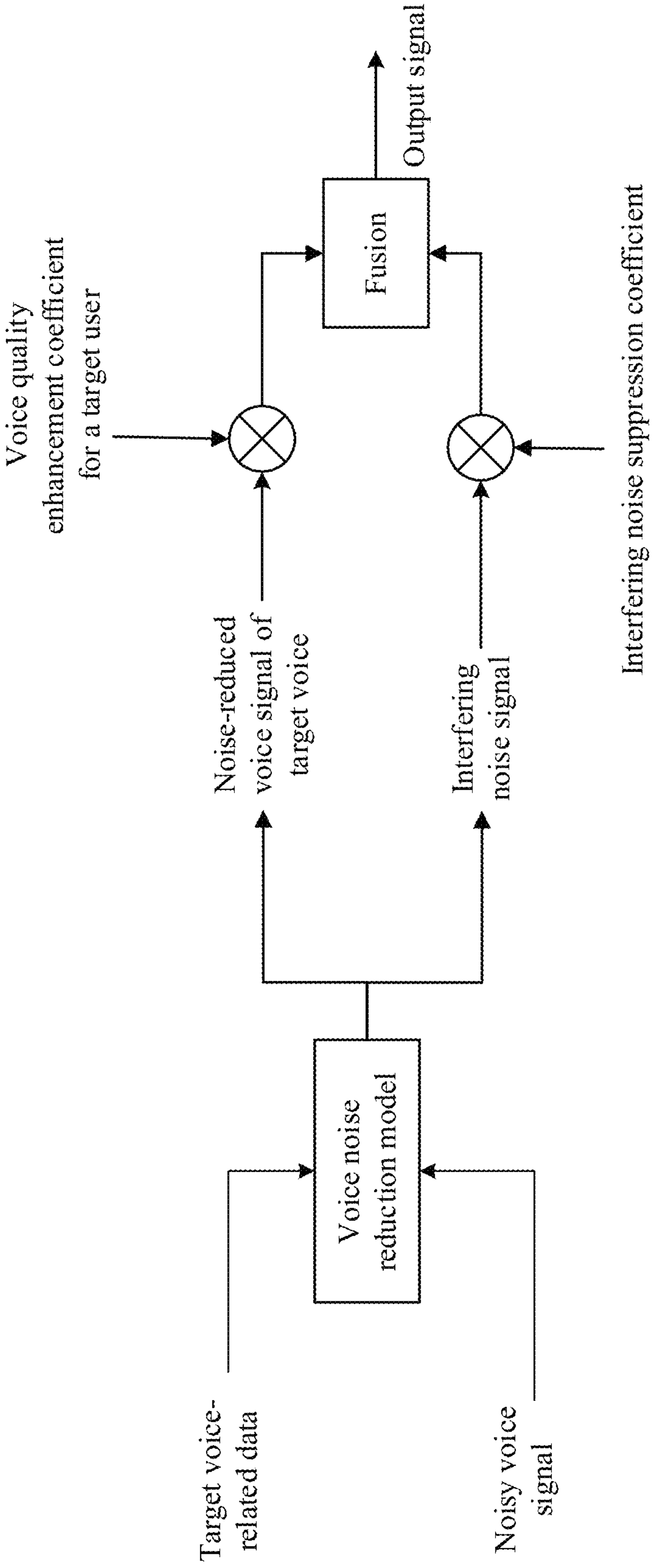
FIG. 10 is a schematic diagram of another voice noise reduction process according to an embodiment of this application.

Alternatively, as shown in FIG. 10, an interfering noise suppression coefficient is obtained, and suppression is performed on the interfering noise signal based on the interfering noise suppression coefficient to obtain an interfering noise-suppressed signal, where a ratio of an amplitude of the interfering noise-suppressed signal to an amplitude of the interfering noise is the interfering noise suppression coefficient; and then fusion is performed on the interfering noise-suppressed signal and the enhanced voice signal of the target user to obtain the output signal, where the output signal is obtained by mixing the enhanced voice signal of the target user and the interfering noise-suppressed signal.

Alternatively, an interfering noise suppression coefficient is obtained, and suppression is performed on the interfering noise signal based on the interfering noise suppression coefficient to obtain an interfering noise-suppressed signal; and then fusion is performed on the interfering noise-suppressed signal and the noise-reduced voice signal of the target user to obtain the output signal. The output signal is obtained by mixing the noise-reduced voice signal of the target user and the interfering noise-suppressed signal.

The interfering noise suppression coefficient $\alpha$ and a target voice quality enhancement coefficient $\beta$ may be preset in a system, for example, $\alpha=0$, and $\beta=1$; or may be set by a user. For example, the user may set the interfering noise suppression coefficient $\alpha$ and the target voice quality enhancement coefficient $\beta$ on a UI interface of the terminal device.

In a conference or video call scenario, there may be a plurality of participants, and voice quality enhancement may need to be performed on more than one target user. Therefore, a manner 4, a manner 5, and a manner 6 may be used for multi-user voice quality enhancement.

There are M target users. The target voice-related data includes related data of the M target users. The noise-reduced voice signal of the target user includes noise-reduced voice signals of the M target users. The voice quality enhancement coefficient for the target user includes voice quality enhancement coefficients for the M target users. The first noisy voice signal includes voice signals of the M target users and the interfering noise signal.

Figure 11:
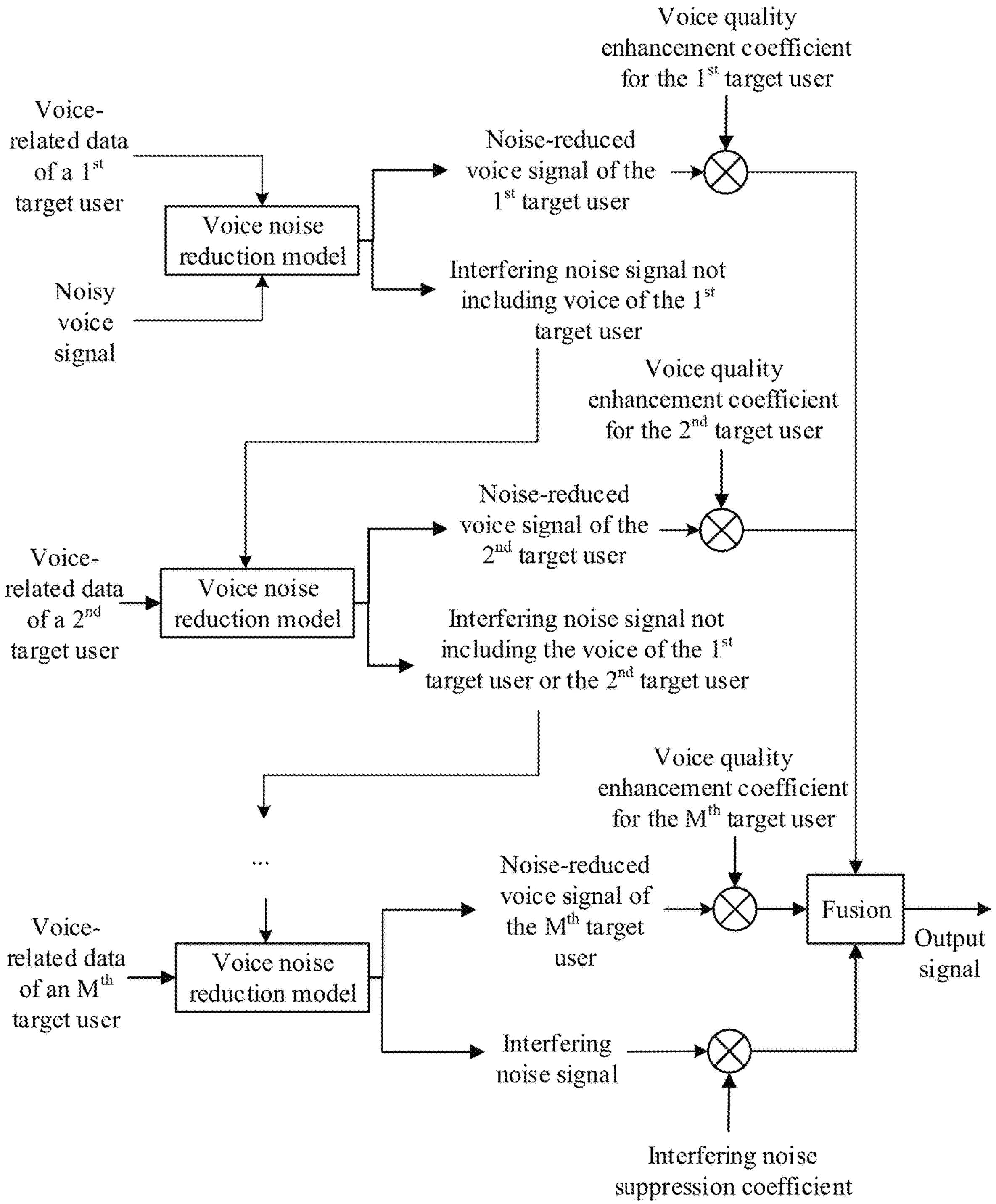
FIG. 11 is a schematic diagram of a multi-user voice noise reduction process according to an embodiment of this application.

Manner 4: As shown in FIG. 11, voice-related data of a $1^{st}$ target user of the M target users and the first noisy voice signal are input to the voice noise reduction model for noise reduction to obtain a noise-reduced voice signal of the $1^{st}$ target user and a first noisy voice signal that does not include a voice signal of the $1^{st}$ target user. Then voice-related data of a $2^{nd}$ target user and the first noisy voice signal that does not include the voice signal of the $1^{st}$ target user are input to the voice noise reduction model for noise reduction to obtain a noise-reduced voice signal of the $2^{nd}$ target user and a first noisy voice signal that does not include the voice signal of the $1^{st}$ target user or a voice signal of the $2^{nd}$ target user. The foregoing operations are repeated until voice-related data of an $M^{th}$ target user and a first noisy voice signal that does not include voice of the $1^{st}$ to an $(M-1)^{th}$ target user are input to the voice noise reduction model for noise reduction to obtain a noise-reduced voice signal of the $M^{th}$ target user and the interfering noise signal, where the interfering noise signal is a first noisy voice signal that does not include voice signals of the $1^{st}$ to the $M^{th}$ target users. Enhancement is performed on noise-reduced voice signals of the M target users based on voice quality enhancement coefficients for the M target users respectively to obtain enhanced voice signals of the M target users, where for any target user O of the M target users, a ratio of an amplitude of an enhanced voice signal of the target user O to an amplitude of a noise-reduced voice signal of the target user is a voice quality enhancement coefficient for the target user O. Suppression is performed on the interfering noise signal based on the interfering noise suppression coefficient to obtain an interfering noise-suppressed signal, where a ratio of an amplitude of the interfering noise-suppressed signal to an amplitude of the interfering noise signal is the interfering noise suppression coefficient. Fusion is performed on the enhanced voice signals of the M target users and the interfering noise-suppressed signal to obtain the output signal. The output signal is obtained by mixing the enhanced voice signals of the M target users and the interfering noise-suppressed signal.

For the voice noise reduction model in the manner 4, when the voice-related data of the M target users is a registered voice signal or video lip movement information, a structure of the voice noise reduction model in the manner 4 may be the structure described in the manner 1; or when the voice-related data of the M target users is a VPU signal, a structure of the voice noise reduction model in the manner 4 may be the structure described in the manner 2, or the voice noise reduction model in the manner 4 implements the functions described in the manner 3.

In an example, after the noise-reduced voice signals of the M target users and the interfering noise signal are obtained according to the manner 4, fusion is directly performed on the noise-reduced voice signals of the M target users and the interfering noise signal to obtain the output signal. The output signal is obtained by mixing the noise-reduced voice signals of the M target users and the interfering noise signal.

Figure 12:
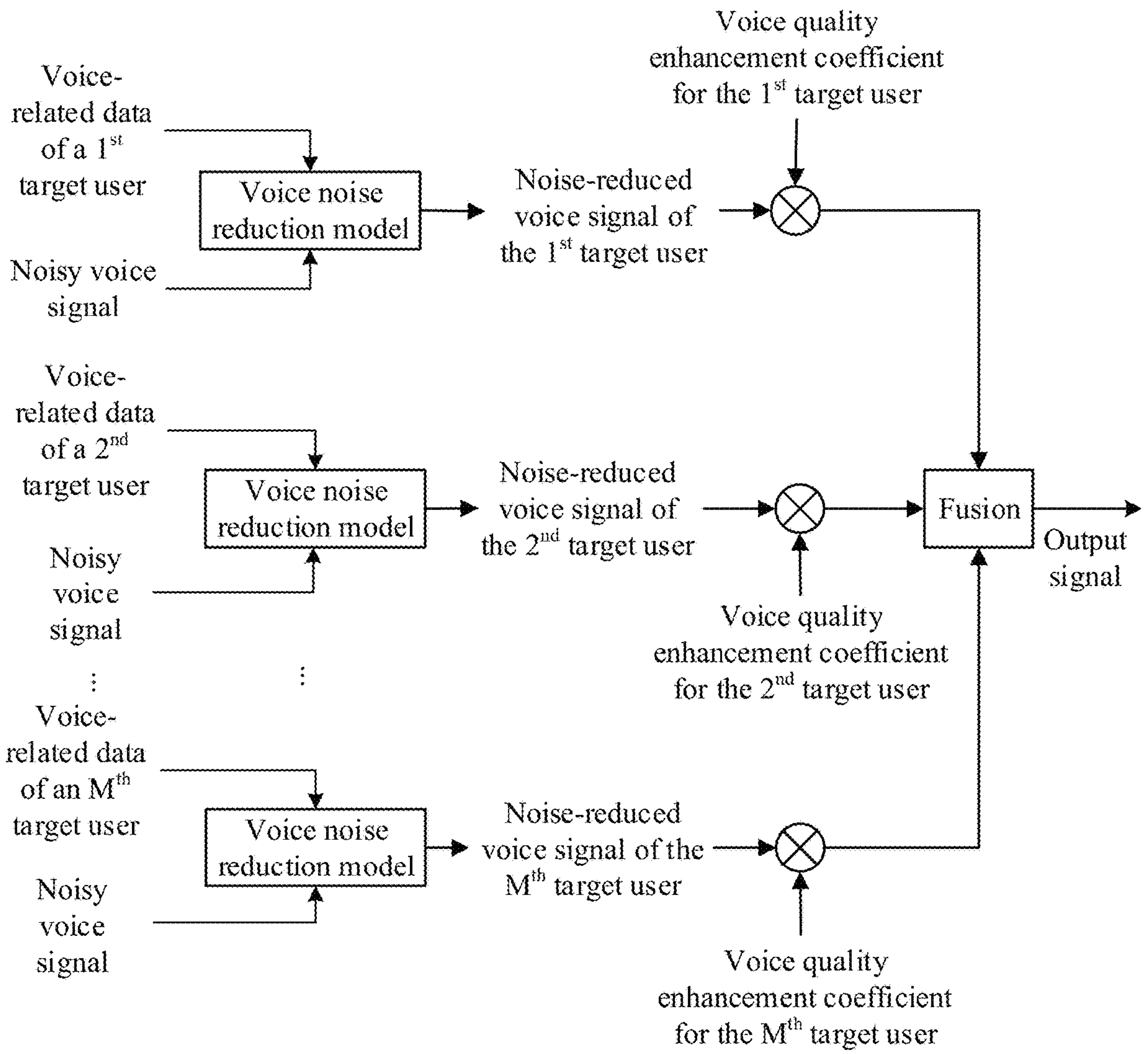
FIG. 12 is a schematic diagram of a multi-user voice noise reduction process according to an embodiment of this application.

Manner 5: There are M target users. As shown in FIG. 12, voice-related data of a $1^{st}$ target user of the M target users and the first noisy voice signal are input to the voice noise reduction model for noise reduction to obtain a noise-reduced voice signal of the $1^{st}$ target user. Voice-related data of a $2^{nd}$ target user and the first noisy voice signal are input to the voice noise reduction model for noise reduction to obtain a noise-reduced voice signal of the $2^{nd}$ target user. The foregoing operations are repeated until voice-related data of an $M^{th}$ target user and the first noisy voice signal are input to the voice noise reduction model for noise reduction to obtain a noise-reduced voice signal of the $M^{th}$ target user. Enhancement is performed on noise-reduced voice signals of the M target users based on voice quality enhancement coefficients for the M target users respectively to obtain enhanced voice signals of the M target users, where for any target user 0 of the M target users, a ratio of an amplitude of an enhanced voice signal of the target user 0 to an amplitude of a noise-reduced voice signal of the target user 0 is a voice quality enhancement coefficient for the target user 0. Fusion is performed on the enhanced voice signals of the M target users to obtain the output signal. The output signal is obtained by mixing the enhanced voice signals of the M target users.

It should be understood that the voice-related data of the M target users and the first noisy voice signal are input to the voice noise reduction model in parallel. Therefore, the foregoing actions may be performed in parallel.

For the voice noise reduction model in the manner 5, when the voice-related data of the M target users is a registered voice signal or video lip movement information, a structure of the voice noise reduction model in the manner 5 may be the structure described in the manner 1; or when the voice-related data of the M target users is a VPU signal, a structure of the voice noise reduction model in the manner 5 may be the structure described in the manner 2, or the voice noise reduction model in the manner 5 implements the functions described in the manner 3.

In an example, after the enhanced voice signals of the M target users are obtained by using the voice noise reduction model, fusion may be directly performed on the enhanced voice signals of the M target users to obtain the output signal. The output signal is obtained by mixing the enhanced voice signals of the M target users.

Figure 13:
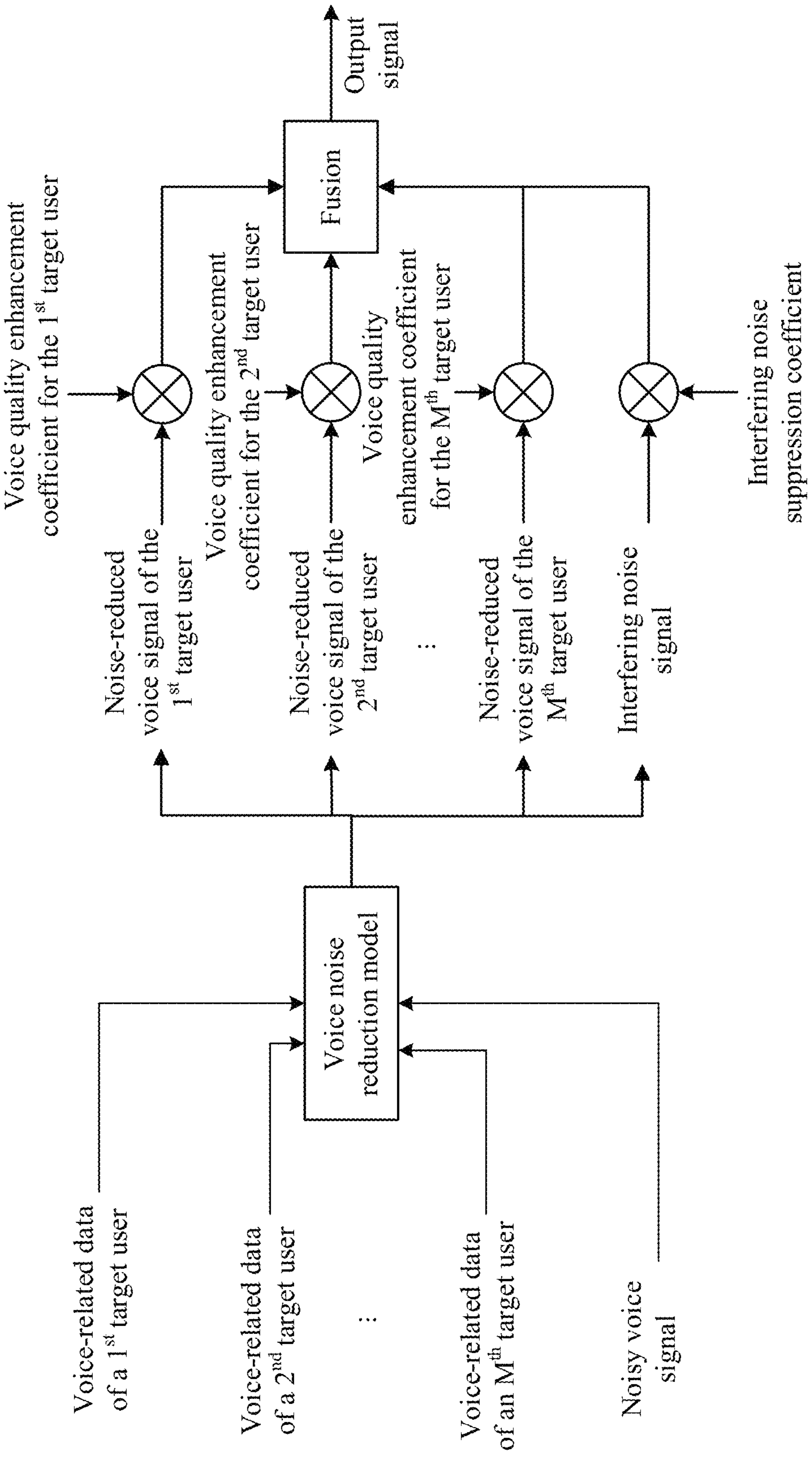
FIG. 13 is a schematic diagram of a multi-user voice noise reduction process according to an embodiment of this application.

Manner 6: As shown in FIG. 13, the voice-related data of the M target users and the first noisy voice signal are input to the voice noise reduction model for noise reduction to obtain noise-reduced voice signals of the M target users. Enhancement is performed on the noise-reduced voice signals of the M target users based on voice quality enhancement coefficients for the M target users respectively to obtain enhanced voice signals of the M target users, where for any target user O of the M target users, a ratio of an amplitude of an enhanced voice signal of the target user O to an amplitude of a noise-reduced voice signal of the target user O is a voice quality enhancement coefficient for the target user O. Suppression is performed on the interfering noise signal based on the interfering noise suppression coefficient to obtain an interfering noise-suppressed signal, where a ratio of an amplitude of the interfering noise-suppressed signal to an amplitude of the interfering noise signal is the interfering noise suppression coefficient. Fusion is performed on the enhanced voice signals of the M target users and the interfering noise-suppressed signal to obtain the output signal. The output signal is obtained by mixing the enhanced voice signals of the M target users and the interfering noise-suppressed signal.

Figure 14:
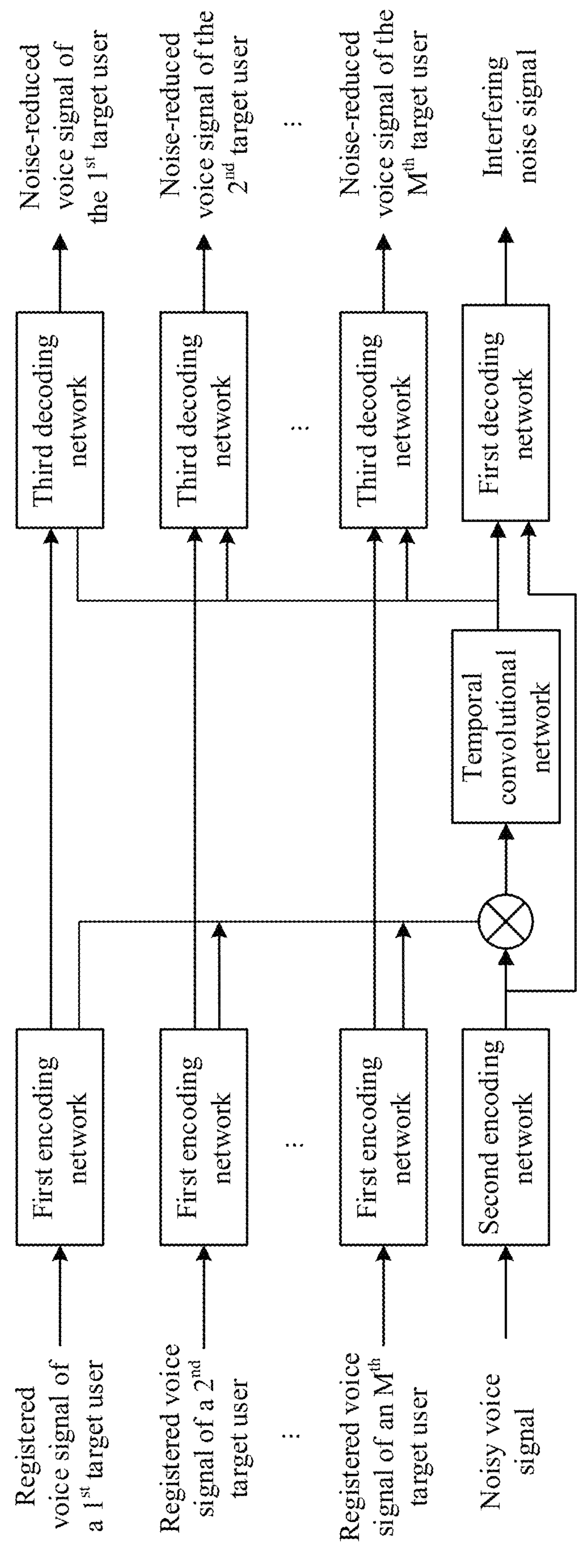
FIG. 14 is a schematic diagram of a structure of another voice noise reduction model according to an embodiment of this application.

Further, the voice noise reduction model in the manner 6 is shown in FIG. 14. The voice noise reduction model includes M first encoding networks, a second encoding network, a TCN, and a first decoding network. Features of registered voice signals of the M target users are extracted by using the M first encoding networks respectively to obtain feature vectors of the registered voice signals of the M target users. A feature of the first noisy voice signal is extracted by using the second encoding network to obtain a feature vector of the first noisy voice signal. A mathematical operation such as dot multiplication is performed on the feature vectors of the registered voice signals of the M target users and the feature vector of the first noisy voice signal to obtain a first feature vector. The first feature vector is processed by using the TCN to obtain a second feature vector. Processing is performed by using the first decoding network to obtain the noise-reduced voice signals of the target users and the interfering noise signal.

It should be noted that, during a multi-user remote conference or call, there may be a plurality of users at one end, and each user wears a headset. A VPU signal of each user may be captured by the headset, and then noise reduction is performed according to the foregoing solution of performing noise reduction based on a VPU signal.

In an embodiment, the interfering noise suppression coefficient may be a default value, or may be set by the target user according to a requirement of the target user. For example, as shown in a diagram on the left of FIG. 15, after a PNR function is enabled on the terminal device, the terminal device enters the PNR mode. A display interface of the terminal device displays a stepless sliding control shown in a diagram on the right of FIG. 15. The target user adjusts the interfering noise suppression coefficient by controlling a gray knob on the stepless sliding control, where a value range of the interfering noise suppression coefficient is [0, 1]. When the gray knob is controlled to slide to the leftmost, the interfering noise suppression coefficient is 0, indicating that the PNR mode is not enabled and interfering noise is not suppressed. When the gray knob is controlled to slide to the rightmost, the interfering noise suppression coefficient is 1, indicating that interfering noise is completely suppressed. When the gray knob is controlled to slide to the middle, it indicates that interfering noise is not completely suppressed.

The interfering noise suppression coefficient is adjusted to adjust a degree of noise reduction.

Figure 15:
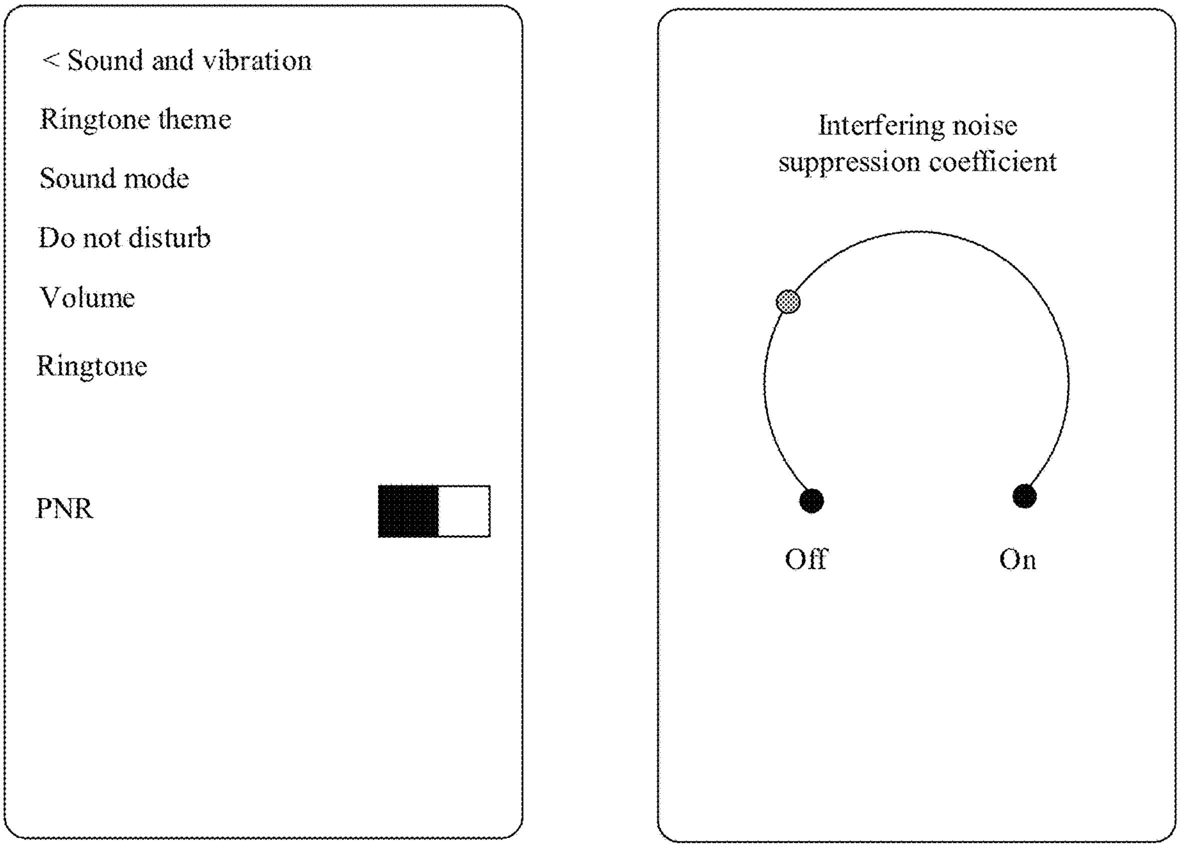
FIG. 15 is a schematic diagram of a UI interface according to an embodiment of this application.

In an embodiment, the stepless sliding control may be in a disc shape shown in FIG. 15, in a bar shape, or in another shape. This is not limited herein.

Herein, it should be noted that the voice quality enhancement coefficient may also be adjusted in the foregoing manner.

In an embodiment, whether noise reduction is to be performed by using a conventional noise reduction algorithm or by using the noise reduction method disclosed in this application may be determined in the following manner. The method in this application further includes:

obtaining a first noise segment and a second noise segment of an environment in which the terminal device is located, where the first noise segment and the second noise segment are continuous in time; obtaining an SNR and an SPL of the first noise segment; if the SNR of the first noise segment is greater than a first threshold and the SPL of the first noise segment is greater than a second threshold, extracting a first temporary feature vector of the first noise segment; performing noise reduction on the second noise segment based on the first temporary voice feature vector of the first noise segment to obtain a second noise-reduced noise segment; performing distortion evaluation based on the second noise-reduced noise segment and the second noise segment to obtain a first distortion score; and if the first distortion score is not greater than a third threshold, entering the PNR mode, determining the first noisy voice signal from a noise signal generated after the first noise segment, and using the first temporary feature vector as the feature vector of the registered voice signal.

Further, if the first distortion score is not greater than the third threshold, the terminal device sends a first prompt message to the target user, where the first prompt information prompts the target user whether to enable the terminal device to enter the PNR mode. The terminal device enters the PNR mode only after an operation instruction indicating that the target user allows the terminal device to enter the PNR mode is detected.

In an embodiment, when a user uses the terminal device for the first time, a default microphone of the terminal device captures a voice signal, and processes the captured voice signal by using the conventional noise reduction algorithm to obtain a noise-reduced voice signal of the user. In addition, the terminal device obtains, based on a preset cycle (for example, every 10 minutes), a first noise segment (for example, a 6 s voice signal currently captured by the microphone) and a second noise segment (for example, a 10 s voice signal after the 6 s voice signal currently captured by the microphone) of an environment in which the terminal device is located, and obtains an SNR and an SPL of the first noise segment; determines whether the SNR of the first noise segment is greater than 20 dB and whether the SPL is greater than 40 dB; if the SNR of the first noise segment is greater than the first threshold (for example, 20 dB) and the SPL is greater than the second threshold (for example, 40 dB), extracts a first temporary feature vector of the first noise segment; performs noise reduction on the second noise segment by using the first temporary feature vector to obtain a second noise-reduced noise segment; and performs distortion evaluation based on the second noise-reduced noise segment and the second noise segment to obtain a first distortion score, where the first distortion score indicates a degree of distortion of the signal captured by the microphone of the terminal device, and a higher first distortion score indicates a higher degree of distortion. If the first distortion score is not greater than the third threshold, it indicates that the voice signal captured by the microphone is not distorted, and the terminal device sends first prompt information to the user, where the first prompt information prompts the user whether to enable the terminal device to enter the PNR mode. The prompt information may be voice information, may be text information displayed on a display of the terminal device, or certainly may be information in another form. This is not limited herein. The terminal device detects an instruction of the user for the prompt information, where the instruction may be a voice instruction, a touch instruction, a gesture instruction, or the like; and if the instruction indicates that the user does not agree to enter the PNR mode, continues to perform noise reduction by using the conventional noise reduction algorithm; or if the instruction indicates that the user agrees to enter the PNR mode, enters the PNR mode after the user finishes a current sentence, determines the first noisy voice signal from a noise signal generated after the first noise segment, for example, obtains the first noisy voice signal from the second noise segment or a noise signal captured after the second noise segment, and stores the first temporary feature vector as the feature vector of the registered voice signal. If the first distortion score is greater than the third threshold, the terminal device re-obtains a first noise segment and a second noise segment at an interval of the preset cycle, and repeatedly performs the foregoing operations.

The determining the first noisy voice signal from a noise signal generated after the first noise segment may be understood as that the first noisy voice signal is some or all of noise signals generated after the first noise segment.

In an embodiment, the distortion score may be a signal-to-distortion ratio (SDR) value or a perceptual evaluation of speech quality (PESQ) value.

In an embodiment, the method in this application further includes:

obtaining a third noise segment if the SNR of the first noise segment is not greater than the first threshold or the SPL of the first noise segment is not greater than the second threshold and a reference temporary voiceprint feature vector is stored on the terminal device; performing noise reduction on the third noise segment based on the reference temporary voiceprint feature vector to obtain a third noise-reduced noise segment; performing distortion evaluation based on the third noise segment and the third noise-reduced noise segment to obtain a third distortion score; if the third distortion score is greater than a sixth threshold and an SNR of the third noise segment is less than a seventh threshold, or the third distortion score is greater than an eighth threshold and the SNR of the third noise segment is not less than the seventh threshold, sending third prompt information by using the terminal device, where the third prompt information is used to notify a current user that the terminal device is able to enter the PNR mode; and after an operation instruction indicating that the current user agrees to enter the PNR mode is detected, enabling the terminal device to enter the PNR mode to perform noise reduction on a fourth noisy voice signal; or after an operation instruction indicating that the current user does not agree to enter the PNR mode is detected, performing noise reduction on the fourth noisy voice signal in a non-PNR mode, where the fourth noisy voice signal is determined from a noise signal generated after the third noise segment.

In an embodiment, if the SNR of the first noise segment is not greater than the first threshold or the SPL of the first noise segment is not greater than the second threshold, that is, in a scenario in which a target voice feature cannot be extracted during a current call, if voiceprint information (for example, a voiceprint feature vector) of a historical user is stored on the terminal device and the terminal device detects that an input signal includes continuous voice (that is, VAD=1) longer than 2 seconds, the terminal device captures the voice signal to obtain the third noise segment; performs noise reduction on the third noise segment based on the stored voiceprint feature vector of the historical user to obtain the third noise-reduced noise segment; and performs distortion evaluation based on the third noise segment and the third noise-reduced noise segment to obtain the third distortion score. When the third distortion score is greater than the sixth threshold (for example, 8 dB) and the SNR of the third noise segment is less than the seventh threshold (for example, 10 dB), or when the third distortion score is greater than the eighth threshold (for example, 12 dB) and the SNR of the third noise segment is not less than the seventh threshold, it indicates that a voiceprint feature of the current user matches a stored sound feature, and the terminal device sends the third prompt information to the user, where the third prompt information prompts the current user whether to enable the terminal device to enter the PNR mode. The third prompt information may be voice information, may be text information displayed on the display of the terminal device, or certainly may be information in another form. This is not limited herein. The terminal device detects an instruction of the user for the prompt information, where the instruction may be a voice instruction, a touch instruction, a gesture instruction, or the like. If an operation instruction indicating that the current user agrees to enable the PNR function of the terminal device, the terminal device enters the PNR mode to perform noise reduction on the fourth noisy voice signal, where the fourth noisy voice signal is obtained after the third noise segment. If an operation instruction indicating that the current user does not agree to enable the PNR function of the terminal device, the terminal device continues to perform noise reduction on the fourth noisy voice signal by using the conventional noise reduction algorithm.

In an embodiment, the method in this application further includes:

when it is detected that the terminal device is used again, obtaining a second noisy voice signal, and performing noise reduction on the second noisy voice signal by using the conventional noise reduction algorithm, that is, in a non-PNR mode, to obtain a noise-reduced voice signal of a current user; determining whether an SNR of the second noisy voice signal is less than a fourth threshold; when the SNR of the second noisy voice signal is less than a fourth threshold, performing voice noise reduction on the second noisy voice signal based on the first temporary feature vector to obtain a noise-reduced voice signal of the current user; performing distortion evaluation based on the noise-reduced voice signal of the current user and the second noisy voice signal to obtain a second distortion score; when the second distortion score is not greater than a fifth threshold, sending second prompt information to the current user by using the terminal device, where the second prompt information is used to notify the current user that the terminal device is able to enter the PNR mode; and after an operation instruction indicating that the current user allows the terminal device to enter the PNR mode is detected, entering the PNR mode to perform noise reduction on the third noisy voice signal, where the third noisy voice signal is obtained after the second noisy voice signal; or after an operation instruction indicating that the current user does not agree to enter the PNR mode is detected, continuing to perform noise reduction on the third noisy voice signal by using the conventional noise reduction algorithm.

In an embodiment, when it is detected that the terminal device is used again for a call, the default microphone of the terminal device captures the second noisy voice signal, processes the second noisy voice signal by using the conventional noise reduction algorithm, and outputs the noise-reduced voice signal of the current user. In addition, whether a current environment is noisy is determined. In an embodiment, whether the SNR of the second noisy voice signal is less than the fourth threshold is determined. When the SNR of the second noisy voice signal is less than the fourth threshold (for example, the SNR is less than 10 dB), it indicates that the current environment is noisy. Noise reduction is performed on the second noisy voice signal based on the noise reduction algorithm of this application by using a previously stored voice feature (namely, the first temporary feature vector) to obtain the noise-reduced voice signal of the current user. Distortion evaluation is performed based on the noise-reduced voice signal of the current user and the second noisy voice signal to obtain the second distortion score. For a process, refer to the foregoing method. Details are not described herein again. If the second score is less than the fifth threshold, it indicates that the current user matches a voice feature indicated by the stored first temporary feature vector. The terminal device sends the second prompt information to the current user, where the second prompt information is used to notify the current user that the PNR call function of the terminal device can be enabled. If an operation instruction indicating that the current user agrees to enable the PNR function of the terminal device, the terminal device enters the PNR mode to perform noise reduction on the third noisy voice signal, where the third noisy voice signal is obtained after the second noisy voice signal. If an operation instruction indicating that the current user does not agree to enable the PNR function of the terminal device, the terminal device continues to perform noise reduction on the third noisy voice signal by using the conventional noise reduction algorithm.

In an embodiment, whether noise reduction is to be performed by using a conventional noise reduction algorithm or by using the noise reduction method disclosed in this application may be determined in the following manner. The method in this application further includes:

obtaining a first noise segment and a second noise segment of an environment in which the terminal device is located, where the first noise segment and the second noise segment are continuous noise segments in time; obtaining a signal captured by a microphone array of an auxiliary device of the terminal device in the environment in which the terminal device is located; calculating a DOA and an SPL of the first noise segment by using the captured signal; if the DOA of the first noise segment is greater than a ninth threshold and less than a tenth threshold and the SPL of the first noise segment is greater than an eleventh threshold, extracting a second temporary feature vector of the first noise segment; performing noise reduction on the second noise segment based on the second temporary feature vector to obtain a fourth noise-reduced noise segment; performing distortion evaluation based on the fourth noise-reduced noise segment and the second noise segment to obtain a fourth distortion score; and entering the PNR mode if the fourth distortion score is not greater than a twelfth threshold; and the obtaining a first noisy voice signal includes:

determining the first noisy voice signal from a noise signal generated after the first noise segment, where the feature vector of the registered voice signal includes the second temporary feature vector.

The calculating a DOA and an SPL of the first noise segment by using the captured signal may include:

performing time-to-frequency conversion on the signal captured by the microphone array to obtain a nineteenth frequency domain signal, and calculating the DOA and the SPL of the first noise segment based on the nineteenth frequency domain signal.

Further, if the fourth distortion score is not greater than the twelfth threshold, the method in this application further includes:

sending fourth prompt information by using the terminal device, where the fourth prompt information indicates whether to enable the terminal device to enter the PNR mode; and entering the PNR mode only after an operation instruction indicating that the target user agrees to enter the PNR mode is detected.

In a scenario, the terminal device may be connected to a computer (an example of the auxiliary device) in a wired or wireless manner. A microphone array of the computer captures a signal in the environment in which the terminal device is located. Then the terminal device obtains the signal captured by the microphone array, and performs processing in the foregoing manner. Details are not described herein again.

Herein, it should be noted that, after extracting the first temporary feature vector or the second temporary feature vector, the terminal device stores the first temporary feature vector or the second temporary feature vector, and directly obtains the first temporary feature vector or the second temporary feature vector subsequently when the first temporary feature vector or the second temporary feature vector needs to be used. This avoids a case that a voice feature of a current user cannot be obtained subsequently in a scenario with large noise, and consequently, distortion evaluation cannot be performed.

This application discloses a plurality of noise reduction manners. In different scenarios, whether to enter the PNR mode may be determined based on scenario information, a target user or object is automatically recognized, and a corresponding noise reduction manner is selected.

When it is detected that the terminal device is in a handheld call state, the terminal device does not enter the PNR mode.

When it is detected that the terminal device is in a hands-free call state, the terminal device enters the PNR mode, and a terminal device owner whose voiceprint feature has been registered is a target user. At-second voice signal of a current user during a call is obtained for voiceprint recognition. A recognition result is compared with the registered voiceprint feature. If it is determined that the current user is not the terminal device owner, the obtained t-second voice signal of the current user during the call is used as a registered voice signal of the user, the current user is regarded as a target user, and noise reduction is performed in the manner described in the manner 1, where t may be 3 or another value.

When it is detected that the terminal device is in a video call state, the terminal device enters the PNR mode. In addition, when the terminal device is in a video call, the terminal device performs facial recognition on an image captured by a camera to determine an identity of a current user in the image. If the image includes a plurality of persons, a person closest to the camera is regarded as a current user. A distance between the person in the image and the camera may be determined by a sensor, such as a depth sensor, on the terminal device. After the current user is determined, the terminal device detects whether registered voice of the current user or a voice feature of the current user is stored. If registered voice of the current user or a voice feature of the current user is stored, the current user is determined as a target user, and the registered voice or the voice feature of the current user is used as voice-related data of the current user. If no registered voice or voice feature of the current user is stored on the terminal device, the terminal device detects, by using a lip shape detection method, whether the current user is speaking; and when detecting that the current user is speaking, captures a voice signal of the current user from a voice signal captured by the microphone, and uses the voice signal of the current user as registered voice of the current user. The registered voice of the current user may be obtained by connecting a plurality of segments of signals in series, and total duration is not less than 6 s. The microphone of the terminal device obtains a first noisy voice signal, and noise reduction is performed in the manner described in the manner 1 or the manner 4.

When it is detected that the terminal device is connected to a headset and the terminal device is in a call state, the terminal device enters the PNR mode. In addition, the terminal device detects whether the headset has a bone voiceprint sensor. If the headset has a bone voiceprint sensor, a VPU signal of a target user is captured through the bone voiceprint sensor of the headset, and noise reduction is performed in the manner described in the manner 2, the manner 3, or the manner 4. If the headset does not have a bone voiceprint sensor, a user whose voice signal has been registered with the headset is regarded as a target user by default, registered voice of the user and a first noisy voice signal captured by the headset are sent to the terminal device, and the terminal device performs noise reduction in the manner described in the manner 1 or the manner 4. If no voice signal of any person is registered with the headset, a microphone of the headset obtains call voice of a user who is currently wearing the headset, some segments of the voice are used as registered voice of the user, the registered voice and the first noisy voice signal captured by the headset are sent to the terminal device, and the terminal device performs noise reduction in the manner described in the manner 1 or the manner 4.

When it is detected that the terminal device is connected to an intelligent device (for example, a smart large-screen device, a smartwatch, or a vehicle-mounted Bluetooth device) and is in a video call state, the terminal device enters the PNR mode, and whether a registered voice signal of a current user is stored on the terminal device is determined.

If a registered voice signal of the current user is stored on the terminal device, the smart device captures a first noisy voice signal, and sends the first noisy voice signal to the terminal device, and the terminal device performs noise reduction in the manner described in the manner 1 or the manner 4.

In an embodiment, because the PNR is mainly used in an environment with strong noise, but a user is not necessarily always in an environment with strong noise, an interface for the user to set a PNR function of a function or a application during use of the function or during execution of the application may be provided. The application may be any application that needs a voice quality enhancement function, for example, Call, Voice assistant, MeeTime, or Recorder. The function may be any function in which local voice needs to be recorded, for example, call answering, video recording, or use of a voice assistant. As shown in a diagram on the left of FIG. 16, three function labels and three PNR control buttons corresponding to the three function labels are displayed on a display interface of the terminal device. The user may control disabling and enabling of PNR functions of three functions by using the three PNR control buttons respectively. As shown in a diagram on the left of FIG. 16, PNR functions corresponding to Call and Voice assistant are enabled, and a PNR function of Video Recording is disabled. As shown in the diagram on the right of FIG. 16, five application labels and five PNR control buttons corresponding to the five application labels are displayed on a display interface of the terminal device. The user may control disabling and enabling of PNR functions of five applications by using the five PNR control buttons respectively. As shown in the diagram on the right in FIG. 16, PNR functions of Changba, Recorder, and MeeTime are enabled, and PNR functions of Call and WeChat are disabled. It should be noted that, for example, the PNR function of Call is enabled, and the terminal device directly enters the PNR mode when the user makes a call by using the terminal device. In the foregoing manner, the user can flexibly specify whether to enable PNR functions for different voice functions of the terminal device.

Figure 17:
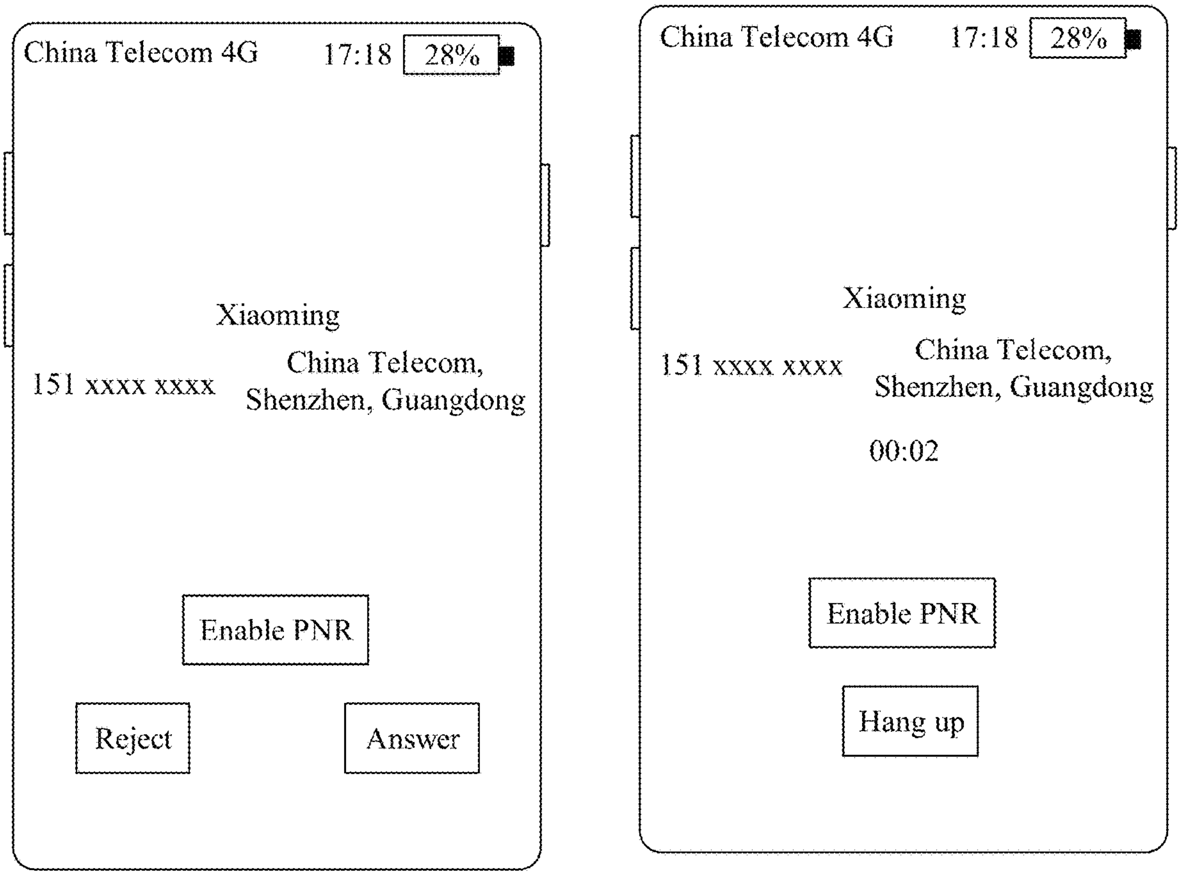
FIG. 17 is a schematic diagram of another UI interface according to an embodiment of this application.

FIG. 17 shows a display interface of the terminal device by using the "Call" application and the "call answering" function as an example. The interface provides a switch for enabling a PNR function, for example, an "Enable PNR" function button in FIG. 17. A diagram on the left of FIG. 17 is a schematic diagram of a display interface of the terminal device that is displayed when there is an incoming call. Information about a caller, an "Enable PNR" function button, a "Reject" function button, and an "Answer" function button are displayed on the display interface. A diagram on the right of FIG. 17 is a schematic diagram of a display interface of the terminal device that is displayed when a call is answered. The information about the caller, an "Enable PNR" function button, and a "Hang up" function button are displayed on the display interface.

Herein, it should be noted that some functions of the terminal device in this application are essentially functions of an application installed on the terminal device. For example, a call function of the terminal device is implemented through a "Phone" application.

In an embodiment, after detecting an operation performed by the target user on an "Enable PNR" function button on a call interface (the interface shown in FIG. 17), the display interface of the terminal device switches to the interface shown in the diagram on the left of FIG. 15. The target user may adjust a value of the interfering noise suppression coefficient by controlling the gray knob in FIG. 15, to adjust a degree of noise reduction.

Figure 16:
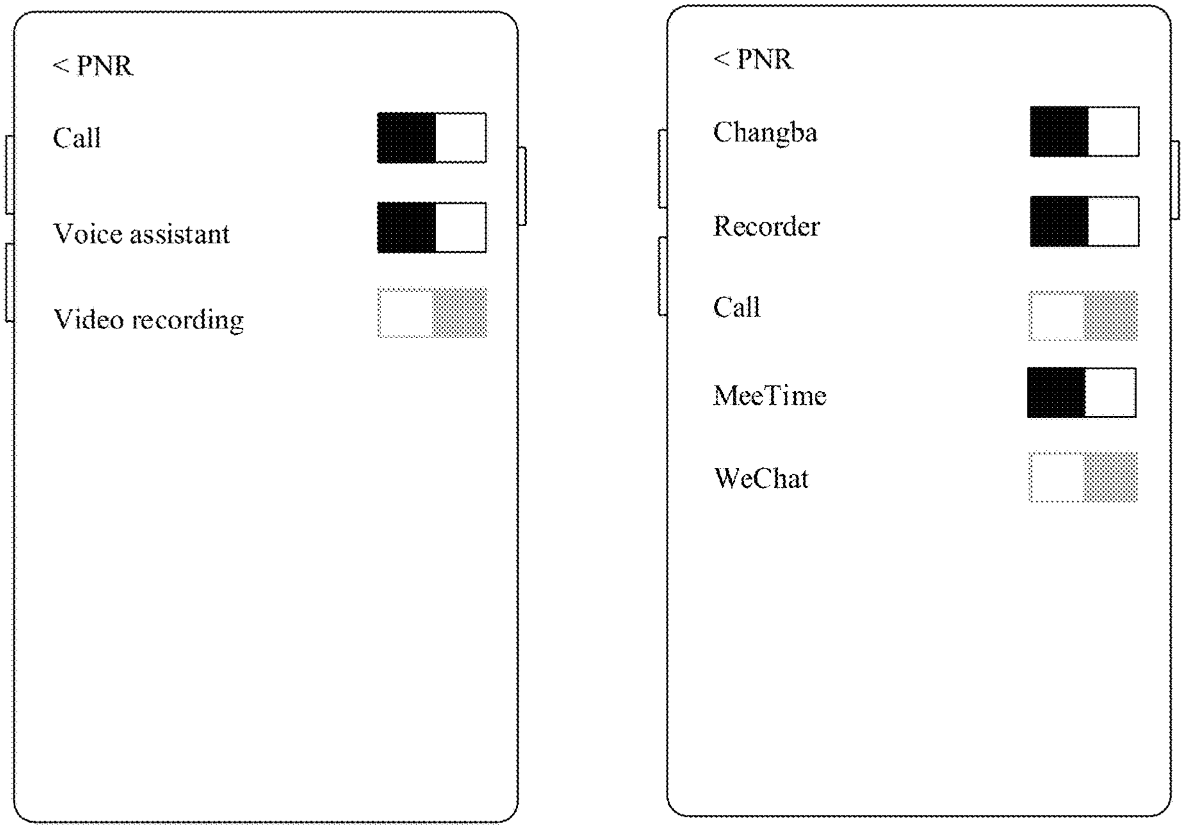
FIG. 16 is a schematic diagram of another UI interface according to an embodiment of this application.

On the UI interface displayed in FIG. 16, the target user can flexibly enable or disable a PNR function of a function or application according to a requirement of the target user.

In an embodiment, to reduce user operations, this application further includes: determining whether a decibel value of current ambient sound exceeds a preset decibel value (for example, 50 dB), or detecting whether current ambient sound includes sound of a non-target user; and enabling a PNR function if it is determined that the decibel value of the current ambient sound exceeds the preset decibel value or sound of a non-target user is detected in the current ambient sound. If noise reduction needs to be performed when the target user uses the terminal device, the terminal device directly enters the PNR mode. In other words, a corresponding PNR function may be enabled for a function or application of the terminal device in the foregoing manner.

Figure 18:
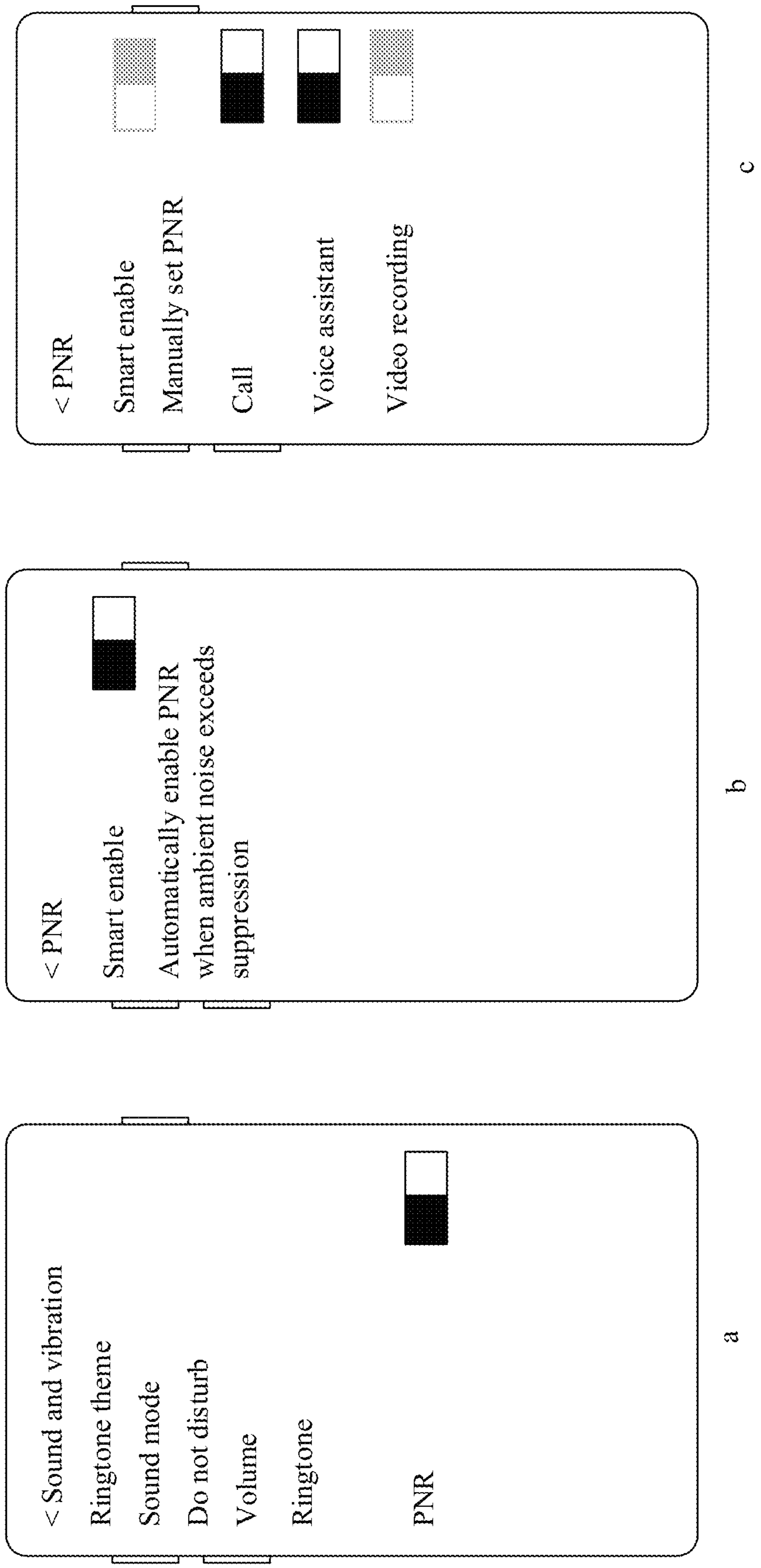
FIG. 18 is a schematic diagram of another UI interface according to an embodiment of this application.

Further, when the target user taps PNR shown in a in FIG. 18, a PNR settings interface is displayed. The target user may enable a "Smart enable" function for PNR by using a "Smart enable" switch function button shown in b in FIG. 18. After the Smart enable function for PNR is enabled, a PNR function may be enabled for a function or application of the terminal device in the foregoing manner. When the "Smart enable" function for PNR is disabled, content shown in c in FIG. 18 is displayed on the display interface of the terminal device. The target user may enable or disable a PNR function of a function or application according to a requirement by using a PNR function button corresponding to the function or application.

A smart PNR function is enabled in the foregoing manner, so that the terminal device is more intelligent, user operations are reduced, and user experience is better.

In an embodiment, in a call scenario, after the terminal device (namely, a local device) enables a PNR function, only a peer user is aware of call effect achieved after the PNR function is enabled. It is difficult for the target user to determine whether the PNR function should be enabled or whether a specified degree of noise reduction can enable the peer user to hear clearly, and whether the PNR function of the terminal device is to be enabled or a degree of noise reduction is set by a peer device.

After the peer device (namely, another terminal device) detects an operation of enabling the PNR function of the terminal device by the user of the peer device, the peer device sends a voice quality enhancement request to the terminal device, where the voice quality enhancement request requests to enable a PNR function of a call function of the terminal device. After receiving the voice quality enhancement request, the terminal device displays a reminder label, namely, the third prompt information, on the display interface of the terminal device in response to the voice quality enhancement request. The reminder label is used to notify the target user that the peer device requests to enable the PNR function of the call function of the local device, and prompts the target user whether to enable the terminal device to enable the PNR function of the call function. The reminder label further includes an OK function button. After detecting an operation performed by the target user on the OK function button, the terminal device enables the PNR function of the call function, enters the PNR mode, and sends a response message to the peer device. The response message is used to respond to the voice quality enhancement request, and the response message is used to notify the peer device that the PNR function of the terminal device is enabled. After receiving the response message, the peer device displays a prompt label on a display interface of the peer device. The prompt label indicates that the user using the peer device has enhanced voice quality of the target user.

In an embodiment, after the terminal device (namely, the local device) enables the PNR function of the call, the peer device sends the interfering noise suppression coefficient to the terminal device, to adjust the degree of noise reduction of the terminal device; or the voice quality enhancement request sent by the peer device to the terminal device carries the interfering noise suppression coefficient. In an embodiment, when the peer device sends the interfering noise suppression coefficient to the terminal device, the peer device further sends the voice quality enhancement coefficient for the target user to the terminal device.

Figure 19:
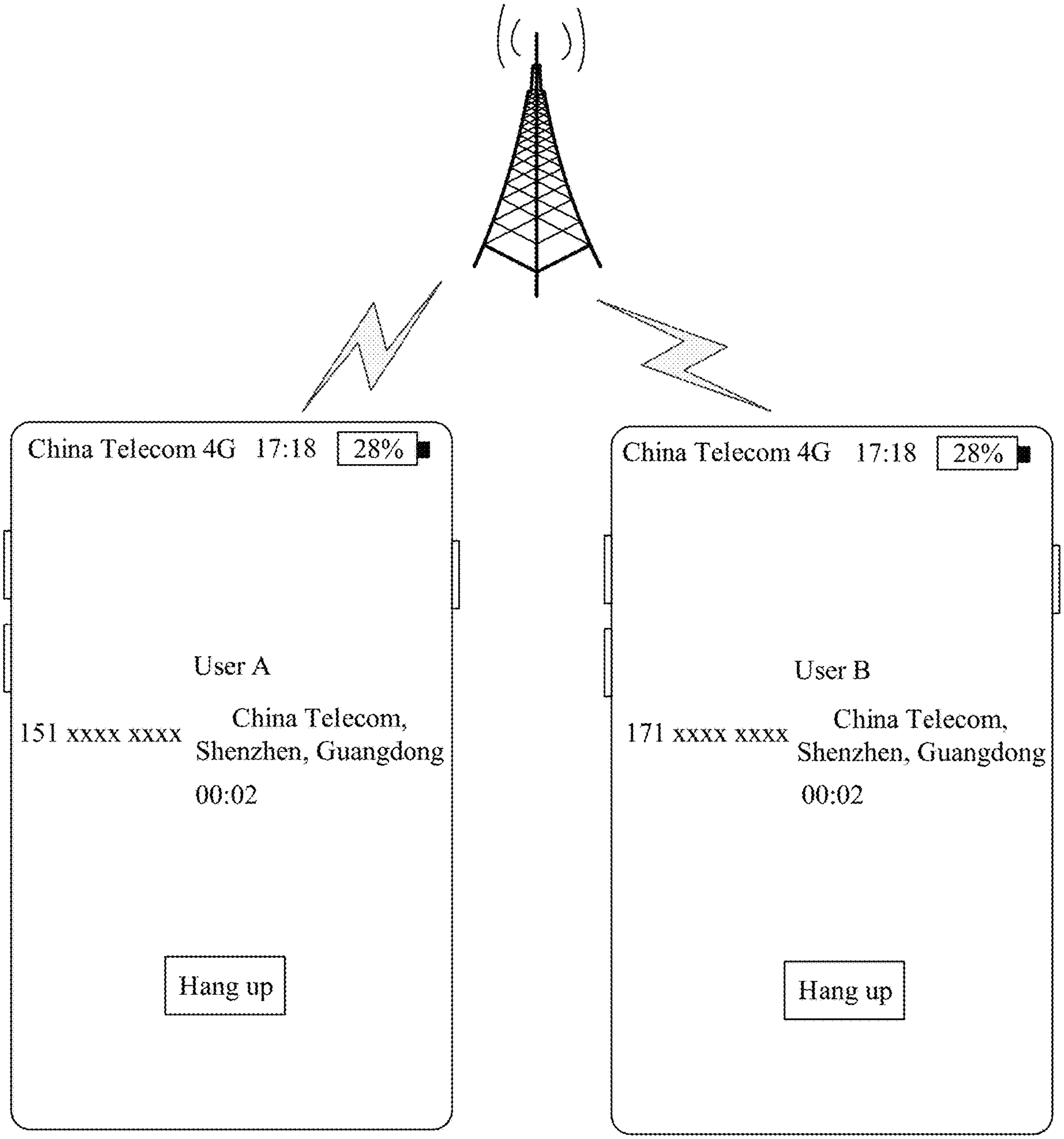
FIG. 19 is a schematic diagram of a UI interface in a call scenario according to an embodiment of this application.
Figure 20:
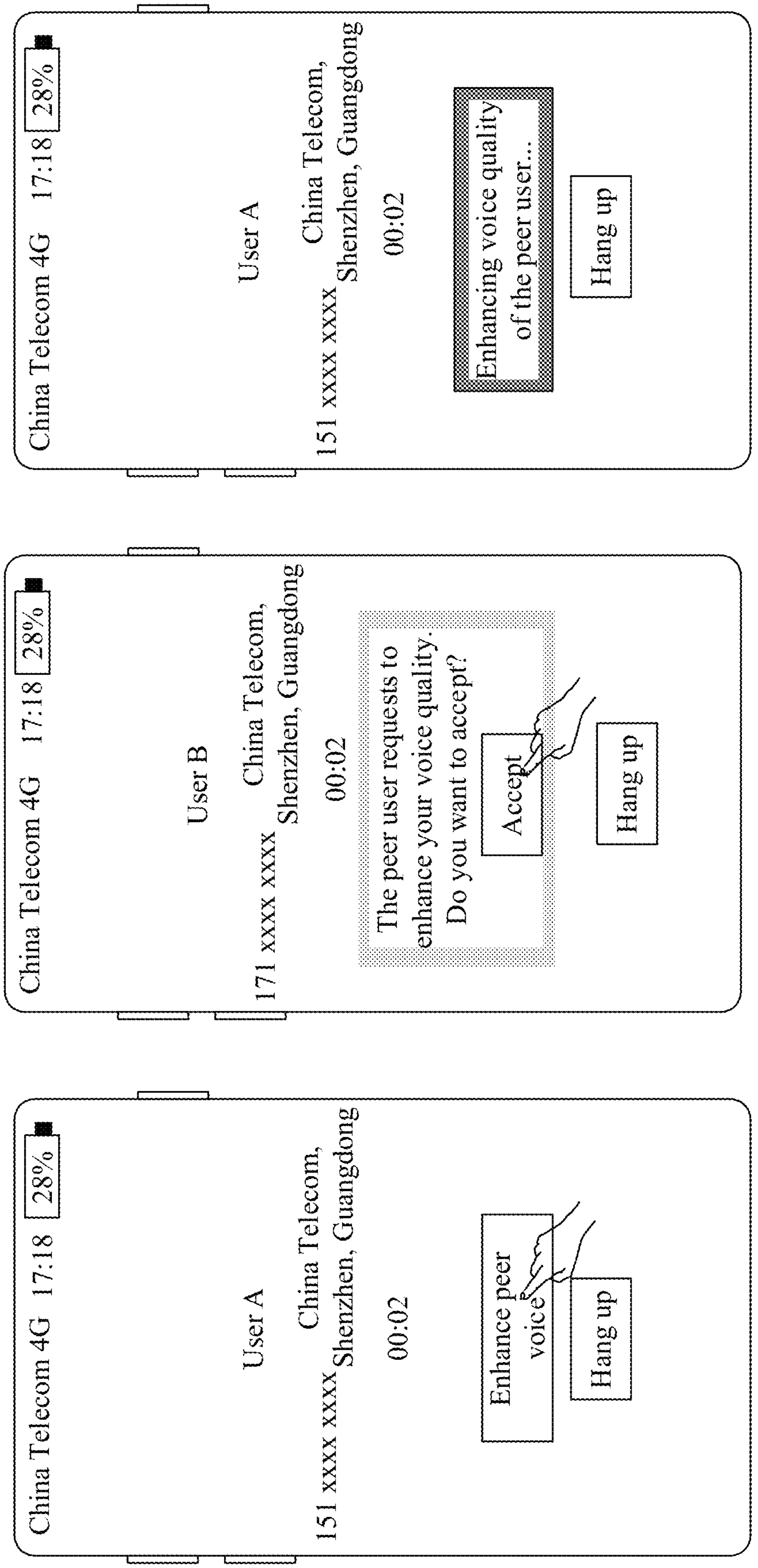
FIG. 20 is a schematic diagram of a UI interface in another call scenario according to an embodiment of this application.

A call between a user A and a user B is used as an example for description. As shown in FIG. 19, a terminal device (a peer device) of the user A and a terminal device (the foregoing terminal device, namely, a local device) of the user B transmit voice data through a base station, to implement the call between the user A and the user B. The user A is in a quite noisy environment, and the user B cannot clearly hear content spoken by the user A. The user B taps an "Enhance peer voice" function button displayed on a display interface of the terminal device of user B to enhance voice quality of the user A. The terminal device of the user B detects the operation performed by the user B on the "Enhance peer voice" function button, as shown in a in FIG. 20, and sends a voice quality enhancement request to the terminal device of the user A, where the voice quality enhancement request requests the terminal device of the user A to enable a PNR function of a call function. After the terminal device of the user A receives the voice quality enhancement request, a reminder label is displayed on a display interface of the terminal device of the user A. As shown in b in FIG. 20, the following information is displayed in the reminder label: "The peer user requests to enhance your voice quality. Do you want to accept?" The reminder label is intended to notify the user A that the user B requests to enhance voice quality of the user A. If the user B agrees to enhance voice quality of the user B, the user B taps an "Accept" function button displayed on the display interface of the terminal device of the user B. After the terminal device of the user B detects the operation performed by the user B on the "Accept" function button, the terminal device of the user B enables the PNR function of the call function, and sends a response message to the terminal device of the user A through the base station, where the response message is used to notify the user A that the PNR function of the call function of the terminal device of the user B is enabled. After receiving the response message fed back by the base station, the terminal device of the user B displays the following prompt label: "Enhancing voice quality of the peer user . . . ", to notify the user B that voice quality of the user A is enhanced, as shown in c in FIG. 20.

It should be understood that the terminal device (the local device) may also control, in the foregoing manner, the peer device to enable a PNR function of a call function.

Herein, it should be noted that data (including a voice quality enhancement request, a response message, and the like) transmitted between the terminal device and the peer device is transmitted through a communication link established based on a phone number of the terminal device and a phone number of the peer device.

During a call, the user of the peer device may determine, based on voice quality of the target user that is heard by the user of the peer device, whether to control the local device to enable the PNR function of the call function; and certainly, the target user may determine, based on voice quality of the user of the peer device that is heard by the target user, whether to control the terminal device to enable the PNR function of the call function, so as to improve efficiency of the call between the two users.

In an embodiment, in a video recording scenario, for example, when a parent records a video of a child, the child is farther away from a terminal device (for example, a photographing terminal), and the parent is closer to the terminal device. As a result, video recording effect is as follows: Voice of the child is low, and voice of the parent is high. However, actually, a video in which voice of the child is high and voice of the parent is weak or even unheard is expected to be recorded. In view of this problem, this application provides the following solution.

During video recording or a video call, a display interface of the terminal device includes a first region and a second region, where the first region is used to display a video recording result or video call content in real time, and the second region is used to display controls for adjusting voice quality enhancement coefficients for a plurality of objects (or target users) and corresponding labels. After noise-reduced voice signals of the plurality of objects are obtained according to the manner 4, the manner 5, or the manner 6, the voice quality enhancement coefficients for the plurality of objects are obtained according to an operation instruction input by a user of the terminal device on the controls for adjusting the voice quality enhancement coefficients for the plurality of objects. Then enhancement is performed on noise-reduced voice signals of the plurality of objects based on the voice quality enhancement coefficients for the plurality of objects respectively to obtain enhanced voice signals of the plurality of objects. Then an output signal is obtained based on the enhanced voice signals of the plurality of objects. The output signal is obtained by mixing the enhanced voice signals of the plurality of objects.

In an embodiment, after noise-reduced voice signals of the plurality of objects and an interfering noise signal are obtained according to the manner 4 or the manner 6, voice quality enhancement coefficients for the plurality of objects are obtained according to the foregoing manner. Then enhancement is performed on the noise-reduced voice signals of the plurality of objects based on the voice quality enhancement coefficients for the plurality of objects respectively to obtain enhanced voice signals of the plurality of objects. Then an output signal is obtained based on the enhanced voice signals of the plurality of objects and the interfering noise signal. The output signal is obtained by mixing the enhanced voice signals of the plurality of objects and the interfering noise signal.

In an embodiment, after noise-reduced voice signals of the plurality of objects and an interfering noise signal are obtained according to the manner 4 or the manner 6, a control for adjusting an interfering noise suppression coefficient is further displayed in the second region. Voice quality enhancement coefficients for the plurality of objects and the interfering noise suppression coefficient are obtained according to an operation instruction input by the user of the terminal device on controls for adjusting the voice quality enhancement coefficients for the plurality of objects and the control for adjusting the interfering noise suppression coefficient. Then enhancement is performed on noise-reduced voice signals of the plurality of objects based on the voice quality enhancement coefficients for the plurality of objects respectively to obtain enhanced voice signals of the plurality of objects. Then suppression is performed on the interfering noise signal based on the interfering noise suppression coefficient to obtain an interfering noise-suppressed signal. Then an output signal is obtained based on the enhanced voice signals of the plurality of objects and the interfering noise— suppressed signal. The output signal is obtained by mixing the enhanced voice signals of the plurality of objects and the interfering noise-suppressed signal.

Herein, it should be noted that sound samples of the plurality of objects have been registered.

Figure 21:
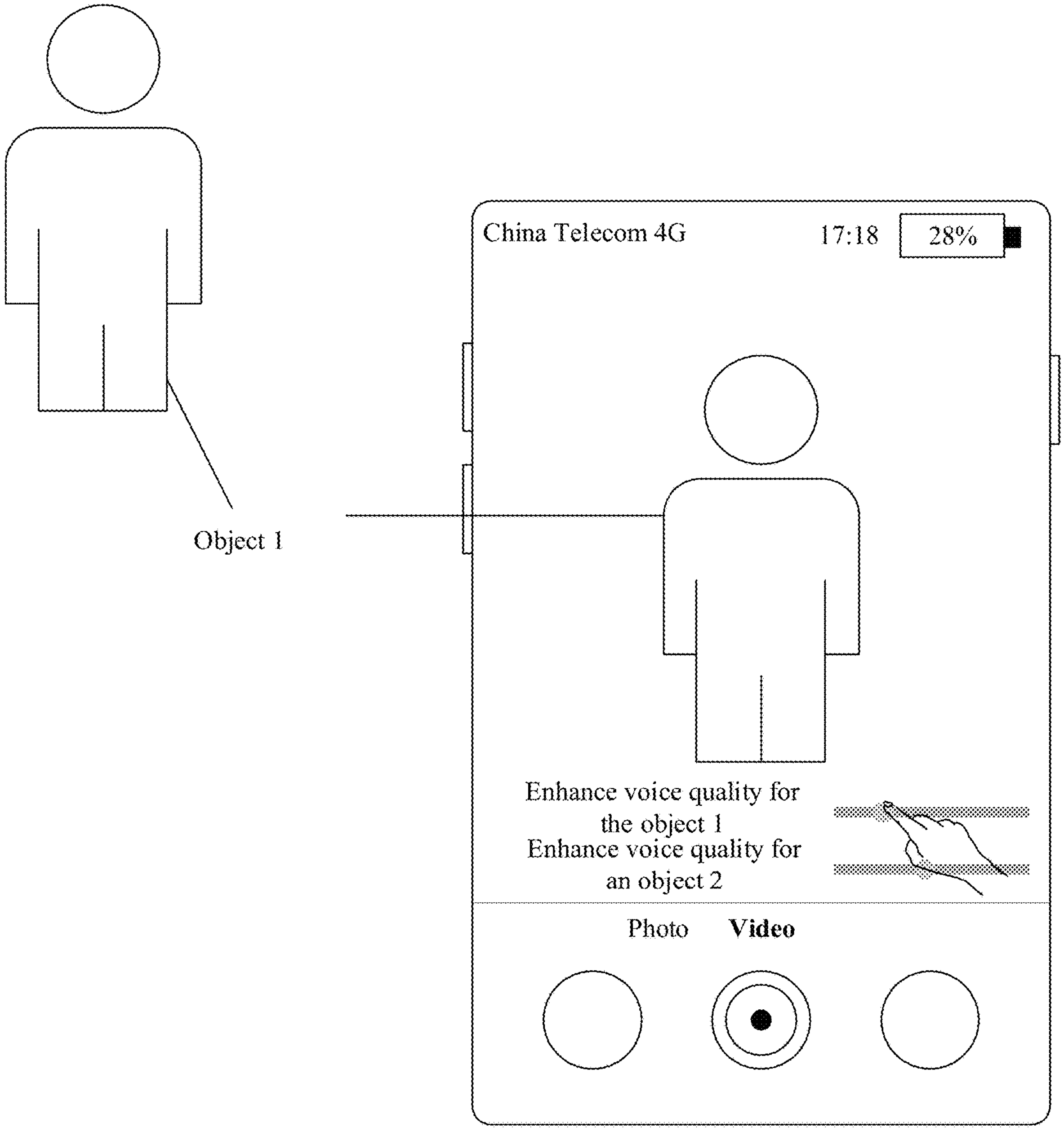
FIG. 21 is a schematic diagram of a video recording UI interface according to an embodiment of this application.

An example in which an object 2 records a video of an object 1 is used for description. As shown in FIG. 21, a display interface of the terminal device includes a region for displaying a video recording result for an image 1, and displays controls for adjusting a voice quality enhancement coefficient for the object 1 and a voice quality enhancement coefficient for the object 2. The control includes a sliding bar and a sliding button. The object 2 may drag a sliding button for the object 1 to slide on a sliding bar to adjust a value of the voice quality enhancement coefficient for the object 1, and may drag a sliding button for the object 2 to slide on a sliding bar to adjust a value of the voice quality enhancement coefficient for the object 2, so as to adjust a sound volume for the object 1 and the object 2 during video recording.

It should be noted that the object 2 drags the object 2 to be a photographer. This is not shown in FIG. 21.

Figure 22:
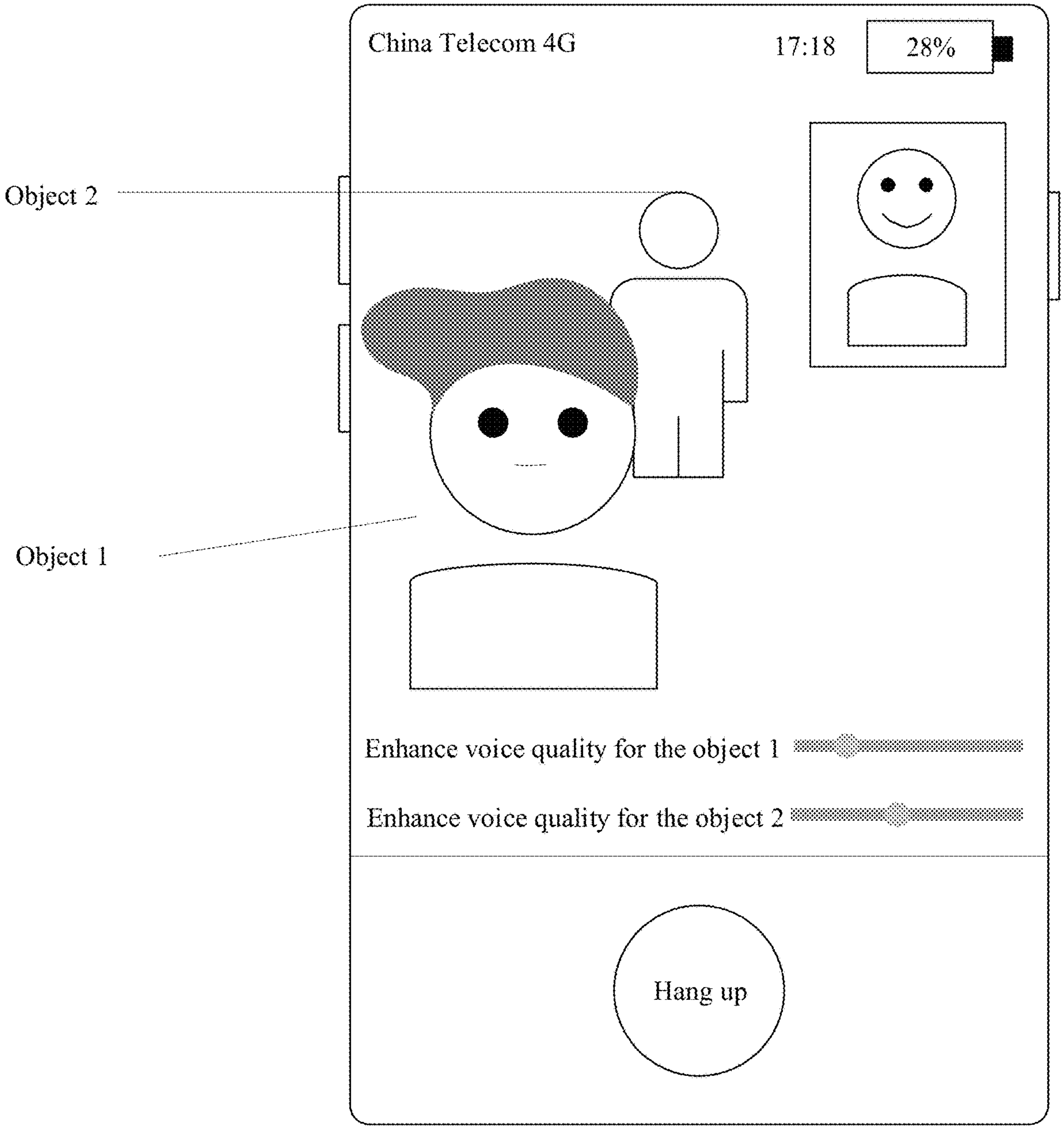
FIG. 22 is a schematic diagram of a video call UI interface according to an embodiment of this application.

In a video call scenario, for example, during a video call between family members, as shown in FIG. 22, a terminal device is held in a hand of a daughter (an object 1), a mother (an object 2) is cooking at a distance behind the daughter, a father is at a remote end, and the father wants to hear what the mother is talking but cannot hear clearly. The object 1 may drag a sliding button for the object 2 to slide on a sliding bar to increase a voice quality enhancement coefficient for the object 2, so as to increase voice of the object 2, namely, voice of the mother.

Figure 23:
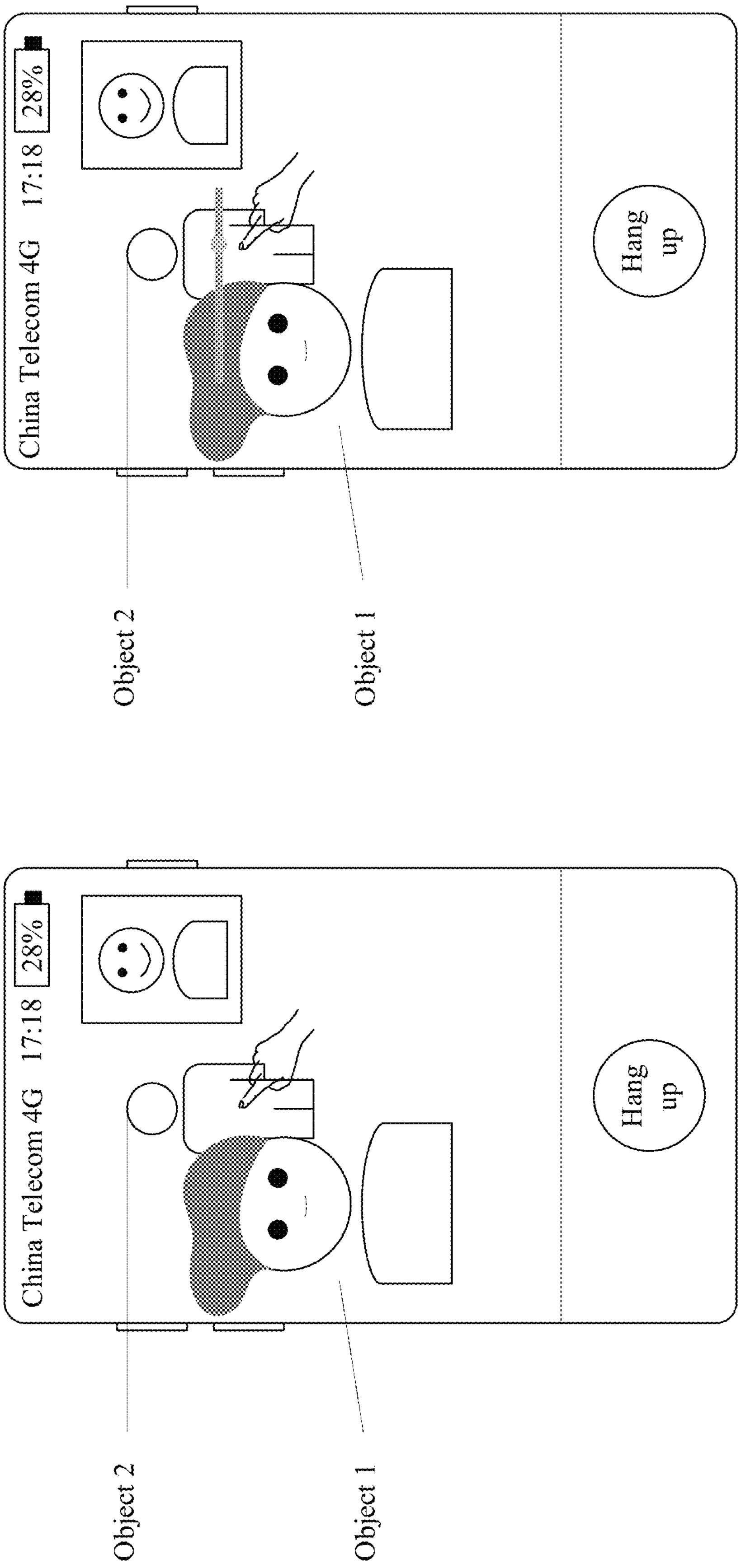
FIG. 23 is a schematic diagram of another video call UI interface according to an embodiment of this application.

In an embodiment, as shown in a diagram on the left of FIG. 23, controls for adjusting voice quality enhancement coefficients for an object 1 and an object 2 are not displayed when the voice quality enhancement coefficients do not need to be adjusted. When the terminal device detects an operation of adjusting, by the object 1, a voice quality enhancement coefficient for the object 1 or 2, a control for adjusting the voice quality enhancement coefficient for the object 1 or the object 2 is displayed on the display interface of the terminal device. As shown in a diagram on the right of FIG. 23, the object 1 needs to adjust the voice quality enhancement coefficient for the object 2, and the object 1 touches-and-holds or taps a display region of the object 2 on the display interface of the terminal device, or certainly may perform another operation. After detecting the operation performed by the object 1, the terminal device displays, on the display interface, the control for adjusting the voice quality enhancement coefficient for the object 2. Within a period of time for waiting for the object 1 to slide the control for adjusting the voice quality enhancement coefficient for the object 2, if the terminal device does not detect an operation performed on the control for adjusting the voice quality enhancement coefficient for the object 2, the terminal device hides the control for adjusting the voice quality enhancement coefficient for the object 2.

It should be noted that, after the terminal device detects an operation performed on the region in which the object 2 is displayed, the terminal device determines a voice signal feature of the object 2 from a database that stores voice signal features corresponding to objects, and then performs noise reduction according to the noise reduction manner in this application.

It should be understood that the operation performed on the region in which the object 2 is displayed includes but is not limited to touching-and-holding and tapping, and certainly may alternatively be an operation in another form.

When the terminal device detects tapping, touching-and-holding, or another operation performed on the display interface, the terminal device first needs to recognize an object displayed in the region on which the operation is performed; and then determines, based on a pre-recorded association relationship between an object and a voice signal, a voice signal that needs to be enhanced, and then sets a corresponding voice quality enhancement coefficient.

In an embodiment, when the terminal device is an intelligent interaction device, the target voice-related data includes a voice signal including a wake-up word, and the noisy voice signal includes an audio signal including a command word.

The intelligent interaction device is a device capable of performing voice interaction with a user, for example, may be a robot vacuum cleaner, a smart speaker, or a smart refrigerator.

For the smart speaker and an intelligent robot, a user identity usually cannot be strictly limited. For example, for a smart speaker used at home, all family members need to be able to perform voice control on the smart speaker, and a visiting guest also needs to be able to perform voice interaction. Voice of the family members may be captured and registered in advance, but voice of a temporary visiting guest cannot be captured or registered in advance. An intelligent robot used for public services needs to respond to every possible user. Similarly, it cannot be required that voice of all possible users be captured and registered in advance. However, these devices are usually used in a complex scenario with noisy background and many speakers, and have a higher requirement for performing voice quality enhancement for a target user and suppressing other interference. In view of this requirement, this application provides the following solution.

A voice command for a smart speaker is used as an example for description. A microphone captures an audio signal. A voice wake-up module analyzes the captured audio signal to determine whether to wake up a device. The voice wake-up module first detects the captured signal, and obtains a voice segment through division; and then performs wake-up word recognition on the voice segment to determine whether the voice segment includes a specified wake-up word. For example, when performing voice control on the smart speaker through a voice command, a user usually needs to first say a wake-up word, for example, "Hey A".

An audio signal that includes the wake-up word and that is obtained by the voice wake-up module is used as a registered voice signal of a target user. The microphone captures an audio signal including a voice command of the user. Usually, after waking up the device, the user may say a command, for example, "How is the weather tomorrow?" or "Play Where Is Spring".

Noise reduction is performed in the manner described in the manner 1 by regarding the user who says the wake-up word as a target user and using the audio signal including the voice command as a noisy voice signal, to obtain an enhanced voice signal or an output signal of the target user. In the enhanced voice signal or the output signal of the target user, a voice signal of the target user who says the wake-up word is enhanced, and another interfering speaker and background noise are effectively suppressed.

Whether there is new wake-up word voice is determined. If there is new wake-up word voice, a new voice signal including the wake-up word is used as a registered voice signal of a new target user, and a user who initiates the new voice signal including the wake-up word is regarded as the target user.

For example, a user C says the wake-up word "Hey A", and then the user C may continue to control the smart speaker through voice. In this case, a user B cannot perform voice control on the smart speaker through voice. The user B takes over a control right on the speaker only after the user B says the wake-up word "Hey A". In this case, the speaker no longer responds to a voice command of the user C, and the user C can take over a control right on the speaker again only after the user C says "Hey A" again.

It can be learned that, an embodiment provides a solution in which voice of a target person can be enhanced and other background noise and interfering voice can be suppressed without pre-registration of voice and without using an image or other sensor information. The solution is applicable to a device oriented to a plurality of users and temporary users, for example, a smart speaker or an intelligent robot.

It can be learned that, in the solution of this application, noise reduction is performed on a noisy voice signal by using target voice-related data and a voice noise reduction model to obtain a noise-reduced voice signal of a target user, to enhance voice of the target user and suppress interfering noise. A voice quality enhancement coefficient and an interfering noise suppression coefficient are introduced, so that a user can adjust a degree of noise reduction as required. Noise reduction is performed by using a voice noise reduction model based on a TCN or an FTB+GRU structure, so that a latency during a voice call or a video call is small, and subjective hearing experience of a user is good. In a multi-user scenario, noise reduction may also be performed according to the noise reduction manner in this application, to meet a requirement of multi-user noise reduction in a multi-user scenario. In a video call scenario, targeted noise reduction may be performed based on a video scene captured by a camera, so that a target user can be automatically recognized, and voiceprint information corresponding to the target user is searched for from a database for noise reduction, to improve user experience. In a call scenario or a video call scenario, a PNR function is enabled based on a noise reduction requirement of a peer user, so that call quality can be improved for both parties of the call. In the method in this application, the PNR function is automatically enabled, so that usability can be improved.

Figure 24:
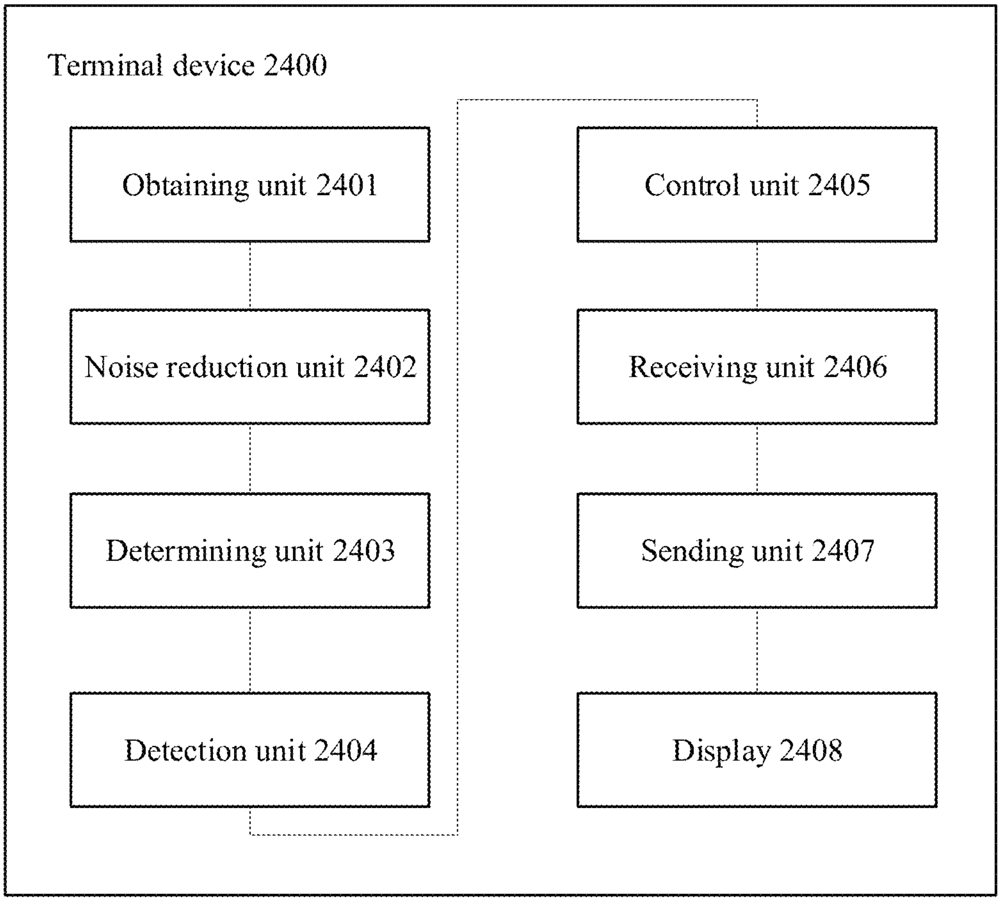
FIG. 24 is a schematic diagram of a structure of a terminal device according to an embodiment of this application.

FIG. 24 is a schematic diagram of a structure of a terminal device according to an embodiment of this application. As shown in FIG. 24, the terminal device 2400 includes:

an obtaining unit 2401, configured to: after the terminal device enters a PNR mode, obtain a noisy voice signal and target voice-related data, where the noisy voice signal includes an interfering noise signal and a voice signal of a target user, and the target voice-related data indicates a voice feature of the target user; and a noise reduction unit 2402, configured to perform noise reduction on a first noisy voice signal based on the target voice-related data and a trained voice noise reduction model to obtain a noise-reduced voice signal of the target user, where the voice noise reduction model is implemented based on a neural network.

In an embodiment, the obtaining unit 2401 is further configured to obtain a voice quality enhancement coefficient for the target user; and the noise reduction unit 2402 is further configured to perform enhancement on the noise-reduced voice signal of the target user based on the voice quality enhancement coefficient for the target user to obtain an enhanced voice signal of the target user, where a ratio of an amplitude of the enhanced voice signal of the target user to an amplitude of the noise-reduced voice signal of the target user is the voice quality enhancement coefficient for the target user.

Further, the obtaining unit 2401 is further configured to obtain an interfering noise suppression coefficient after the interfering noise signal is further obtained through the noise reduction; and the noise reduction unit 2402 is further configured to: perform noise reduction on the interfering noise signal based on the interfering noise suppression coefficient to obtain an interfering noise-suppressed signal, where a ratio of an amplitude of the interfering noise-suppressed signal to an amplitude of the interfering noise signal is the interfering noise suppression coefficient; and perform fusion on the interfering noise-suppressed signal and the enhanced voice signal of the target user to obtain an output signal.

In an embodiment, the obtaining unit 2401 is further configured to obtain an interfering noise suppression coefficient after the interfering noise signal is further obtained through the noise reduction; and the noise reduction unit 2402 is further configured to: perform suppression on the interfering noise signal based on the interfering noise suppression coefficient to obtain an interfering noise-suppressed signal, where a ratio of an amplitude of the interfering noise-suppressed signal to an amplitude of the interfering noise signal is the interfering noise suppression coefficient; and perform fusion on the interfering noise-suppressed signal and the noise-reduced voice signal of the target user to obtain an output signal.

In an embodiment, there are M target users, the target voice-related data includes voice-related data of the M target users, the noise-reduced voice signal of the target user includes noise-reduced voice signals of the M target users, the voice quality enhancement coefficient for the target user includes voice quality enhancement coefficients for the M target users, and M is an integer greater than 1. In terms of performing noise reduction on the first noisy voice signal based on the target voice-related data by using the voice noise reduction model to obtain the noise-reduced voice signal of the target user, the noise reduction unit 2402 is configured to:

for any target user A of the M target users, perform noise reduction on the first noisy voice signal based on voice-related data of the target user A by using the voice noise reduction model to obtain a noise-reduced voice signal of the target user A.

In terms of performing enhancement on the noise-reduced voice signal of the target user based on the voice quality enhancement coefficient for the target user to obtain the enhanced voice signal of the target user, the noise reduction unit 2402 is configured to:

perform enhancement on the noise-reduced voice signal of the target user A based on a voice quality enhancement coefficient for the target user A to obtain an enhanced voice signal of the target user A, where a ratio of an amplitude of the enhanced voice signal of the target user A to an amplitude of the noise-reduced voice signal of the target user A is the voice quality enhancement coefficient for the target user A, and enhanced voice signals of the M target users may be obtained by processing a noise-reduced voice signal of each of the M target users in this manner.

The noise reduction unit 2402 is further configured to obtain an output signal based on enhanced voice signals of the M target users.

In an embodiment, there are M target users, the target voice-related data includes voice-related data of the M target users, the noise-reduced voice signal of the target user includes noise-reduced voice signals of the M target users, and M is an integer greater than 1. In terms of performing noise reduction on the first noisy voice signal based on the target voice-related data by using the voice noise reduction model to obtain the noise-reduced voice signal of the target user and the interfering noise signal, the noise reduction unit 2402 is configured to:

perform noise reduction on the first noisy voice signal based on voice-related data of a $1^{st}$ target user of the M target users by using the voice noise reduction model to obtain a noise-reduced voice signal of the $1^{st}$ target user and a first noisy voice signal that does not include a voice signal of the $1^{st}$ target user; perform, based on voice-related data of a $2^{nd}$ target user of the M target users by using the voice noise reduction model, noise reduction on the first noisy voice signal that does not include the voice signal of the $1^{st}$ target user to obtain a noise-reduced voice signal of the $2^{nd}$ target user and a first noisy voice signal that does not include the voice signal of the $1^{st}$ target user or a voice signal of the $2^{nd}$ target user; and repeat the foregoing process until noise reduction is performed, based on voice-related data of an $M^{th}$ target user by using the voice noise reduction model, on a first noisy voice signal that does not include voice signals of the $1^{st}$ to an (M−1) th target users to obtain a noise-reduced voice signal of the $M^{th}$ target user and the interfering noise signal. In this way, the noise-reduced voice signals of the M target users and the interfering noise signal are obtained.

In an embodiment, there are M target users, the target voice-related data includes voice-related data of the M target users, the noise-reduced voice signal of the target user includes noise-reduced voice signals of the M target users, and M is an integer greater than 1. In terms of performing noise reduction on the first noisy voice signal based on the target voice-related data by using the voice noise reduction model to obtain the noise-reduced voice signal of the target user and the interfering noise signal, the noise reduction unit 2402 is configured to:

perform noise reduction on the first noisy voice signal based on the voice-related data of the M target users by using the voice noise reduction model to obtain the noise-reduced voice signals of the M target users and the interfering noise signal.

In an embodiment, there are M target users, related data of the target user includes a registered voice signal of the target user, the registered voice signal of the target user is a voice signal of the target user that is captured in an environment in which a noise decibel value is less than a preset value, and the voice noise reduction model includes a first encoding network, a second encoding network, a TCN, and a first decoding network.

In terms of performing noise reduction on the first noisy voice signal based on the target voice-related data by using the voice noise reduction model to obtain the noise-reduced voice signal of the target user, the noise reduction unit 2402 is configured to:

extract features of the registered voice signal of the target user and the first noisy voice signal by using the first encoding network and the second encoding network respectively to obtain a feature vector of the registered voice signal of the target user and a feature vector of the first noisy voice signal; obtain a first feature vector based on the feature vector of the registered voice signal of the target user and the feature vector of the first noisy voice signal; obtain a second feature vector based on the TCN and the first feature vector; and obtain the noise-reduced voice signal of the target user based on the first decoding network and the second feature vector.

Further, the noise reduction unit 2402 is further configured to:

further obtain the interfering noise signal based on the first decoding network and the second feature vector.

In an embodiment, related data of the target user A includes a registered voice signal of the target user A, the registered voice signal of the target user A is a voice signal of the target user A that is captured in an environment in which a noise decibel value is less than a preset value, and the voice noise reduction model includes a first encoding network, a second encoding network, a TCN, and a first decoding network. In terms of performing noise reduction on the first noisy voice signal based on the voice-related data of the target user A by using the voice noise reduction model to obtain the noise-reduced voice signal of the target user A, the noise reduction unit 2402 is configured to:

extract features of the registered voice signal of the target user A and the first noisy voice signal by using the first encoding network and the second encoding network respectively to obtain a feature vector of the registered voice signal of the target user A and a feature vector of the first noisy voice signal; obtain a first feature vector based on the feature vector of the registered voice signal of the target user A and the feature vector of the first noisy voice signal; obtain a second feature vector based on the TCN and the first feature vector; and obtain the noise-reduced voice signal of the target user A based on the first decoding network and the second feature vector.

In an embodiment, related data of an $i^{th}$ target user of the M target users includes a registered voice signal of the $i^{th}$ target user, i is an integer greater than 0 and less than or equal to M, and the voice noise reduction model includes a first encoding network, a second encoding network, a TCN, and a first decoding network. The noise reduction unit 2402 is configured to:

extract features of the registered voice signal of the target user and a first noise signal by using the first encoding network and the second encoding network respectively to obtain a feature vector of the registered voice signal of the $i^{th}$ target user and a feature vector of the first noise signal, where the first noise signal is a first noisy voice signal that does not include voice signals of the $1^{st}$ to an $(i-1)^{th}$ target users; obtain a first feature vector based on the feature vector of the registered voice signal of the $i^{th}$ target user and the feature vector of the first noise signal; obtain a second feature vector based on the TCN and the first feature vector; and obtain a noise-reduced voice signal of the $i^{th}$ target user and a second noise signal based on the first decoding network and the second feature vector, where the second noise signal is a first noisy voice signal that does not include voice signals of the $1^{st}$ to the $i^{th}$ target users.

In an embodiment, for the voice-related data of the M target users, related data of each target user includes a registered voice signal of the target user, the registered voice signal of the target user A is a voice signal of the target user A that is captured in an environment in which a noise decibel value is less than a preset value, and the voice noise reduction model includes M first encoding networks, a second encoding network, a TCN, a first decoding network, and M third decoding networks. In terms of performing noise reduction on the first noisy voice signal based on the target voice-related data by using the voice noise reduction model to obtain the noise-reduced voice signal of the target user and the interfering noise signal, the noise reduction unit 2402 is configured to:

extract features of registered voice signals of the M target users by using the M first encoding networks respectively to obtain feature vectors of the registered voice signals of the M target users; extract a feature of the noisy voice signal by using the second encoding network to obtain a feature vector of the noisy voice signal; obtain a first feature vector based on the feature vectors of the registered voice signals of the M target users and the feature vector of the first noisy voice signal; obtain a second feature vector based on the TCN and the first feature vector; obtain the noise-reduced voice signals of the M target users based on each of the M third decoding networks, the second feature vector, and a feature vector output by a first encoding network corresponding to the third decoding network; and obtain the interfering noise signal based on the first decoding network, the second feature vector, and the feature vector of the first noisy voice signal.

In an embodiment, related data of the target user includes a VPU signal of the target user, and the voice noise reduction model includes a preprocessing module, a third encoding network, a GRU, a second decoding network, and a post-processing module.

In terms of performing noise reduction on the first noisy voice signal based on the target voice-related data by using the voice noise reduction model to obtain the noise-reduced voice signal of the target user, the noise reduction unit 2402 is configured to:

separately perform, by using the preprocessing module, time-to-frequency conversion on the first noisy voice signal and the VPU signal of the target user to obtain a first frequency domain signal of the first noisy voice signal and a second frequency domain signal of the VPU signal; perform fusion on the first frequency domain signal and the second frequency domain signal to obtain a first fusion frequency domain signal; sequentially process the first fusion frequency domain signal by using the third encoding network, the GRU, and the second decoding network to obtain a mask of a third frequency domain signal of the voice signal of the target user; perform, by using the post-processing module, post-processing on the first frequency domain signal based on the mask of the third frequency domain signal to obtain the third frequency domain signal; and perform frequency-to-time conversion on the third frequency domain signal to obtain the noise-reduced voice signal of the target user, where both the third encoding module and the second decoding module are implemented based on a convolutional layer and an FTB.

In an embodiment, the noise reduction unit 2402 is configured to:

further obtain a mask of the first frequency domain signal by sequentially processing the first fusion frequency domain signal by using the third encoding network, the GRU, and the second decoding network; perform post-processing on the first frequency domain signal by using the post-processing module based on the mask of the first frequency domain signal to obtain a fourth frequency domain signal of the interfering noise signal; and perform frequency-to-time conversion on the fourth frequency domain signal to obtain the interfering noise signal.

In an embodiment, related data of the target user A includes a VPU signal of the target user A, and the voice noise reduction model includes a preprocessing module, a third encoding network, a GRU, a second decoding network, and a post-processing module. In terms of performing noise reduction on the first noisy voice signal based on the voice-related data of the target user A by using the voice noise reduction model to obtain the noise-reduced voice signal of the target user A, the noise reduction unit 2402 is configured to:

separately perform, by using the preprocessing module, time-to-frequency conversion on the first noisy voice signal and the VPU signal of the target user A to obtain a first frequency domain signal of the first noisy voice signal and a ninth frequency domain signal of the VPU signal of the target user A; perform fusion on the first frequency domain signal and the ninth frequency domain signal to obtain a second fusion frequency domain signal; sequentially process the second fusion frequency domain signal by using the third encoding network, the GRU, and the second decoding network to obtain a mask of a tenth frequency domain signal of a voice signal of the target user A; perform, by using the post-processing module, post-processing on the first frequency domain signal based on the mask of the tenth frequency domain signal to obtain the tenth frequency domain signal; and perform frequency-to-time conversion on the tenth frequency domain signal to obtain the noise-reduced voice signal of the target user A.

Both the third encoding module and the second decoding module are implemented based on a convolutional layer and an FTB.

In an embodiment, related data of an $i^{th}$ target user of the M target users includes a VPU signal of the $i^{th}$ target user, and i is an integer greater than 0 and less than or equal to M. The noise reduction unit 2402 is configured to:

perform time-to-frequency conversion on both a first noise signal and the VPU signal of the $i^{th}$ target user by using the preprocessing module to obtain an eleventh frequency domain signal of the first noise signal and a twelfth frequency domain signal of the VPU signal of the $i^{th}$ target user; perform fusion on the eleventh frequency domain signal and the twelfth frequency domain signal to obtain a third fusion frequency domain signal, where the first noise signal is a noisy voice signal that does not include voice signals of the $1^{st}$ to an $(i-1)^{th}$ target users; sequentially processing the third fusion frequency domain signal by using the third encoding network, the GRU, and the second decoding network to obtain a mask of a thirteenth frequency domain signal of a voice signal of the $i^{th}$ target user and a mask of the eleventh frequency domain signal; perform post-processing on the eleventh frequency domain signal by using the post-processing module based on the mask of the thirteenth frequency domain signal and the mask of the eleventh frequency domain signal to obtain the thirteenth frequency domain signal and a fourteenth frequency domain signal of a second noise signal; and perform frequency-to-time conversion on the thirteenth frequency domain signal and the fourteenth frequency domain signal to obtain a noise-reduced voice signal of the $i^{th}$ target user and the second noise signal, where the second noise signal is a first noisy voice signal that does not include voice signals of the $1^{st}$ to the $i^{th}$ target users, and both the third encoding module and the second decoding module are implemented based on a convolutional layer and an FTB.

In an embodiment, in terms of performing enhancement on the noise-reduced voice signal of the target user based on the voice quality enhancement coefficient for the target user to obtain the enhanced voice signal of the target user, the noise reduction unit 2402 is configured to:

for any target user A of the M target users, perform enhancement on a noise-reduced voice signal of the target user A based on a voice quality enhancement coefficient for the target user A to obtain an enhanced voice signal of the target user A, where a ratio of an amplitude of the enhanced voice signal of the target user A to an amplitude of the noise-reduced voice signal of the target user A is the voice quality enhancement coefficient for the target user A.

In terms of performing fusion on the interfering noise-suppressed signal and the enhanced voice signal of the target user to obtain the output signal, the noise reduction unit 2402 is configured to:

perform fusion on enhanced voice signals of the M target users and the interfering noise-suppressed signal to obtain the output signal.

In an embodiment, related data of the target user includes a VPU signal of the target user, and the obtaining unit 2401 is further configured to obtain an in-ear sound signal of the target user.

In terms of performing noise reduction on the first noisy voice signal based on the target voice-related data by using the voice noise reduction model to obtain the noise-reduced voice signal of the target user, the noise reduction unit 2402 is configured to:

separately perform time-to-frequency conversion on the first noisy voice signal and the in-ear sound signal to obtain a first frequency domain signal of the first noisy voice signal and a fifth frequency domain signal of the in-ear sound signal; obtain a covariance matrix of the first noisy voice signal and the in-ear sound signal based on the VPU signal of the target user, the first frequency domain signal, and the fifth frequency domain signal; obtain a first minimum variance distortionless response MVDR weight based on the covariance matrix; obtain a sixth frequency domain signal of the first noisy voice signal and a seventh frequency domain signal of the in-ear sound signal based on the first MVDR weight, the first frequency domain signal, and the fifth frequency domain signal; obtain an eighth frequency domain signal of the noise-reduced voice signal based on the sixth frequency domain signal and the seventh frequency domain signal; and perform frequency-to-time conversion on the eighth frequency domain signal to obtain the noise-reduced voice signal of the target user.

Further, the noise reduction unit 2402 is further configured to:

obtain the interfering noise signal based on the noise-reduced voice signal of the target user and the first noisy voice signal.

In an embodiment, related data of the target user A includes a VPU signal of the target user A, and the obtaining unit 2401 is further configured to obtain an in-ear sound signal of the target user A.

In terms of performing noise reduction on the first noisy voice signal based on the voice-related data of the target user A by using the voice noise reduction model to obtain the noise-reduced voice signal of the target user A, the noise reduction unit 2402 is configured to:

separately perform time-to-frequency conversion on the first noisy voice signal and the in-ear sound signal of the target user A to obtain a first frequency domain signal of the first noisy voice signal and a fifteenth frequency domain signal of the in-ear sound signal of the target user A; obtain a covariance matrix of the first noisy voice signal and the in-ear sound signal of the target user A based on the VPU signal of the target user A, the first frequency domain signal, and the fifteenth frequency domain signal; obtain a second MVDR weight based on the covariance matrix; obtain a sixteenth frequency domain signal of the first noisy voice signal and a seventeenth frequency domain signal of the in-ear sound signal of the target user A based on the second MVDR weight, the first frequency domain signal, and the fifteenth frequency domain signal; obtain an eighteenth frequency domain signal of the noise-reduced voice signal of the target user A based on the sixteenth frequency domain signal and the seventeenth frequency domain signal; and perform frequency-to-time conversion on the eighteenth frequency domain signal to obtain the noise-reduced voice signal of the target user A.

In an embodiment, the obtaining unit 2401 is further configured to:

obtain a first noise segment and a second noise segment of an environment in which the terminal device is located, where the first noise segment and the second noise segment are continuous noise segments in time, and obtain a signal-to-noise ratio SNR and a sound pressure level SPL of the first noise segment.

The terminal device 2400 further includes:

a determining unit 2403, configured to: if the SNR of the first noise segment is greater than a first threshold and the SPL of the first noise segment is greater than a second threshold, extract a first temporary feature vector of the first noise segment; perform noise reduction on the second noise segment based on the first temporary voice feature vector to obtain a second noise-reduced noise segment; perform distortion evaluation based on the second noise-reduced noise segment and the second noise segment to obtain a first distortion score; and enter the PNR mode if the first distortion score is not greater than a third threshold.

In terms of obtaining the first noisy voice signal, the obtaining unit 2401 is configured to:

determine the first noisy voice signal from a noise signal generated after the first noise segment, where the feature vector of the registered voice signal includes the first temporary feature vector.

In an embodiment, if the first distortion score is not greater than the third threshold, the determining unit 2403 is further configured to:

send first prompt information by using the terminal device, where the first prompt information indicates whether to enable the terminal device to enter the PNR mode; and entering the PNR mode only after an operation instruction indicating that the target user agrees to enter the PNR mode is detected.

In an embodiment, the obtaining unit 2401 is further configured to: when it is detected that the terminal device is used again, obtain a second noisy voice signal;

the noise reduction unit 2402 is further configured to: when an SNR of the second noisy voice signal is less than a fourth threshold, perform noise reduction on the second noisy voice signal based on the first temporary feature vector to obtain a noise-reduced voice signal of a current user; and the determining unit 2403 is further configured to: perform distortion evaluation based on the noise-reduced voice signal of the current user and the second noisy voice signal to obtain a second distortion score; when the second distortion score is not greater than a fifth threshold, send second prompt information by using the terminal device, where the second prompt information is used to notify the current user that the terminal device is able to enter the PNR mode; and after an operation instruction indicating that the current user agrees to enter the PNR mode is detected, enable the terminal device to enter the PNR mode to perform noise reduction on a third noisy voice signal, where the third noisy voice signal is obtained after the second noisy voice signal; or after an operation instruction indicating that the current user does not agree to enter the PNR mode is detected, perform noise reduction on the third noisy voice signal in a non-PNR mode.

In an embodiment, the obtaining unit 2401 is further configured to obtain a third noise segment if the SNR of the first noise segment is not greater than the first threshold or the SPL of the first noise segment is not greater than the second threshold and a reference temporary voiceprint feature vector is stored on the terminal device;

the noise reduction unit 2402 is further configured to perform noise reduction on the third noise segment based on the reference temporary voiceprint feature vector to obtain a third noise-reduced noise segment; and the determining unit 2403 is further configured to: perform distortion evaluation based on the third noise segment and the third noise-reduced noise segment to obtain a third distortion score; if the third distortion score is greater than a sixth threshold and an SNR of the third noise segment is less than a seventh threshold, or the third distortion score is greater than an eighth threshold and the SNR of the third noise segment is not less than the seventh threshold, send third prompt information by using the terminal device, where the third prompt information is used to notify a current user that the terminal device is able to enter the PNR mode; and after an operation instruction indicating that the current user agrees to enter the PNR mode is detected, enable the terminal device to enter the PNR mode to perform noise reduction on a fourth noisy voice signal; or after an operation instruction indicating that the current user does not agree to enter the PNR mode is detected, perform noise reduction on the fourth noisy voice signal in a non-PNR mode, where the fourth noisy voice signal is determined from a noise signal generated after the third noise segment.

In an embodiment, the obtaining unit 2401 is further configured to: obtain a first noise segment and a second noise segment of an environment in which the terminal device 2400 is located, where the first noise segment and the second noise segment are continuous noise segments in time, and obtain a signal captured by a microphone array of an auxiliary device of the terminal device 2400 in an environment in which the terminal device 2400 is located.

The terminal device 2400 further includes:

a determining unit 2403, configured to: calculate a direction of arrival DOA and an SPL of the first noise segment by using the captured signal; if the DOA of the first noise segment is greater than a ninth threshold and less than a tenth threshold and the SPL of the first noise segment is greater than an eleventh threshold, extract a second temporary feature vector of the first noise segment, and perform noise reduction on the second noise segment based on the second temporary feature vector to obtain a third noise-reduced noise segment; perform distortion evaluation based on the third noise-reduced noise segment and the second noise segment to obtain a fourth distortion score; and enter the PNR mode if the fourth distortion score is greater than a twelfth threshold.

In terms of obtaining the first noisy voice signal, the obtaining unit 2401 is configured to:

determine the first noisy voice signal from a noise signal generated after the first noise segment, where the feature vector of the registered voice signal includes the second temporary feature vector.

In an embodiment, if the fourth distortion score is not greater than the twelfth threshold, the determining unit 2403 is further configured to:

send fourth prompt information by using the terminal device 2400, where the fourth prompt information indicates whether to enable the terminal device 2400 to enter the PNR mode; and enter the PNR mode only after an operation instruction indicating that the target user agrees to enter the PNR mode is detected.

In an embodiment, the terminal device 2400 further includes:

a detection unit 2404, configured to: skip entering the PNR mode when it is detected that the terminal device is in a handheld call state;

enter the PNR mode when it is detected that the terminal device is in a hands-free call state, where the target user is an owner of the terminal device or a user who is using the terminal device;

enter the PNR mode when it is detected that the terminal device is in a video call, where the target user is an owner of the terminal device or a user closest to the terminal device;

enter the PNR mode when it is detected that the terminal device is connected to a headset and is in a call state, where the target user is a user wearing the headset, and the first noisy voice signal and the target voice-related data are captured by the headset; or enter the PNR mode when it is detected that the terminal device is connected to a smart large-screen device, a smartwatch, or a vehicle-mounted device, where the target user is an owner of the terminal device or a user who is using the terminal device, and the first noisy voice signal and the target voice-related data are captured by the smart large-screen device, the smartwatch, or audio capture hardware of the vehicle-mounted device.

In an embodiment, the obtaining unit 2401 is further configured to obtain a decibel value of an audio signal in a current environment.

The terminal device 2400 further includes:

a control unit 2405, configured to: if the decibel value of the audio signal in the current environment exceeds a preset decibel value, determine whether a PNR function corresponding to a function or an application started by the terminal device is enabled; and if the PNR function is not enabled, enable the PNR function corresponding to the application started by the terminal device, and enter the PNR mode.

In an embodiment, the terminal device 2400 includes a display 2408, and the display 2408 includes a plurality of display regions.

Each of the plurality of display regions displays a label and a corresponding function button, and the function button is configured to control enabling and disabling of a PNR function of an application indicated by a corresponding label.

In an embodiment, when voice data is transmitted between the terminal device and another terminal device, the terminal device 2400 further includes:

a receiving unit 2406, configured to receive a voice quality enhancement request sent by the another terminal device, where the voice quality enhancement request indicates the terminal device to enable a PNR function of a call function;

a control unit 2405, configured to: send, by using the terminal device, third prompt information in response to the voice quality enhancement request, where the third prompt information indicates whether to enable the terminal device to enable the PNR function of the call function; and after it is detected that the target user confirms that the PNR function of the call function is to be enabled for the terminal device, enable the PNR function of the call function, and enter the PNR mode; and a sending unit 2407, configured to send a voice quality enhancement response message to the another terminal device, where the voice quality enhancement response message indicates that the terminal device has enabled the PNR function of the call function.

In an embodiment, when the terminal device enables a video call or video recording function, a display interface of the terminal device includes a first region and a second region. The first region is used to display video call content or video recording content. The second region is used to display M controls and corresponding M labels. The M controls are in a one-to-one correspondence with the M target users. Each of the M controls includes a sliding button and a sliding bar. The sliding button is controlled to slide on the sliding bar to adjust a voice quality enhancement coefficient for a target user indicated by a label corresponding to the control.

In an embodiment, when the terminal device enables a video call or video recording function, a display interface of the terminal device includes a first region, and the first region is used to display video call content or video recording content. The terminal device 2400 further includes:

a control unit 2405, configured to: when an operation performed on any object in the video call content or the video recording content is detected, display, in the first region, a control corresponding to the object, where the control includes a sliding button and a sliding bar, and the sliding button is controlled to slide on the sliding bar to adjust a voice quality enhancement coefficient for the object.

In an embodiment, when the terminal device is an intelligent interaction device, the target voice-related data is a voice signal of the target user that includes a wake-up word, and the noisy voice signal is an audio signal of the target user that includes a command word.

It should be noted that the foregoing units (the obtaining unit 2401, the noise reduction unit 2402, the determining unit 2403, the detection unit 2404, the control unit 2405, the receiving unit 2406, the sending unit 2407, and the display 2408) are configured to perform related operations of the foregoing methods.

In an embodiment, the terminal device 2400 is presented in a form of a unit. The "unit" herein may be an application-specific integrated circuit (ASIC), a processor that executes one or more software or firmware programs, a memory, an integrated logic circuit, and/or another device that can provide the foregoing functions. In addition, the obtaining unit 2401, the noise reduction unit 2402, the determining unit 2403, the detection unit 2404, and the control unit 2405 may be implemented by using a processor 2601 of a terminal device shown in FIG. 26.

Figure 25:
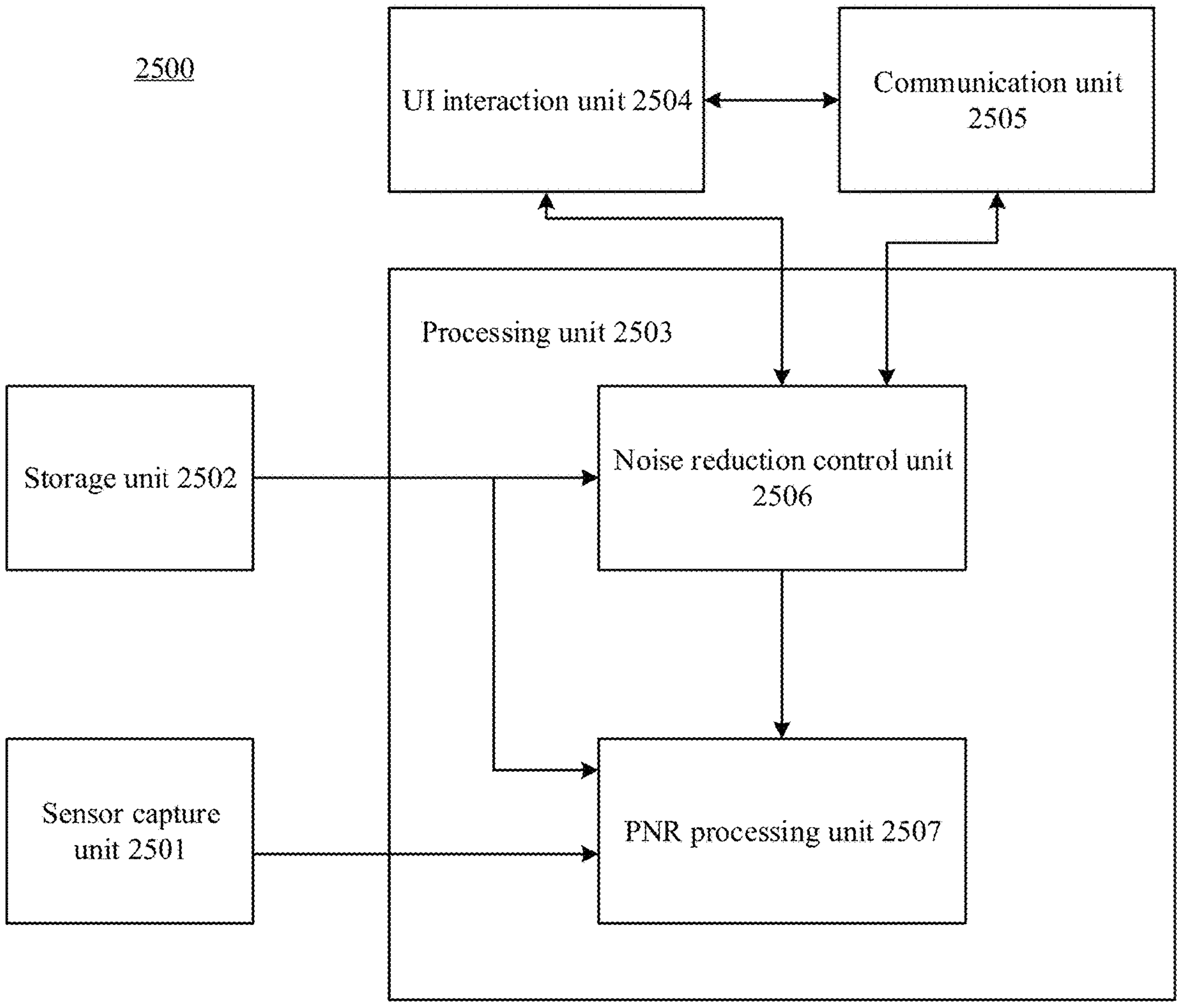
FIG. 25 is a schematic diagram of a structure of another terminal device according to an embodiment of this application.

FIG. 25 is a schematic diagram of a structure of another terminal device according to an embodiment of this application. As shown in FIG. 25, the terminal device 2500 includes:

a sensor capture unit 2501, configured to capture a noisy voice signal and information that can be used to determine a target user, for example, a registered voice signal, a VPU signal, a video image, or a depth map of the target user;

a storage unit 2502, configured to store a noise reduction parameter (including a voice quality enhancement coefficient for the target user and an interfering noise suppression coefficient), a registered target user, and voice feature information of the registered target user;

a UI interaction unit 2504, configured to receive interaction information of a user, transmit the interaction information to a noise reduction control unit 2506, and feed back, to a local user, information fed back by the noise reduction control unit 2506;

a communication unit 2505, configured to send interaction information to a peer user and receive interaction information from the peer user, where optionally, the communication unit 2505 may transmit a peer noisy voice signal and voice registration information of the peer user; and a processing unit 2503 including the noise reduction control unit 2506 and a PNR processing unit 2507, where the noise reduction control unit 2506 is configured to configure a PNR noise reduction parameter based on interaction information received by a local end and a peer end and information stored by the storage unit, including but not limited to determining a user or a target user for voice quality enhancement, a voice quality enhancement coefficient and an interfering noise suppression coefficient, whether to enable a noise reduction function, and a noise reduction manner; and the PNR processing unit 2507 is configured to process, based on the configured noise reduction parameter, the noisy voice signal captured by the sensor capture unit to obtain an enhanced audio signal, that is, an enhanced voice signal of the target user.

Herein, it should be noted that, for a function of the PNR processing unit 2507, reference may be made to related descriptions of the functions of the noise reduction unit 2402.

Figure 26:
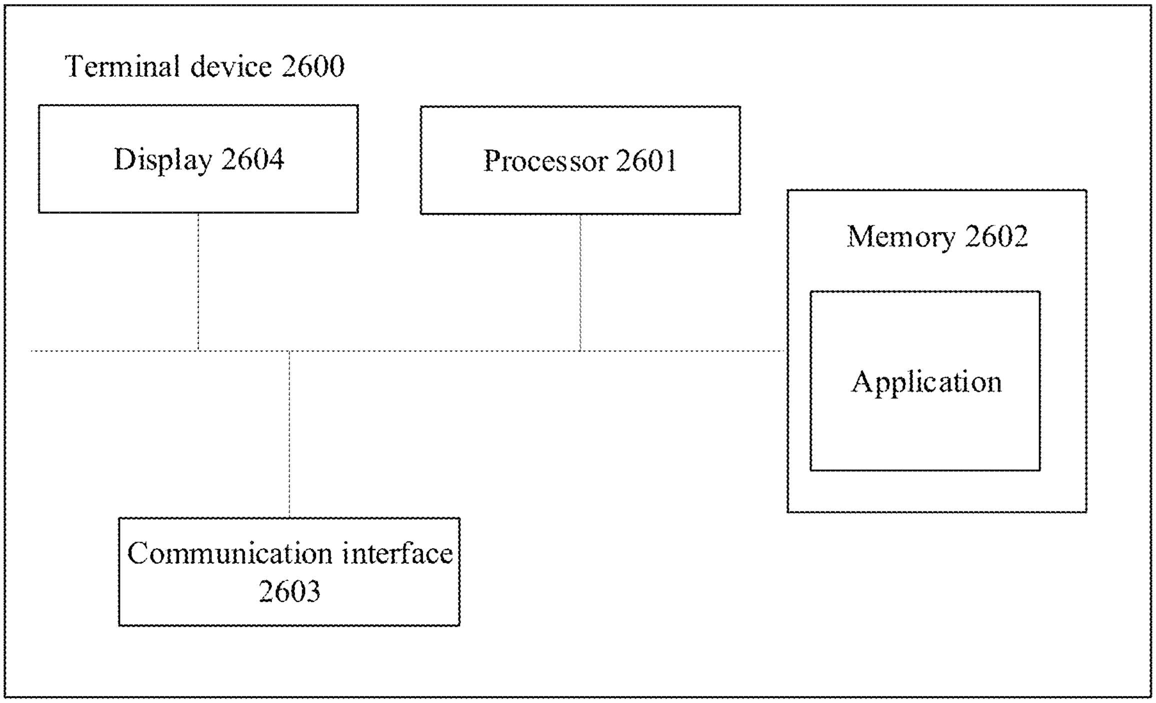
FIG. 26 is a schematic diagram of a structure of another terminal device according to an embodiment of this application.

A terminal device 2600 shown in FIG. 26 may be implemented in a structure in FIG. 26. The terminal device 2600 includes at least one processor 2601, at least one memory 2602, at least one display 2604, and at least one communication interface 2603. The processor 2601, the memory 2602, the display 2604, and the communication interface 2603 are connected and perform mutual communication through a communication bus.

The processor 2601 may be a general-purpose central processing unit (CPU), a microprocessor, an application-specific integrated circuit (ASIC), or one or more integrated circuits for controlling execution of programs for the foregoing solutions.

The communication interface 2603 is configured to communicate with another device or a communication network such as Ethernet, a radio access network (RAN), or a wireless local area network (WLAN).

The memory 2602 may be a read-only memory (ROM) or another type of static storage device capable of storing static information and instructions, or a random access memory (RAM) or another type of dynamic storage device capable of storing information and instructions, or may be an electrically erasable programmable read-only memory (EEPROM), a compact disc read-only memory (CD-ROM) or another optical disk storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer. However, this does not constitute a limitation herein. The memory may exist independently, and is connected to the processor through a bus. The memory may alternatively be integrated with the processor.

The display 2604 may be an LCD display, an LED display, an OLED display, a 3D display, or another display.

The memory 2602 is configured to store application program code for performing the foregoing solutions, and the processor 2601 controls execution of the application program code, to display, on the display, the function buttons, the labels, and the like in the foregoing method embodiments. The processor 2601 is configured to execute the application program code stored in the memory 2602.

The code stored in the memory 2602 may be used to perform any voice quality enhancement method provided above, for example: after the terminal device enters a PNR mode, obtaining a noisy voice signal and target voice-related data, where the noisy voice signal includes an interfering noise signal and a voice signal of a target user, and the target voice-related data indicates a voice feature of the target user; and performing noise reduction on a first noisy voice signal based on the target voice-related data by using a trained voice noise reduction model to obtain a noise-reduced voice signal of the target user, where the voice noise reduction model is implemented based on a neural network.

An embodiment of this application further provides a computer storage medium. The computer storage medium may store a program. When the program is executed, some or all of operations of any voice quality enhancement method described in the foregoing method embodiments are performed.

It should be noted that, for ease of description, the foregoing method embodiments are described as a series of combinations of actions. However, one of ordinary skilled in the art should be aware that this application is not limited to the described order of the actions, because some operations may be performed in another order or simultaneously according to this application. In addition, one of ordinary skilled in the art should also be aware that embodiments described in this specification are all example embodiments, and the described actions and modules are not necessarily required for this application.

In the foregoing embodiments, the descriptions in the embodiments have respective focuses. For a part that is not described in detail in an embodiment, refer to related descriptions in other embodiments.

In several embodiments provided in this application, it should be understood that the disclosed apparatuses may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the shown or discussed mutual couplings, direct couplings, or communication connections may be implemented through some interfaces. The indirect couplings or communication connections between the apparatuses or units may be implemented in electrical or another form.

The units described as separate parts may or may not be physically separate, and parts shown as units may or may not be physical units, that is, may be located in one place, or may be distributed on a plurality of network units. Some or all of the units may be selected according to actual requirements to achieve objectives of solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable memory. Based on such an understanding, the technical solutions of this application essentially, or a part contributing to the conventional technology, or all or some of the technical solutions may be implemented in a form of a software product. The computer software product is stored in a memory and includes several instructions for instructing a computer device (which may be a personal computer, a server, a network device, or the like) to perform all or some of the operations of the methods in embodiments of this application. The memory includes any medium that can store program code, such as a USB flash drive, a read-only memory (ROM), a random access memory (RAM), a removable hard disk, a magnetic disk, or an optical disc.

One of ordinary skilled in the art can understand that all or some of the operations of the methods in the foregoing embodiments may be implemented by a program instructing related hardware. The program may be stored in a computer-readable memory. The memory may include a flash memory, a read-only memory (ROM), a random access memory (RAM), a magnetic disk, an optical disc, or the like.

The foregoing describes embodiments of this application in detail. In this specification, the principles and the implementations of this application are described by using examples. The descriptions of the foregoing embodiments are merely intended to help understand the methods of this application and the core ideas thereof In addition, one of ordinary skilled in the art may modify the implementations and the application scopes based on the ideas of this application. To sum up, the content of this specification shall not be construed as a limitation on this application.

What is claimed is:

1. A voice quality enhancement method, comprising:

after a terminal device enters a personalized noise reduction (PNR) mode, obtaining a first noisy voice signal and target voice-related data, wherein the first noisy voice signal comprises an interfering noise signal and a voice signal of a target user, the interfering noise signal includes at least one of a voice signal of a non-target user or an ambient noise signal, and the target voice-related data indicates a voice feature of the target user; and performing noise reduction on the first noisy voice signal based on the target voice-related data by using a voice noise reduction model to obtain a noise-reduced voice signal of the target user, wherein the voice noise reduction model is implemented based on a neural network;

obtaining a voice quality enhancement coefficient for the target user; and performing enhancement on the noise-reduced voice signal of the target user based on the voice quality enhancement coefficient for the target user to obtain an enhanced voice signal of the target user, wherein a ratio of an amplitude of the enhanced voice signal of the target user to an amplitude of the noise-reduced voice signal of the target user is the voice quality enhancement coefficient.

2. The method according to claim 1, wherein the interfering noise signal is further obtained through the noise reduction, and the method further comprises:

obtaining an interfering noise suppression coefficient;

performing suppression on the interfering noise signal based on the interfering noise suppression coefficient to obtain an interfering noise-suppressed signal, wherein a ratio of an amplitude of the interfering noise-suppressed signal to an amplitude of the interfering noise signal is the interfering noise suppression coefficient; and performing fusion on the interfering noise-suppressed signal and the enhanced voice signal of the target user to obtain an output signal.

3. The method according to claim 1, wherein the interfering noise signal is further obtained through the noise reduction, and the method further comprises:

obtaining an interfering noise suppression coefficient;

performing suppression on the interfering noise signal based on the interfering noise suppression coefficient to obtain an interfering noise-suppressed signal, wherein a ratio of an amplitude of the interfering noise-suppressed signal to an amplitude of the interfering noise signal is the interfering noise suppression coefficient; and performing fusion on the interfering noise-suppressed signal and the noise-reduced voice signal of the target user to obtain an output signal.

4. The method according to claim 1, wherein the target voice-related data comprises voice-related data of M target users, the noise-reduced voice signal of the target user comprises noise-reduced voice signals of the M target users, the voice quality enhancement coefficient for the target user comprises voice quality enhancement coefficients for the M target users, and M is an integer greater than 1, the method further comprises:

for any target user A of the M target users, performing noise reduction on the first noisy voice signal based on voice-related data of the target user A by using the voice noise reduction model to obtain a noise-reduced voice signal of the target user A;

performing enhancement on the noise-reduced voice signal of the target user A based on a voice quality enhancement coefficient for the target user A to obtain an enhanced voice signal of the target user A, wherein a ratio of an amplitude of the enhanced voice signal of the target user A to an amplitude of the noise-reduced voice signal of the target user A is the voice quality enhancement coefficient for the target user A; and obtaining an output signal based on enhanced voice signals of the M target users.

5. The method according to claim 1, wherein target voice-related data of the target user comprises a registered voice signal of the target user, and the voice noise reduction model comprises a first encoding network, a second encoding network, a temporal convolutional network (TCN), and a first decoding network, the method further comprises:

extracting features of the registered voice signal of the target user and the first noisy voice signal by using the first encoding network and the second encoding network respectively to obtain a feature vector of the registered voice signal of the target user and a feature vector of the first noisy voice signal;

obtaining a first feature vector based on the feature vector of the registered voice signal of the target user and the feature vector of the first noisy voice signal;

obtaining a second feature vector based on the TCN and the first feature vector; and obtaining the noise-reduced voice signal of the target user based on the first decoding network and the second feature vector.

6. The method according to claim 5, further comprising:

obtaining the interfering noise signal based on the first decoding network and the second feature vector.

7. The method according to claim 4, wherein target voice-related data of the target user A comprises a registered voice signal of the target user A, and the voice noise reduction model comprises a first encoding network, a second encoding network, a TCN, and a first decoding network, the method further comprises:

extracting features of the registered voice signal of the target user A and the first noisy voice signal by using the first encoding network and the second encoding network respectively to obtain a feature vector of the registered voice signal of the target user A and a feature vector of the first noisy voice signal;

obtaining a first feature vector based on the feature vector of the registered voice signal of the target user A and the feature vector of the first noisy voice signal;

obtaining a second feature vector based on the TCN and the first feature vector; and obtaining the noise-reduced voice signal of the target user A based on the first decoding network and the second feature vector.

8. The method according to claim 1, wherein target voice-related data of the target user comprises a voice pickup (VPU) signal of the target user, and the voice noise reduction model comprises a preprocessing module, a third encoding network, a gated recurrent unit (GRU), a second decoding network, and a post-processing module, the method further comprises:

separately performing, by using the preprocessing module, time-to-frequency conversion on the first noisy voice signal and the VPU signal of the target user to obtain a first frequency domain signal of the first noisy voice signal and a second frequency domain signal of the VPU signal;

performing fusion on the first frequency domain signal and the second frequency domain signal to obtain a first fusion frequency domain signal;

sequentially processing the first fusion frequency domain signal by using the third encoding network, the GRU, and the second decoding network to obtain a mask of a third frequency domain signal of the voice signal of the target user;

performing, by using the post-processing module, post-processing on the first frequency domain signal based on the mask of the third frequency domain signal to obtain the third frequency domain signal; and performing frequency-to-time conversion on the third frequency domain signal to obtain the noise-reduced voice signal of the target user, wherein both the third encoding network and the second decoding network are implemented based on a convolutional layer and a frequency transformation block FTB.

9. The method according to claim 1, wherein target voice-related data of the target user comprises a voice pickup (VPU) signal of the target user, and the method further comprises:

obtaining an in-ear sound signal of the target user, the method further comprises:

separately performing time-to-frequency conversion on the first noisy voice signal and the in-ear sound signal to obtain a first frequency domain signal of the first noisy voice signal and a fifth frequency domain signal of the in-ear sound signal;

obtaining a covariance matrix of the first noisy voice signal and the in-ear sound signal based on the VPU signal of the target user, the first frequency domain signal, and the fifth frequency domain signal;

obtaining a first minimum variance distortionless response (MVDR) weight based on the covariance matrix;

obtaining a sixth frequency domain signal of the first noisy voice signal and a seventh frequency domain signal of the in-ear sound signal based on the first MVDR weight, the first frequency domain signal, and the fifth frequency domain signal;

obtaining an eighth frequency domain signal of the noise-reduced voice signal based on the sixth frequency domain signal and the seventh frequency domain signal; and performing frequency-to-time conversion on the eighth frequency domain signal to obtain the noise-reduced voice signal.

10. The method according to claim 9, further comprising:

obtaining the interfering noise signal based on the noise-reduced voice signal and the first noisy voice signal.

11. The method according to claim 4, wherein target voice-related data of the target user A comprises a VPU signal of the target user A, and the method further comprises:

obtaining an in-ear sound signal of the target user A; and separately performing time-to-frequency conversion on the first noisy voice signal and the in-ear sound signal of the target user A to obtain a first frequency domain signal of the first noisy voice signal and a fifteenth frequency domain signal of the in-ear sound signal of the target user A;

obtaining a covariance matrix of the first noisy voice signal and the in-ear sound signal of the target user A based on the VPU signal of the target user A, the first frequency domain signal, and the fifteenth frequency domain signal;

obtaining a second MVDR weight based on the covariance matrix;

obtaining a sixteenth frequency domain signal of the first noisy voice signal and a seventeenth frequency domain signal of the in-ear sound signal of the target user A based on the second MVDR weight, the first frequency domain signal, and the fifteenth frequency domain signal, and obtaining an eighteenth frequency domain signal of the noise-reduced voice signal of the target user A based on the sixteenth frequency domain signal and the seventeenth frequency domain signal; and performing frequency-to-time conversion on the eighteenth frequency domain signal to obtain the noise-reduced voice signal of the target user A.

12. The method according to claim 5, further comprising:

obtaining a first noise segment and a second noise segment of an environment in which the terminal device is located, wherein the first noise segment and the second noise segment are continuous noise segments in time;

obtaining a signal-to-noise ratio (SNR) and a sound pressure level (SPL) of the first noise segment;

if the SNR of the first noise segment is greater than a first threshold and the SPL of the first noise segment is greater than a second threshold, extracting a first temporary feature vector of the first noise segment;

performing noise reduction on the second noise segment based on the first temporary voice feature vector to obtain a second noise-reduced noise segment;

performing distortion evaluation based on the second noise-reduced noise segment and the second noise segment to obtain a first distortion score; and entering the PNR mode if the first distortion score is not greater than a third threshold; and the obtaining a first noisy voice signal comprises:

determining the first noisy voice signal from a noise signal generated after the first noise segment, wherein the feature vector of the registered voice signal comprises the first temporary feature vector.

13. The method according to claim 12, wherein if the first distortion score is not greater than the third threshold, the method further comprises:

sending first prompt information by using the terminal device, wherein the first prompt information indicates whether to enable the terminal device to enter the PNR mode; and entering the PNR mode only after an operation instruction indicating that the target user agrees to enter the PNR mode is detected.

14. The method according to claim 5, further comprising:

obtaining a first noise segment and a second noise segment of an environment in which the terminal device is located, wherein the first noise segment and the second noise segment are continuous noise segments in time;

obtaining a signal captured by a microphone array of an auxiliary device of the terminal device in an environment in which the terminal device is located;

calculating a direction of arrival (DOA) and an SPL of the first noise segment by using the captured signal;

if the DOA of the first noise segment is greater than a ninth threshold and less than a tenth threshold and the SPL of the first noise segment is greater than an eleventh threshold, extracting a second temporary feature vector of the first noise segment;

performing noise reduction on the second noise segment based on the second temporary feature vector to obtain a third noise-reduced noise segment;

performing distortion evaluation based on the third noise-reduced noise segment and the second noise segment to obtain a fourth distortion score; and entering the PNR mode if the fourth distortion score is greater than a twelfth threshold; and determining the first noisy voice signal from a noise signal generated after the first noise segment, wherein the feature vector of the registered voice signal comprises the second temporary feature vector.

15. The method according to claim 14, wherein if the fourth distortion score is not greater than the twelfth threshold, the method further comprises:

sending fourth prompt information by using the terminal device, wherein the fourth prompt information indicates whether to enable the terminal device to enter the PNR mode; and entering the PNR mode only after an operation instruction indicating that the target user agrees to enter the PNR mode is detected.

16. The method according to claim 1, further comprising:

skipping entering the PNR mode when it is detected that the terminal device is in a handheld call state;

entering the PNR mode when it is detected that the terminal device is in a hands-free call state, wherein the target user is an owner of the terminal device or a user who is using the terminal device;

entering the PNR mode when it is detected that the terminal device is in a video call state, wherein the target user is an owner of the terminal device or a user closest to the terminal device;

entering the PNR mode when it is detected that the terminal device is connected to a headset for a call, wherein the target user is wearing the headset, and the first noisy voice signal and the target voice-related data are captured by the headset; or entering the PNR mode when it is detected that the terminal device is connected to a smart large-screen device, a smartwatch, or a vehicle-mounted device, wherein the target user is an owner of the terminal device or a user who is using the terminal device, and the first noisy voice signal and the target voice-related data are captured by the smart large-screen device, the smartwatch, or audio capture hardware of the vehicle-mounted device.

17. A terminal device, comprising:

a processor, and a memory coupled to the processor to store instructions, which when executed by the processor, cause the processor to perform operations, the operations comprising:

after the terminal device enters a personalized noise reduction (PNR) mode, obtaining a first noisy voice signal and target voice-related data, wherein the first noisy voice signal comprises an interfering noise signal and a voice signal of a target user, the interfering noise signal includes at least one of a voice signal of a non-target user or an ambient noise signal, and the target voice-related data indicates a voice feature of the target user;

performing noise reduction on the first noisy voice signal based on the target voice-related data by using a voice noise reduction model to obtain a noise-reduced voice signal of the target user, wherein the voice noise reduction model is implemented based on a neural network;

obtaining a voice quality enhancement coefficient for the target user; and performing enhancement on the noise-reduced voice signal of the target user based on the voice quality enhancement coefficient for the target user to obtain an enhanced voice signal of the target user, wherein a ratio of an amplitude of the enhanced voice signal of the target user to an amplitude of the noise-reduced voice signal of the target user is the voice quality enhancement coefficient.

18. A chip system applied to an electronic device, comprising:

a processor an interface circuit configured to receive and send data, wherein the interface circuit and the processor are interconnected through a line, and a memory coupled to the processor to store instructions, which when executed by the processor, cause the electronic device to perform operations, the operations comprising:

after the electronic device enters a personalized noise reduction (PNR) mode, obtaining a first noisy voice signal and target voice-related data, wherein the first noisy voice signal comprises an interfering noise signal and a voice signal of a target user, the interfering noise signal includes at least one of a voice signal of a non-target user or an ambient noise signal, and the target voice-related data indicates a voice feature of the target user;

performing noise reduction on the first noisy voice signal based on the target voice-related data by using a voice noise reduction model to obtain a noise-reduced voice signal of the target user, wherein the voice noise reduction model is implemented based on a neural network;

obtaining a voice quality enhancement coefficient for the target user; and performing enhancement on the noise-reduced voice signal of the target user based on the voice quality enhancement coefficient for the target user to obtain an enhanced voice signal of the target user, wherein a ratio of an amplitude of the enhanced voice signal of the target user to an amplitude of the noise-reduced voice signal of the target user is the voice quality enhancement coefficient.

19. A non-transitory machine-readable storage medium having instructions stored therein, which when executed by a processor, cause the processor to perform operations, the operations comprising:

after entering a personalized noise reduction (PNR) mode, obtaining a first noisy voice signal and target voice-related data, wherein the first noisy voice signal comprises an interfering noise signal and a voice signal of a target user, the interfering noise signal includes at least one of a voice signal of a non-target user or an ambient noise signal, and the target voice-related data indicates a voice feature of the target user;

performing noise reduction on the first noisy voice signal based on the target voice-related data by using a voice noise reduction model to obtain a noise-reduced voice signal of the target user, wherein the voice noise reduction model is implemented based on a neural network;

obtaining a voice quality enhancement coefficient for the target user; and performing enhancement on the noise-reduced voice signal of the target user based on the voice quality enhancement coefficient for the target user to obtain an enhanced voice signal of the target user, wherein a ratio of an amplitude of the enhanced voice signal of the target user to an amplitude of the noise-reduced voice signal of the target user is the voice quality enhancement coefficient.

* * * * *